United States Patent
Odagiri et al.

(10) Patent No.: US 8,371,428 B2
(45) Date of Patent: Feb. 12, 2013

(54) ORIGINAL PROCESSING APPARATUS

(75) Inventors: Masato Odagiri, Ichikawa (JP); Satoru Kitabayashi, Tokyo (JP); Shigeru Ikezaki, Tokyo (JP); Mitsuru Konishi, Kamagaya (JP)

(73) Assignee: Canon Denshi Kabushiki Kaisha, Chichibu-Shi, Saitama (JP)

( * ) Notice: Subject to any disclaimer, the term of this patent is extended or adjusted under 35 U.S.C. 154(b) by 589 days.

(21) Appl. No.: 12/646,244

(22) Filed: Dec. 23, 2009

(65) Prior Publication Data

US 2010/0158592 A1    Jun. 24, 2010

(30) Foreign Application Priority Data

| Dec. 24, 2008 | (JP) | 2008-327039 |
| Dec. 24, 2008 | (JP) | 2008-327046 |
| Dec. 24, 2008 | (JP) | 2008-327765 |
| Oct. 30, 2009 | (JP) | 2009-250562 |
| Oct. 30, 2009 | (JP) | 2009-250563 |
| Dec. 22, 2009 | (JP) | 2009-290714 |

(51) Int. Cl.
    *G07F 7/04* (2006.01)
(52) U.S. Cl. ..................... 194/205
(58) Field of Classification Search ............ 194/207, 194/350, 205, 344; 235/379; 209/534; 271/3.14, 271/3.18

See application file for complete search history.

(56) References Cited

U.S. PATENT DOCUMENTS

| 5,431,399 | A * | 7/1995 | Kelley | 273/149 P |
| 6,267,248 | B1 * | 7/2001 | Johnson et al. | 209/547 |
| 2008/0156875 | A1 * | 7/2008 | Kinoshita et al. | 235/449 |

FOREIGN PATENT DOCUMENTS

| JP | 2004206362 | 7/2004 |
| JP | 2006157530 | 6/2006 |
| JP | 2008-217635 A | 9/2008 |
| JP | 2008217635 | 9/2008 |

* cited by examiner

*Primary Examiner* — Mark Beauchaine
(74) *Attorney, Agent, or Firm* — Fitzpatrick, Cella, Harper & Scinto

(57) ABSTRACT

An original processing apparatus capable of enhancing original processing ability even in the case of continuously processing a plurality of originals. In a first processing unit of the original processing apparatus, MICR characters on an original conveyed along a conveying path are read and an image of a front side of the original is read. The original is then conveyed to a position short of a second processing unit, and the next original is fed to the conveying path. When control information including print information is created based on a result of the processing by the first processing unit, the original positioned short of the second processing unit is conveyed to the second processing unit where print information is printed on the original and an image of a back side of the original is read.

47 Claims, 34 Drawing Sheets

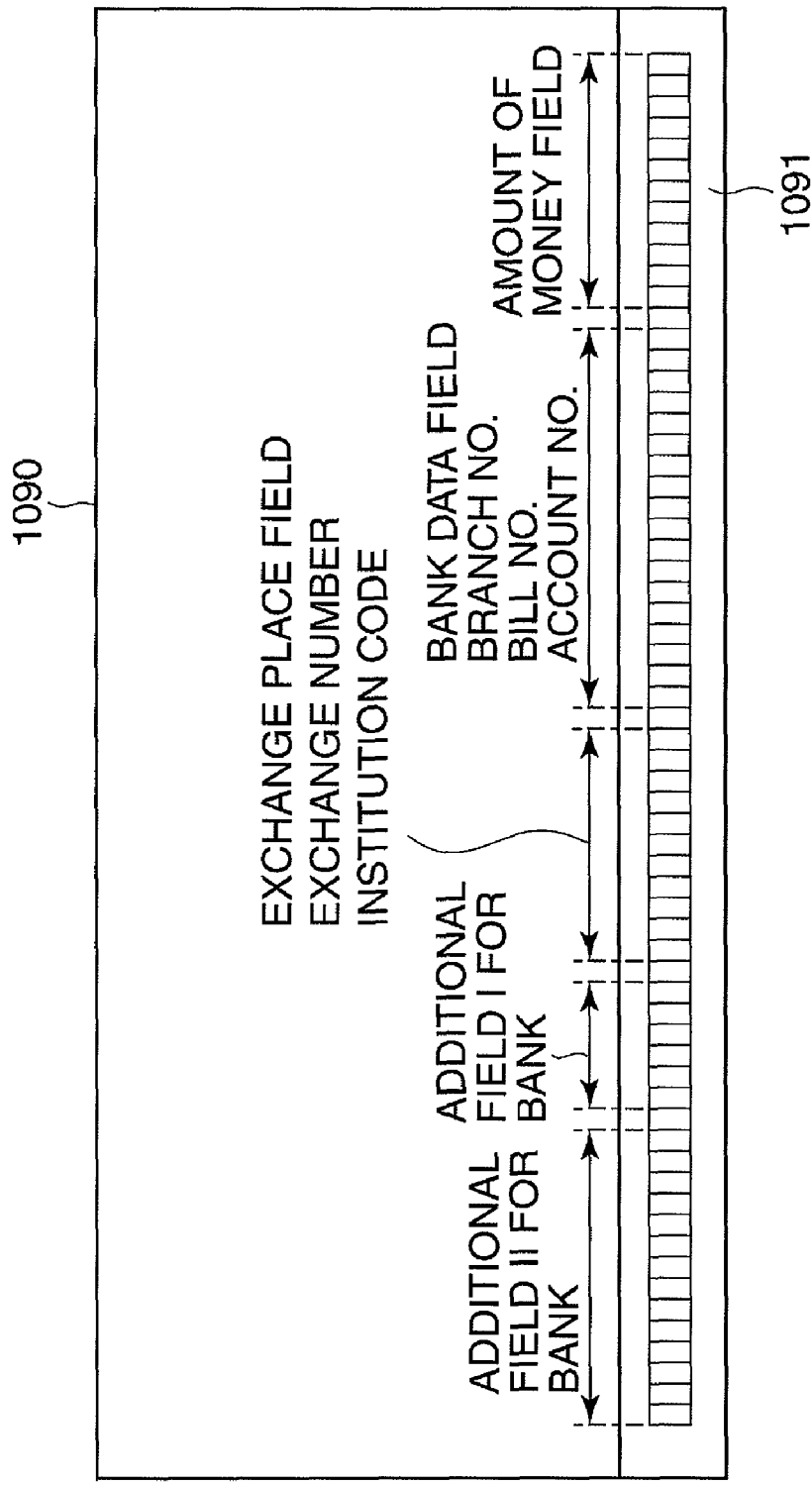

ORIGINAL PROCESSING APPARATUS

BACKGROUND OF THE INVENTION

1. Field of the Invention

The present invention relates to an original processing apparatus for reading images of originals, e.g., utility charge bills, service application forms, securities such as bills and checks.

2. Description of the Related Art

As shown in FIG. 51, MICR (magnetic ink character recognition) characters 1091 are printed in magnetic ink on originals 1090, e.g., bills handled by banking facilities such as banks. Originals are sorted on a per bank basis, on a per account basis, on a per amount basis, or on a per payday basis by reading the MICR characters 1091 on the originals by an image reading apparatus (original processing apparatus).

Images of originals 1090 and information of MICR characters 1091 read by image reading apparatuses in branch offices are transferred as electronic files to a host computer in a centralized center where money payment processing, etc. are carried out based on the information received by the host computer.

The above series of processing must be completed in a short time, e.g., within one day from when originals were received from the user, and therefore, rapid processing is demanded. In most banking facilities, processing on originals is not performed in a central office or branch offices, but performed in, e.g., a quarter called a centralized center specialized to handle originals. In the centralized center, large amounts of originals are collectively processed by using high-speed, large-scale image reading apparatuses.

With the recent advancement of communication technology, it is possible to conduct a business operation such that various individual information including MICR characters and images of originals are read at each branch office and then transferred as electronic files to the centralized center in which money payment processing based on the electronic files and the individual information is completed before the originals are received by the centralized center. This electronic data-based processing eliminates the need for the centralized center to collect originals on the same day where the originals are received from customers, resulting in a reduction of amounts of transportation of bills at the centralized center and the branch offices, whereby rapid original processing as well as cost reduction can be achieved.

Japanese Laid-open Patent Publication No. 2008-217635 thus discloses, as a conventional image reading apparatus, a magnetic ink character reading apparatus where a read signal waveform is obtained by reading magnetic ink characters on an original by a magnetic head and then compared with basic waveform data for magnetic ink character authentication, whereby character recognition is made. After completion of the character recognition, a statement that electronic payment processing is completed is printed by a printing mechanism disposed downstream of the magnetic head on the original whose magnetic ink characters have been read.

The magnetic ink character reading apparatus disclosed in Japanese Laid-open Patent Publication No. 2008-217635 is configured not to allow printing on an original unless electronic payment processing is completed. When magnetic ink characters have been read, but electronic payment processing based on a result of recognition of read information is not completed, the apparatus is therefore unable to proceed to the next processing and sometimes required to stop original conveyance and wait for completion of the electronic payment processing. Such stoppage of conveyance causes a reduction in original processing speed, and such tendency becomes noticeable when a plurality of originals are continuously processed.

There is a fear that the above problem is caused also in other original processing apparatus configured, e.g., to read information of an original on an upstream side of an original conveying path and based on the read information, perform another processing such as printing, reading, or the like on a downstream side of the conveying path.

SUMMARY OF THE INVENTION

The present invention provides an original processing apparatus capable of enhancing the original processing ability even in the case of continuously processing a plurality of originals.

Accordingly, this invention provides an original processing apparatus comprising a conveying path configured to convey an original, a conveyance unit configured to convey an original along the conveying path, a control unit configured to control the conveyance unit, a first processing unit configured to perform predetermined processing on an original conveyed along the conveying path, and a second processing unit disposed downstream of the first processing unit and configured to perform processing, which is different from that performed by the first processing unit, on an original conveyed along the conveying path in accordance with control information created based on a result of the processing by the first processing unit, wherein the control unit controls the conveyance unit such that one original having been processed by the first processing unit is positioned short of the second processing unit in the conveying path.

With this invention, one original for which processing by the first processing unit has been completed is positioned short of the second processing unit in the conveying path, and therefore, another original subsequent to the one original can be processed in the first processing unit. It is therefore possible to restart feeding the next original, without receiving information on the one original from an information processing apparatus, whereby the original processing ability, especially the processing speed, can be enhanced.

Further features of the present invention will become apparent from the following description of exemplary embodiments with reference to the attached drawings.

BRIEF DESCRIPTION OF THE DRAWINGS

FIG. 51 is a view showing an example of originals such as bills handled by banking facilities such as banks.

DESCRIPTION OF THE EMBODIMENTS

Hereafter, embodiments according to the present invention will be described in detail with reference to the drawings.

Figure 1:
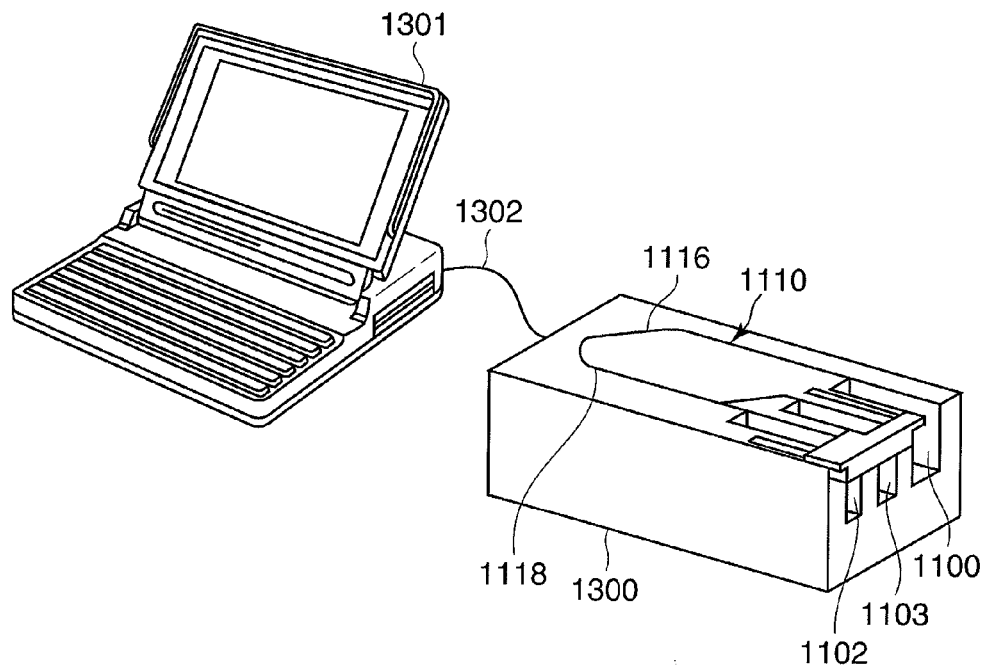
FIG. 1 is a schematic perspective view for explaining an image reading apparatus according to a first embodiment of this invention.
Figure 2:
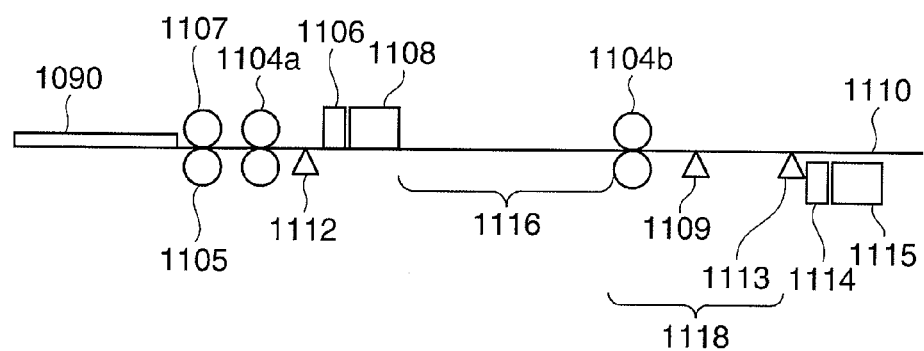
FIG. 2 is a development view of a conveying path of the image reading apparatus shown in FIG. 1.

First, a description is given of a first embodiment of this invention. FIG. 1 is a schematic perspective view for explaining an image reading apparatus of the first embodiment of this invention, and FIG. 2 is a development view showing a conveying path of the image reading apparatus shown in FIG. 1.

As shown in FIG. 1, the image reading apparatus 1300 of this embodiment is an example of a check scanner apparatus, and includes a mounting unit 1100 on which a bundle of originals is placed in a standing state, a conveying path 1110, a first sheet discharge unit 1102, and a second sheet discharge unit 1103, and is connected for communication with a host computer 1301 (information processing apparatus) via a communication unit such as a communication cable 1302.

A first conveying path 1116 and a second conveying path 1118 are arranged in the conveying path 1110 for conveying an original 1090. On the upstream side of the first conveying path 1116, there are disposed a roller pair of a retard roller 1107 and a feed roller 1105, a conveying roller pair 1104a, a pre-registration sensor 1112, a MICR reading unit 1106, and a reading unit 1108, which are arranged in this order toward downstream. In this embodiment, the feed roller 1105, the retard roller 1107, etc. constitute a feeding unit of this invention.

A conveying roller pair 1104b and an original presence/absence sensor 1109 are disposed along the second conveying path 1118. On the downstream side of the second conveying path 1118, an after-registration sensor 1113, a print unit 1114, and a reading unit 1115 are disposed. A first conveyance mechanism (not shown) for driving the conveying roller pair 1104a, etc., and a second conveyance mechanism (not shown) for driving the conveying roller pair 1104b, etc. are also disposed in the image reading apparatus 1300.

In this embodiment, the MICR reading unit 1106 and the reading unit 1108 constitute a first processing unit of this invention, and the print unit 1114 and the reading unit 1115 constitute a second processing unit of this invention. As previously described with reference to FIG. 51, MICR characters 1091 are printed in magnetic ink on the original 1090.

The first conveying path 1116 corresponds to a region of the conveying path 1100 from the reading unit 1108 to a position short of the conveying roller pair 1104b located at an upstream end of the second conveying path 1118. The first conveying path 1116 has its conveying path length equal to the sum of the longest length of originals (length of business check (213 mm)) conveyable by an image reading apparatus specialized to deal with bills and a braking distance required to cause an original to stop.

The second conveying path 1118 corresponds to a region of the conveying path 1110 from the conveying roller pair 1104b to a position short of the after-registration sensor 1113 disposed immediately short of the print unit 1114. The second conveying path 1118 has its conveying path length shorter than the length of business check and equal to at least the sum of a length of 152 mm, which is called personal check (or American check), and an accelerating distance.

Next, with reference to FIGS. 3 to 8, an example operation of the image reading apparatus 1300 of this embodiment will be described. To execute a process shown in FIG. 3, a control program stored in a ROM or a hard disk (not shown) of the image reading apparatus 1300 is loaded into a RAM (not shown) and the loaded program is executed by a CPU, not shown (hereinafter referred to as the CPU 1300A).

Figure 3:
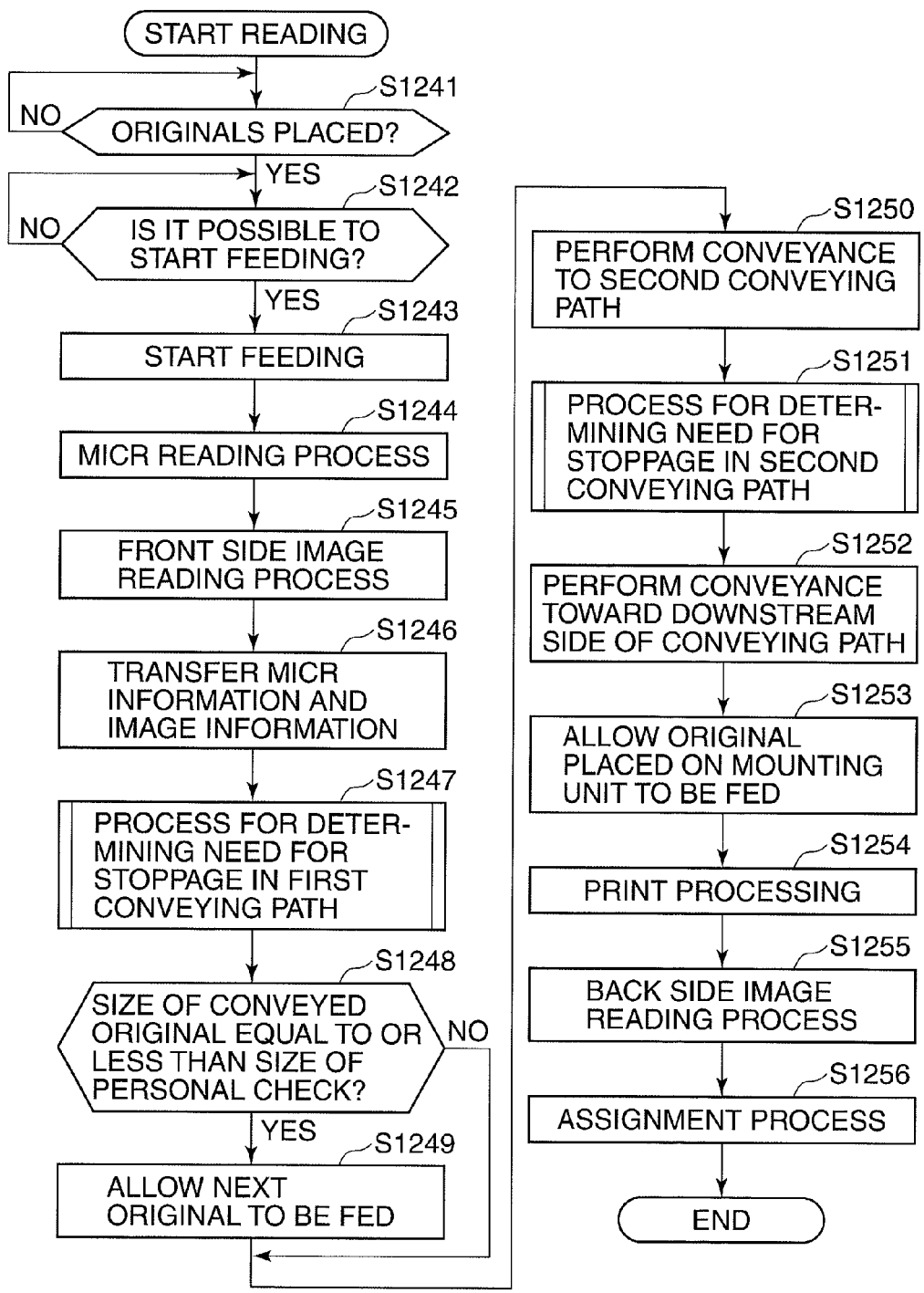
FIG. 3 is a flowchart for explaining an example operation of the image reading apparatus of the first embodiment.

In FIG. 3, when receiving from the host computer 1301 via the communication cable 1302 an instruction to start a reading process, the CPU 1300A determines in step S1241 via a sheet detecting sensor (not shown) whether originals 1090 are placed on the mounting unit 1100.

If originals 1090 are placed on the mounting unit 1100, the CPU 1300A proceeds to step S1242.

In step S1242, the CPU 1300A determines whether it is possible to start feeding originals 1090 from the mounting unit 1100. If the feeding is possible, the CPU proceeds to step S1243.

The CPU 1300A determines that it is possible to start feeding originals 1090, if an original about to be fed satisfies any of the following three requirements: (1) The original about to be fed is a first original. If the original about to be fed is a first original, there is no original in the first and second conveying paths 1116, 1118, and therefore the original 1090, if fed, will not collide with another original.

(2) The original about to be fed is a second original, and the first original has a size shorter than the length of the second conveying path 1118. The original size can be detected as "vt", where v denotes a conveyance speed of original 1090 and t denotes a time period from when the leading end of the original has passed through the pre-registration sensor 1112 to when the trailing end of the original passes through the sensor.

In a case that the original about to be fed is a second original, the first original must be conveyed to and stopped in the second conveying path 1118, if print information and a result of assignment destination determination for the original preceding by one sheet (i.e., the first original) have not been received from the host computer 1301.

Figure 4:
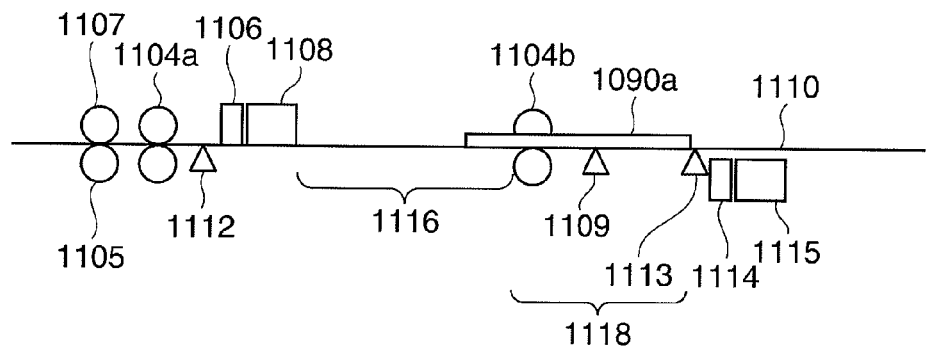
FIG. 4 is a view for explaining an example where a fed original is longer than a conveying path length of a second conveying path.
Figure 5:
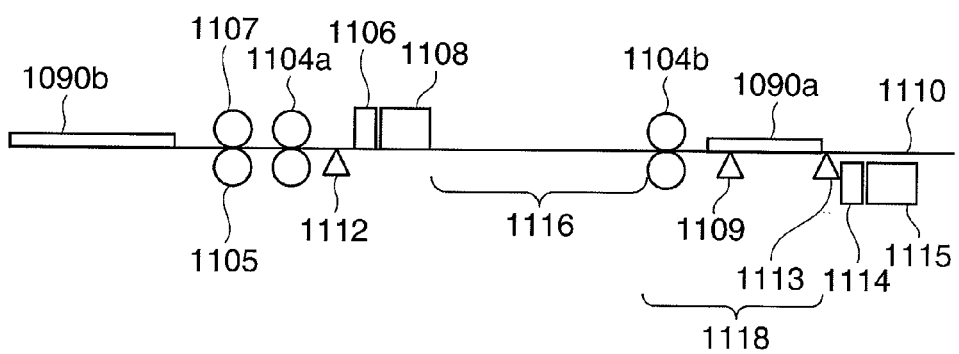
FIG. 5 is a view for explaining an example where a fed original is shorter than the conveying path length of the second conveying path.
Figure 6:
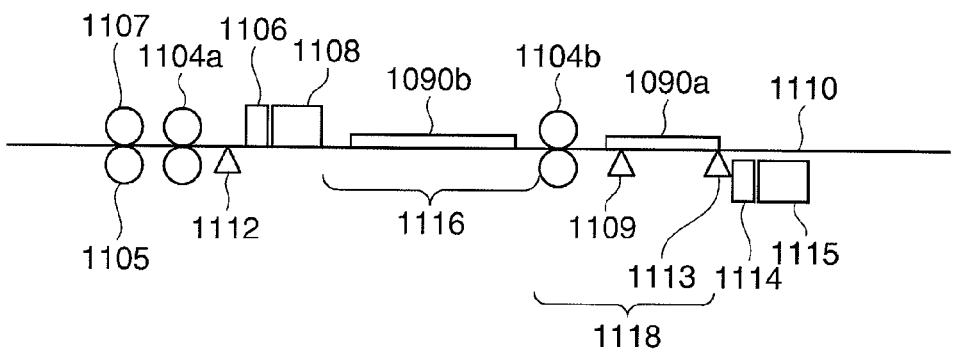
FIG. 6 is a view for explaining an example where the next fed original is caused to stop in a first conveying path.

In a case that the first original 1090a is longer than the personal check, the trailing end of the original 1090a is within the first conveying path 1116 as shown in FIG. 4 when the first original 1090a stops in the second conveying path 1118, and there is a fear that a new original, if fed, will collide with the stopped original 1090a. On the other hand, if the first original 1090a is shorter than the personal check as shown in FIG. 5, an original 1090b newly fed will not collide with the first original 1090a and can be stopped in the first conveying path 1116 as shown in FIG. 6.

(3) The original about to be fed is a third or subsequent original, print information and a result of assignment destination determination for the original preceding by two originals (sheets) have been received from the host computer 1301 so that processing by the print unit 1114 and the reading unit 1115 can be started, and the original preceding by one sheet has a length shorter than the length of the second conveying path 1118.

In a case that the original about to be fed is the third or subsequent original, if print information and a result of assignment destination determination for an original preceding by two originals have not been received from the host computer 1301, the original preceding by two originals must be conveyed to and stopped in the second conveying path 1118.

Even if the original preceding by two originals is shorter than the personal check and an original preceding by one sheet can be fed, the original preceding by one sheet must be conveyed to and stopped in the first conveying path 1116. For this reason, if a further original is fed, there is a fear that the fed original will collide with the original preceding by one sheet.

To feed an original, it is necessary that print information and a result of assignment destination determination of an original preceding by two originals have been received from the host computer 1301 and processing by the print unit 1114 and the reading unit 1115 have been started. If the length of an original preceding by one sheet is not shorter than the length of the second conveying path 1118, there is a possibility that the original stops in a state protruding to the first conveying path 1116.

When any of the requirements (1) to (3) is satisfied, the CPU 1300A determines that it is possible to start feeding an original 1090 placed on the mounting unit 1100.

The processing by the MICR reading unit 1106 and the reading unit 1108 can precedently be performed on the fed original, even if print information and a result of assignment destination determination for an original preceding by one sheet have not been received from the host computer 1301.

In step S1243, the CPU 1300A causes originals 1090 placed on the mounting unit 1100 to be fed by the feed roller 1105 to the first conveying path 1116, while being separated one by one by the retard roller 1107, and the proceeds to step S1244. In the following description, it is assumed that the original 1090 corresponds to the original 1090b in FIG. 5.

In step S1244, the CPU 1300A causes the MICR reading unit 1106 to read MICR characters 1091 printed on the original 1090b which is being conveyed by the first conveyance mechanism, and proceeds to step S1245.

Since the original 1090b reaches the MICR reading unit 1106 upon elapse of a time period of L1/v, where L1 represents a distance between the pre-registration sensor 1112 and the MICR reading unit 1106 and v represents the conveyance speed of the original 1090b, the CPU 1300A performs time measurement by using a timer (not shown) and causes the MICR reading unit 1106 to read the MICR characters 1091 on the original 1090b upon elapse of L1/v from when the leading end of the original 1090b has passed through the pre-registration sensor 1112.

In step S1245, the CPU 1300A causes the reading unit 1108 to read an image of the front side of the original 1090b, and proceeds to step S1246.

Since the original 1090b reaches the reading unit 1108 upon elapse of L2/v, where L2 represents a distance between the pre-registration sensor 1112 and the reading unit 1108 and v represents the conveyance speed of the original 1090b, the CPU 1300A performs time measurement by using the timer (not shown) and causes the reading unit 1108 to start reading the image of the front side of the original 1090b upon elapse of L2/v from when the leading end of the original 1090b has passed through the pre-registration sensor 1112.

In step S1246, the CPU 1300A transfers the read MICR information and the front side image information of the original 1090b to the host computer 1301 via the communication cable 1302, and proceeds to step S1247.

In step S1247, the CPU 1300A carries out a process for determining the need for stopping the original 1090b in the first conveying path 1116, and proceeds to step S1248.

Figure 7:
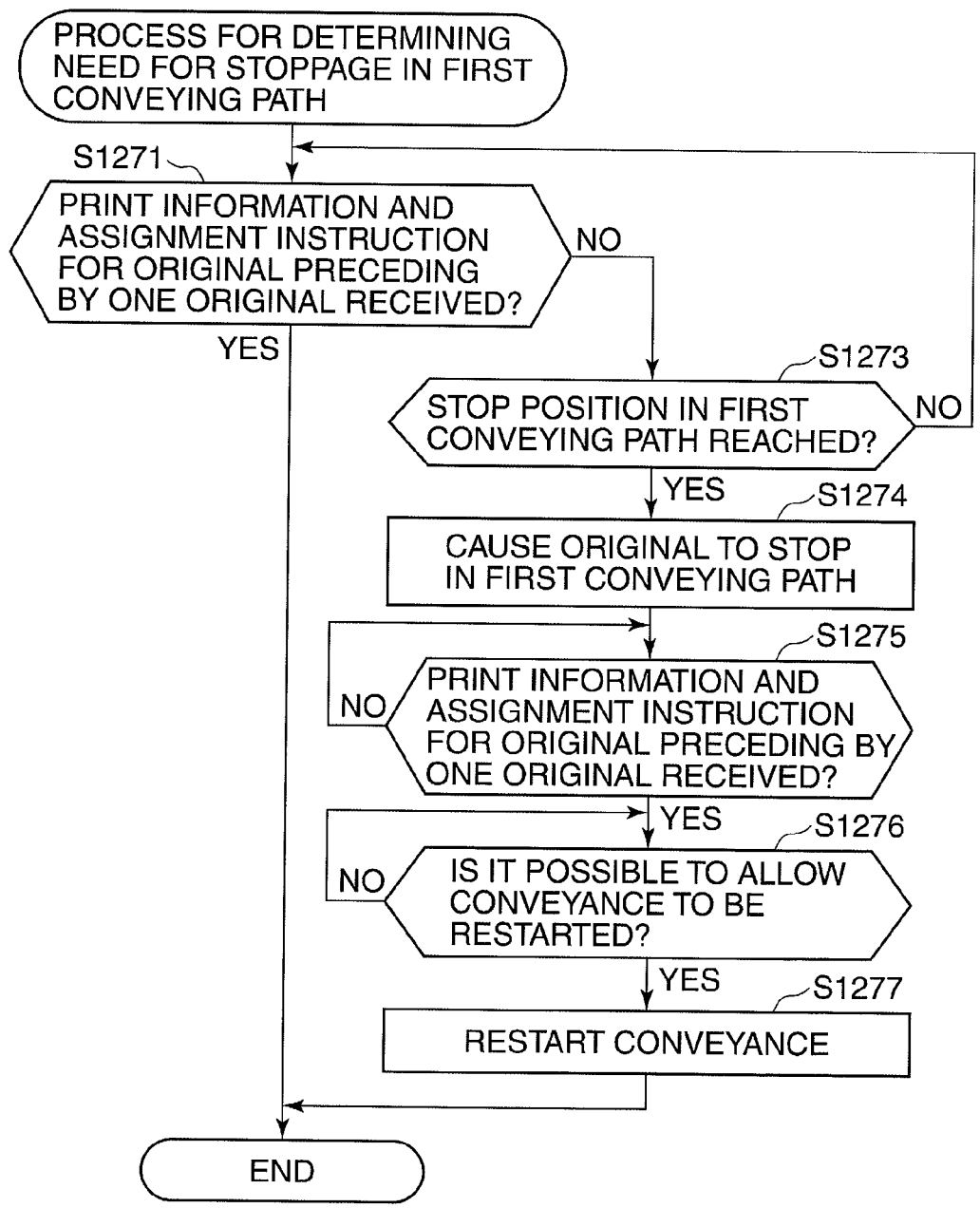
FIG. 7 is a flowchart for explaining a process performed in step S1247 in FIG. 3 to determine the need for stopping an original in the first conveying path.

FIG. 7 is a flowchart for explaining the process performed in step S1247 of FIG. 3 to determine the need for stopping the original 1090b in the first conveying path 1116.

In step S1271 in FIG. 7, the CPU 1300A determines whether it has received from the host computer 1301 print information and a result of assignment destination determination (i.e., assignment instruction) for the original 1090a conveyed precedently by one sheet.

The print information and the result of assignment destination determination (control information) for the original 1090a are created by the host computer 1301 based on the MICR information and the front side image information of the original 1090a preceding by one sheet which have been transferred to the host computer 1301 in step S1246.

In a case where the print information and the assignment destination determination result for the original 1090a preceding by one sheet have been received from the host computer 1301 or in a case where the original 1090b is a first original, the CPU 1300A completes the process for determining the need for stopping the original 1090b in the first conveying path 1116, without stopping conveyance of the original 1090b.

On the other hand, in a case where the print information and the assignment destination determination result for the original 1090a preceding by one sheet have not been received from the host computer 1301, the CPU 1300A proceeds to step S1273.

In step S1273, until the original 1090b conveyed by the first conveyance mechanism reaches a stop position in the first conveying path 1116, the CPU 1300A monitors whether print information and a result of assignment destination determination for the original 1090a preceding by one sheet are received from the host computer 1301.

Since the original 1090b will reach the stop position in the first conveying path 1116 upon elapse of L3/v, where L3 denotes a distance between the pre-registration sensor 1112 and the stop position in the first conveying path 1116 and v denotes the conveyance speed of the original 1090, the CPU 1300A performs time measurement by using a timer (not shown) and determines that the original 1090b reaches the stop position in the first conveying path 1116 upon elapse of L3/v from when the leading end of the original 1090b has passed through the pre-registration sensor 1112. The stop position in the first conveying path 1116 is set immediately short of the conveying roller pair 1104b.

In a case that the original 1090b reaches the stop position in the first conveying path 1116 but the CPU 1300A has not received from the host computer 1301 the print information and the assignment destination determination result for the original 1090a preceding by one sheet, the CPU 1300A proceeds to step S1274.

In step S1274, the CPU 1300A controls the first conveyance mechanism to cause the original 1090b to stop in the first conveying path 1116 since the original 1090a has been or will be caused to stop in the second conveying path 1118. Then, the CPU proceeds to step S1275.

In step S1275, the CPU 1300A waits for receiving from the host computer 1301 the print information and the result of assignment destination determination (i.e., assignment instruction) for the original 1090a preceding by one sheet, and proceeds to step S1276 upon reception thereof.

In step S1276, the CPU 1300A determines whether it is possible to allow conveyance of the original 1090b to be restarted, and proceeds to step S1277 if it is possible to allow conveyance of the original 1090b to be restarted.

The CPU 1300A determines in step S1276 that it is possible to allow conveyance of the original 1090b by the first conveyance mechanism to be restarted in a case where the original 1090a is not present in the second conveying path 1118 or in a case where conveyance of the original 1090a preceding by one sheet by the second conveyance mechanism has been restarted so that the original 1090b, if fed, will not collide with the original 1090a.

In step S1277, the CPU 1300A causes the first conveyance mechanism to restart to convey the original 1090b, and completes the process for determining the need for stopping the original 1090b in the first conveying path 1116.

Referring to FIG. 3 again, in step S1248, the CPU 1300A compares the length of the conveyed original 1090b with the size of personal check.

The length of the original 1090b can be calculated as vt, where v represents the conveyance speed of the original 1090 and t represents a time period from when the leading end of the original has passed through the pre-registration sensor 1112 to when the trailing end of the original passes through the sensor.

If the length of the conveyed original 1090b is equal to or less than the size of personal check, the CPU 1300A proceeds to step S1249. If the length of the conveyed original 1090b exceeds the size of personal check, the CPU skips step S1249 and proceeds to step S1250.

In step S1249, the CPU 1300A allows the next original to be fed, and proceeds to step S1250.

When the next original is fed from the mounting unit 1100 to the conveying path 1110, the processing on the next fed original is started from step S1241. If the length of the original 1090b exceeds the size of personal check, the CPU 1300A does not allow the next original to be fed.

In step S1250, the CPU 1300A conveys the original 1090b to the second conveying path 1118, and proceeds to step S1251.

In step S1251, the CPU 1300A performs a process for determining the need for stopping the original 1090b in the second conveying path 1118, while conveying the original 1090b by the second conveyance mechanism, and then proceeds to step S1252.

Figure 8:
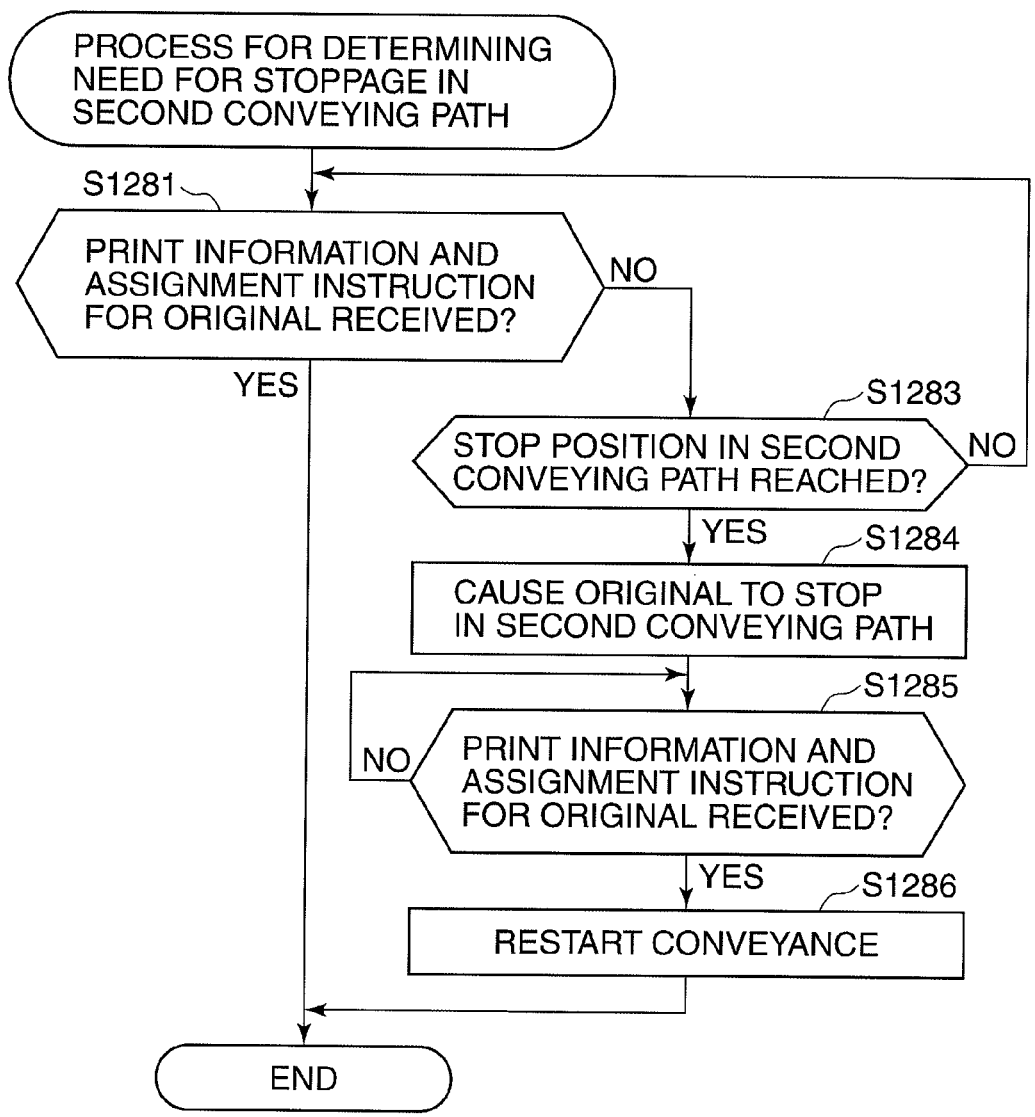
FIG. 8 is a flowchart for explaining a process performed in step S1251 in FIG. 3 to determine the need for stopping an original in the second conveying path.

FIG. 8 is a flowchart for explaining the process performed in step S1251 in FIG. 3 to determine the need for stopping the original 1090b in the second conveying path 1118.

In step S1281 in FIG. 8, the CPU 1300A determines whether it has received from the host computer 1301 the print information and the result of determination of assignment destination determination for the original 1090b.

The print information and the result of assignment destination determination for the original 1090b are created by the host computer 1301 based on at least one of the MICR information and the front side image information of the original 1090b transferred to the host computer 1301 in step S1246.

In a case where the print information and the result of assignment destination determination (assignment instruction) for the original 1090b have been received from the host computer 1301, the CPU 1300A completes the process for determining the need for stopping the original 1090b in the second conveying path 1118, without stopping conveyance of the original 1090b.

On the other hand, in a case where the print information and the result of assignment destination determination (assignment instruction) for the original 1090b have not been received from the host computer 1301, the CPU 1300A proceeds to step S1283.

In step S1283, the CPU 1300A monitors whether it receives the print information and the result of assignment destination determination for the original 1090b from the host computer 1301, while causing the second conveyance mechanism to convey the original 1090b to a stop position in the second conveying path 1118. The stop position in the second conveying path 1118 is at a position short of the after-registration sensor 1113 located immediately short of the print unit 1114.

Since the original 1090b will reach the stop position in the second conveying path 1118 upon elapse of L4/v, where L4 represents a distance between the original presence/absence sensor 1109 and the stop position in the second conveying path 1118 and v represents the conveyance speed of the original 1090b, the CPU 1300A performs time measurement by using a timer (not shown) and determines that the original 1090b reaches the stop position in the second conveying path 1118 upon elapse of L4/v from when the leading end of the original 1090b has passed through the original presence/absence sensor 1109.

In a case where the original 1090b reaches the stop position in the second conveying path 1118 but the CPU 1300A has not received from the host computer 1301 the print information and the result of assignment destination determination for the original 1090b, the CPU 1300A proceeds to step S1284.

In step S1284, the CPU 1300A causes the original 1090b to stop in the second conveying path 1118, and proceeds to step S1285.

In step S1285, the CPU 1300A waits for receiving from the host computer 1301 the print information and the result of assignment destination determination (assignment instruction) for the original 1090b, and proceeds to step S1286 upon reception thereof.

In step S1286, the CPU 1300A causes the second conveyance mechanism to restart conveying the original 1090b, and completes the process for determining the need for stopping the original 1090b in the second conveying path 1118.

Referring to FIG. 3 again, in step S1252, the CPU 1300A causes the original 1090b to be conveyed toward the downstream side of the second conveying path 1118, and proceeds to step S1253 when detecting that the leading end of the original 1090b passes through the after-registration sensor 1113.

In step S1253, since the original 1090b is conveyed downstream from the second conveying path 1118 and the next original is conveyed from the first conveying path 1116 to the second conveying path 1118, the CPU 1300A allows an original placed on the mounting unit 1100 to be fed, and then proceeds to step S1254.

When an original is fed from the mounting unit 1100, the processing on the fed original is started from step S1241.

In step S1254, the CPU 1300A causes the print unit 1114 to print the print information received from the host computer 1301 on the original 1090b, and proceeds to step S1255.

Since the original 1090b reaches the print unit 1114 upon elapse of L5/v, where L5 represents a distance between the after-registration sensor 1113 and the print unit 1114 and v represents the conveyance speed of the original 1090b, the CPU 1300A performs time measurement by using a timer (not shown) and causes the print unit 1114 to print onto the original 1090b the print information received from the host computer 1301 upon elapse of L5/v from when the leading end of the original 1090b has passed through the after-registration sensor 1113.

In step S1255, the CPU 1300A causes the reading unit 1115 to read an image of the back side of the original 1090b, transmits the read back-side image information to the host computer 1301 via the communication cable 1302, and proceeds to step S1256.

Since the original 1090b reaches the reading unit 1115 upon elapse of L6/v, where L6 represents a distance between the after-registration sensor 1113 and the reading unit 1115, the CPU 1300A performs time measurement by using a timer (not shown) and causes the reading unit 1115 to start reading the back side image of the original 1090b upon elapse of L6/v from when the leading end of the original 1090b has elapsed through the after-registration sensor 1113.

In step S1256, based on the result of assignment destination determination for the original 1090b received from the host computer 1301, the CPU 1300A assigns and conveys the original 1090b to either the first sheet discharge unit 1102 or the second sheet discharge unit 1103, and completes the process.

Next, an example operation of the host computer 1301 will be described with reference to FIG. 9. To execute a process shown in FIG. 9, a control program stored in a ROM or a hard disk (not shown) of the host computer 1301 is loaded into a RAM (not shown) and the loaded program is executed by a CPU, not shown (hereinafter referred to as the CPU 1301A).

Figure 9:
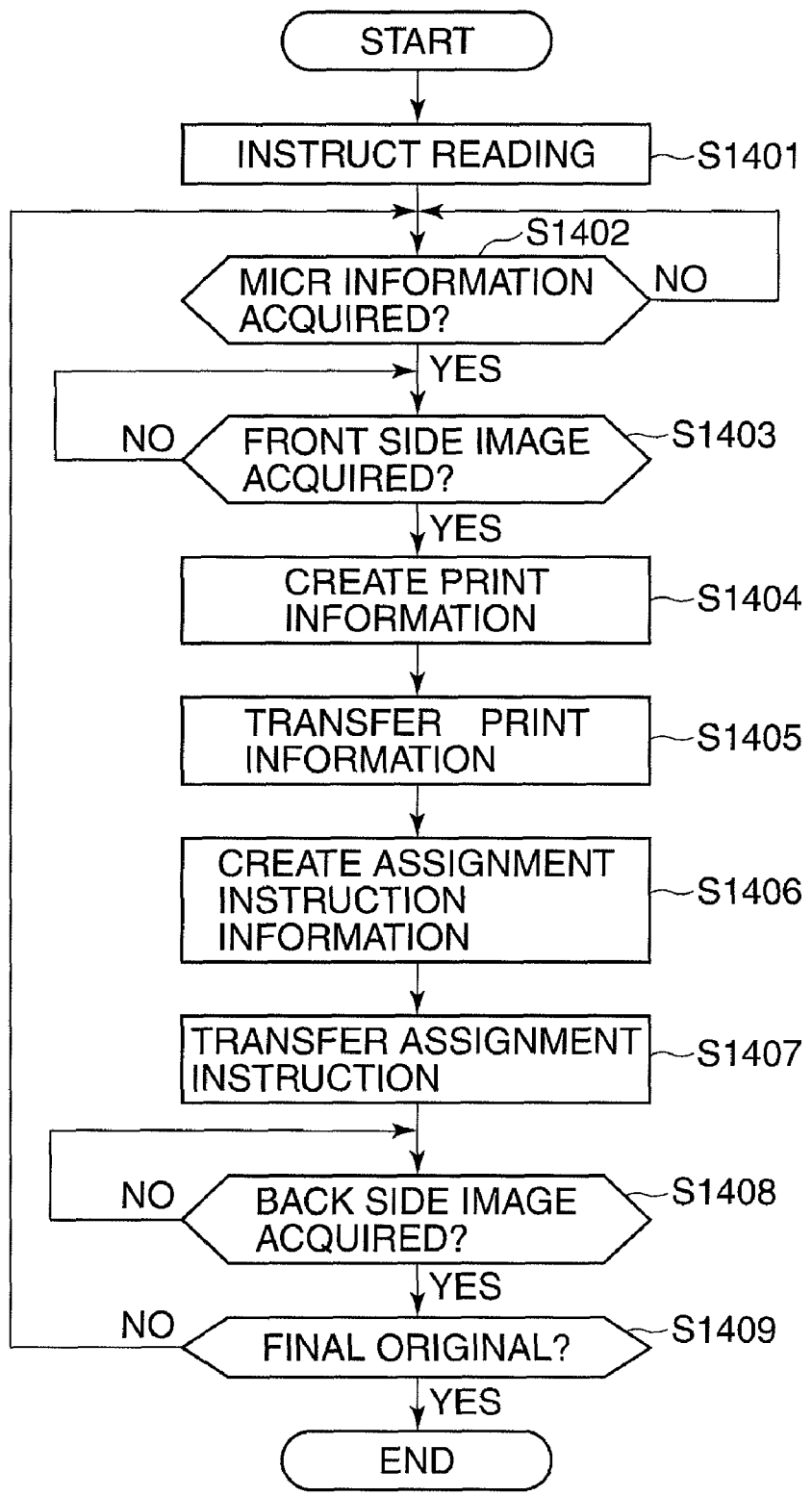
FIG. 9 is a flowchart for explaining an example operation of a host computer.

In step S1401 in FIG. 9, the CPU 1301A gives the image reading apparatus 1300a reading instruction, and proceeds to step S1402.

In step S1402, the CPU 1301A waits for acquisition of MICR information from the image reading apparatus 1300, and proceeds to step S1403 upon acquisition thereof.

In step S1403, the CPU 1301A determines whether it acquires the front side image information of the original 1090*b* from the image reading apparatus 1300, and proceeds to step S1404 upon acquisition thereof.

In step S1404, based on the acquired MICR information and the front side image information, the CPU 1301A creates print information to be printed on the back side of the original 1090*b* to indicate that processing has been performed on the original 1090*b*, and then proceeds to step S1405.

In step S1405, the CPU 1301A transfers the print information created in step S1404 to the image reading apparatus 1300 via the cable 1302, and proceeds to step S1406.

In step S1406, based on the acquired MICR information and the front side image information, the CPU 1301A determines a discharge destination of the original 1090*b*, and proceeds to step S1407.

In step S1407, the CPU 1301A transfers a result of determination of the discharge destination of the original 1090*b* (assignment instruction) at step S1406 to the image reading apparatus 1300 via the communication cable 1302, and proceeds to step S1408.

In step S1408, the CPU 1301A waits for acquisition of back side image information of the original 1090*b* from the image reading apparatus 1300, and proceeds to step S1409 upon acquisition thereof.

In step S1409, the CPU 1301A determines whether the original 1090*b* is a final original. If the original 1090*b* is not a final original, the CPU 1301A returns to step S1402 to perform the process for the next original. If the original 1090*b* is a final original, the present process is completed.

As described above, in this embodiment, after the trailing end of the original passes through the MICR reading unit 1106 and the reading unit 1108, the image reading apparatus 1300 is able to start feeding the next original from the mounting unit 1100, without receiving information transferred from the host computer 1301. Thus, the original processing ability, especially the original processing speed, can drastically be enhanced.

In this embodiment, since the conveying path length from the reading unit 1108 of the first conveying path 1116 to the conveying roller 1104 (i.e., the start point of the second conveying path 1118) is equal to or longer than the maximum original size, a long time can be ensured for the processing in the host computer 1301. As a result, it is possible to reduce the frequency of occurrence of stoppage of original in the conveying path 1110, whereby the original processing ability, especially the original processing speed, can be enhanced.

Next, with reference to FIGS. 10 to 14, an image reading apparatus according to a second embodiment of this invention will be described. It should be noted that like parts duplicative or similar to those of the first embodiment are denoted by like numerals. The host computer 1301 operates in the same manner as in the first embodiment (FIG. 9), and a description thereof is omitted.

Figure 11:
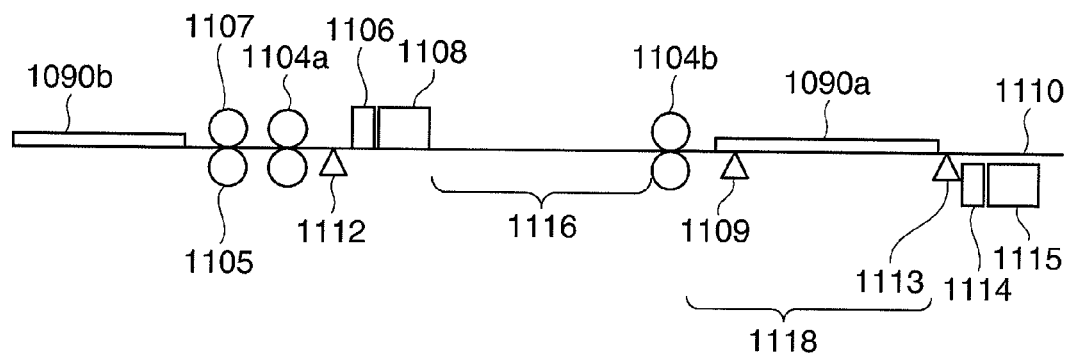
FIG. 11 is a development view of a conveying path for explaining an example operation of the image reading apparatus of the second embodiment.
Figure 12:
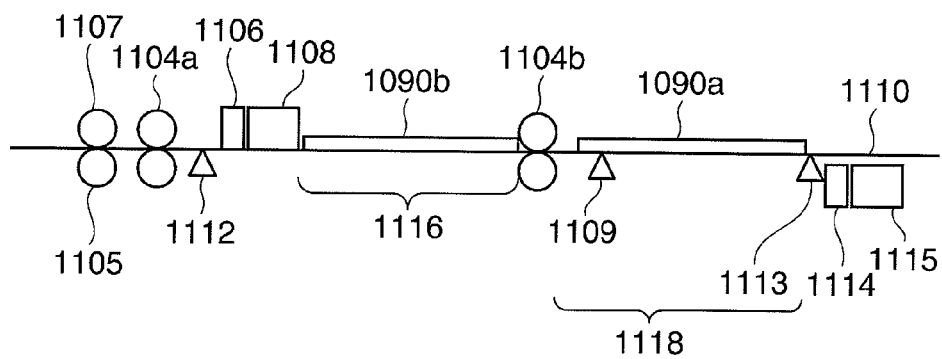
FIG. 12 is a development view of the conveying path for further explaining the example operation of the image reading apparatus.

In this embodiment, it is assumed that the conveying path length from the conveying roller pair 1104*b* in the second conveying path 1118 to the after-registration sensor 1113 located immediately short of the print unit 1114 shown in FIGS. 11 and 12 is equal to or longer than the longest length (the length of business check (213 mm)) of originals conveyable by an image reading apparatus specialized to deal with bills.

Figure 10:
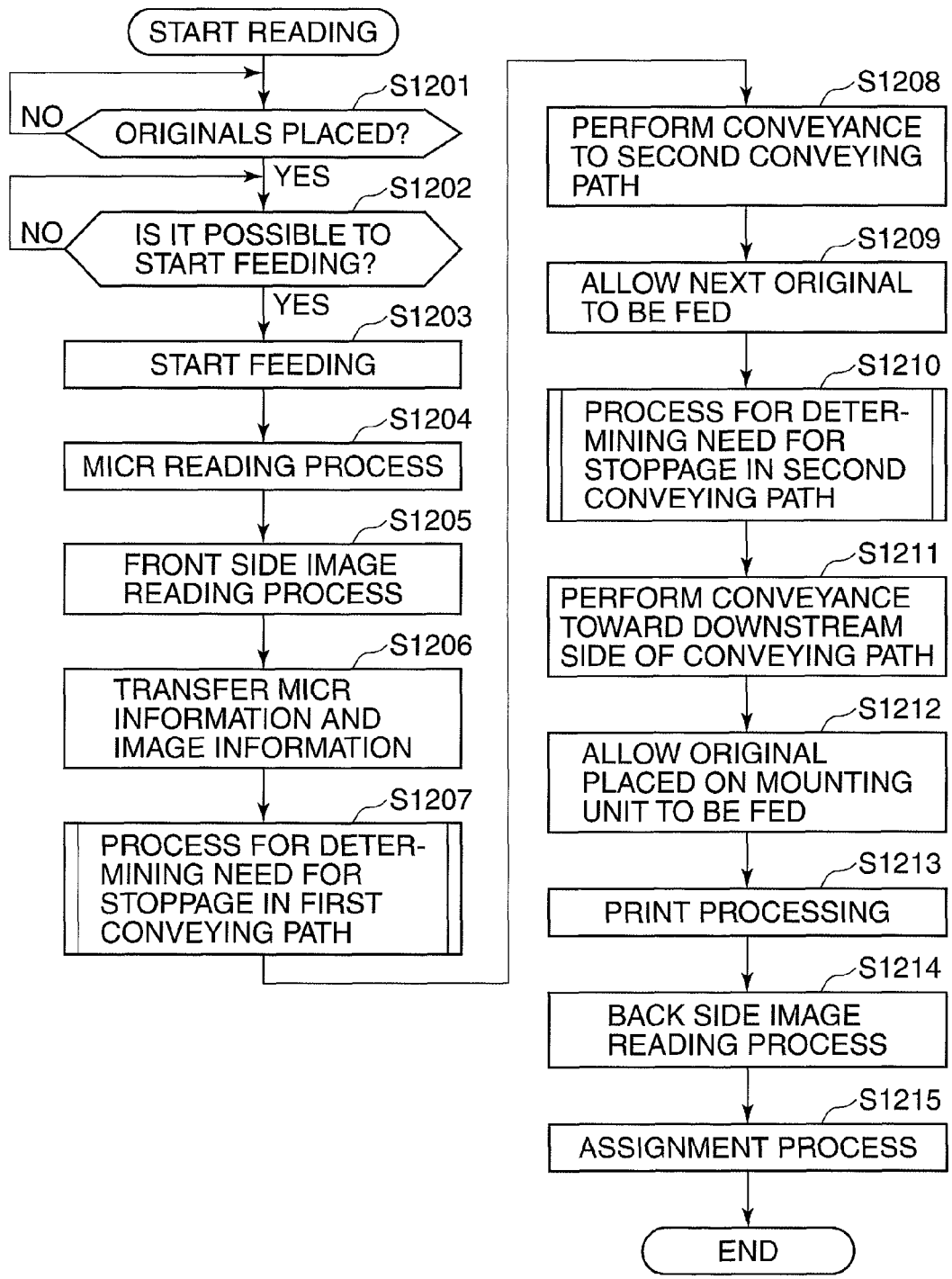
FIG. 10 is a flowchart for explaining an example operation of an image reading apparatus according to a second embodiment of this invention.

FIG. 10 is a flowchart showing an example operation of the image reading apparatus 1300 of this embodiment. To execute a process shown in FIG. 10, a control program stored in a ROM or a hard disk (not shown) of the image reading apparatus 1300 is loaded into a RAM (not shown) and the loaded program is executed by a CPU, not shown (hereinafter referred to as the CPU 1300A).

In step S1201 in FIG. 10, when receiving an instruction to start a reading process from the host computer 1301 via the communication cable 1302, the CPU 1300A determines, via a sheet detecting sensor (not shown), whether originals 1090 are placed on the mounting unit 1100.

If originals 1090 are placed on the mounting unit 1100, the CPU 1300A proceeds to step S1202.

In step S1202, the CPU 1300A determines whether it is possible to start feeding the original 1090 from the mounting unit 1100, and proceeds to step S1203 if the original can be fed.

It is determined in step S1202 that feeding can be started in a case where an original about to be fed is a first or second original or in a case where print information and a result of assignment destination determination for an original conveyed precedently by two originals have been received from the host computer 1301.

This is because if an original about to be fed is a first original, there is no original in the first and second conveying paths 1116, 1118, and therefore the original 1090, if fed, will not collide with another original.

In a case where the original about to be fed is a second original, the first original conveyed to and stopped in the second conveying path 1118 does not run over into the first conveying path 1116, even if print information and a result of assignment destination determination for the first original have not been received from the host computer 1301. Thus, the first conveying path 1116 is unoccupied, and therefore, the fed second original can be stopped in the first conveying path 1116.

In a case where print information and a result of assignment destination determination for an original conveyed precedently by two originals have already been received from the host computer 1301, the image reading apparatus 1300 is able to start conveying the original preceding by two originals in the second conveying path 1118.

Thus, an original preceding by one sheet in the first conveying path 1116 can be conveyed to the second conveying path 1118, and therefore the first conveying path 1116 becomes unoccupied. Thus, the fed original can be stopped in the first conveying path 1116, even if print information and a result of assignment destination determination for the original preceding by one sheet have not been received.

If any of the above requirements is satisfied, processing on the fed original can precedently be executed by the MICR reading unit 1106 and the reading unit 1108, even if print information and a result of assignment destination determination for the original preceding by one sheet have not been received from the host computer 1301.

In step S1203, the CPU 1300A causes originals placed on the mounting unit 1100 to be fed to the first conveying path 1116 by the feed roller 1105, while being separated one by one by the retard roller 1107, and then proceeds to step S1204 (FIG. 11). In the following description, it is assumed that the original 1090 corresponds to the original 1090*b* in FIG. 11.

In step S1204, the CPU 1300A causes the MICR reading unit 1106 to read MICR characters 1091 printed on the original 1090*b*, and proceeds to step S1205.

Since the original 1090*b* reaches the MICR reading unit 1106 upon elapse of $L1/v$, where $L1$ represents a distance between the pre-registration sensor 1112 and the MICR reading unit 1106 and v represents the conveyance speed of the original 1090*b*, the CPU 1300A performs time measurement using a timer (not shown) and causes the MICR reading unit 1106 to read MICR characters 1091 on the original 1090*b* upon elapse of $L1/v$ from when the leading end of the original 1090*b* has passed through the pre-registration sensor 1112.

In step S1205, the CPU 1300A causes the reading unit 1108 to read an image of the front side of the original 1090b, and proceeds to step S1206.

Since the original 1090b reaches the reading unit 1108 upon elapse of L2/v, where L2 represents a distance between the pre-registration sensor 1112 and the reading unit 1108 and v represents the conveyance speed of the original 1090b, the CPU 1300A performs time measurement by using a timer (not shown) and causes the reading unit 1108 to start reading an image of the front side of the original 1090b upon elapse of L2/v from when the leading end of the original 1090b has passed through the pre-registration sensor 1112.

In step S1206, the CPU 1300A transfers the read MICR information and the front side image information of the original 1090b to the host computer 1301 via the communication cable 1302, and proceeds to step S1207.

In step S1207, the CPU 1300A performs a process for determining the need for stopping the original 1090b in the first conveying path 1116 (FIG. 12), and proceeds to step S1208.

Figure 13:
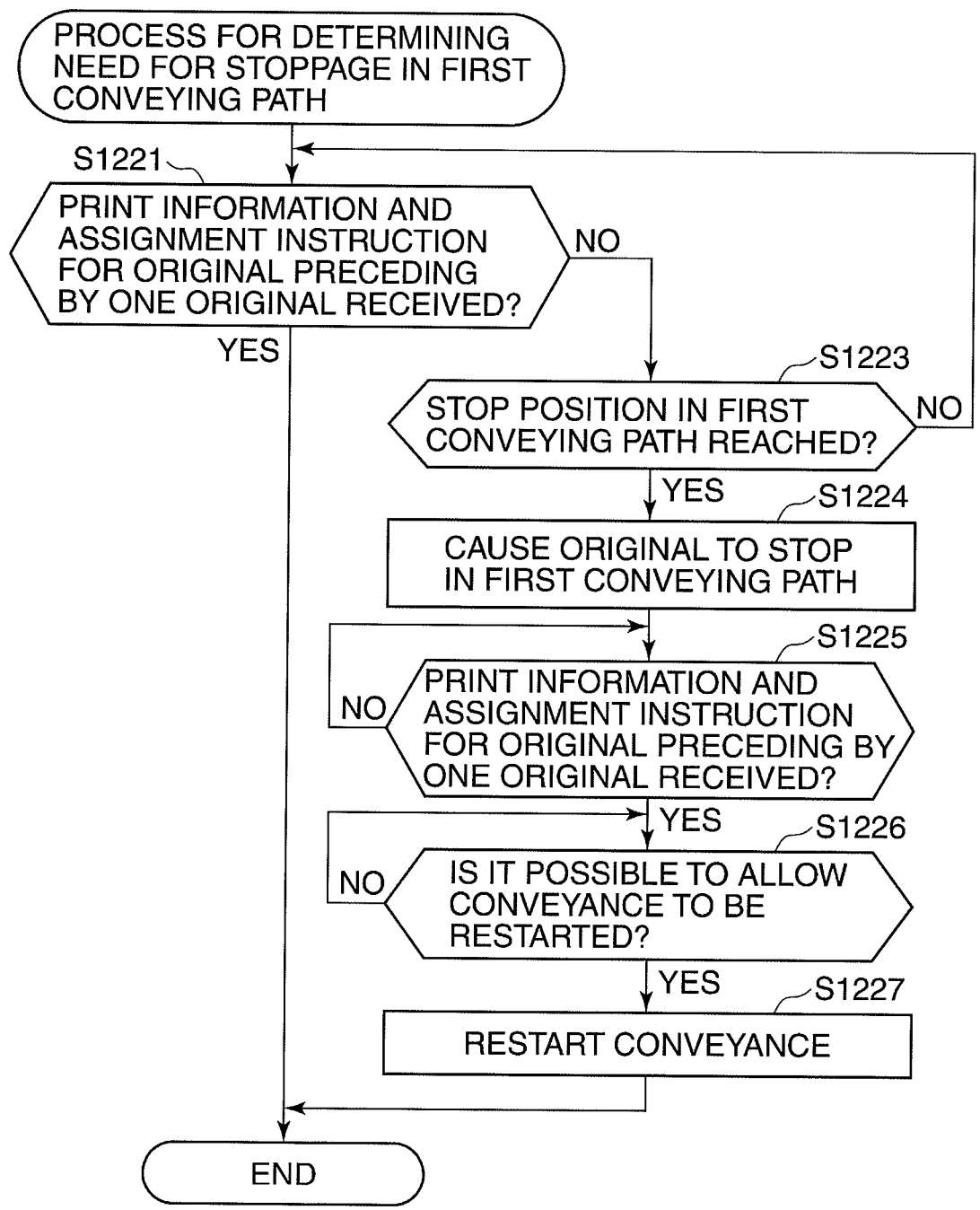
FIG. 13 is a flowchart for explaining a process performed in step S1207 in FIG. 10 to determine the need for stopping an original in the first conveying path.

FIG. 13 is a flowchart for explaining the process performed in step S1207 in FIG. 10 to determine the need for stopping the original 1090b in the first conveying path 1116.

In step S1221 in FIG. 13, the CPU 1300A determines whether it has received from the host computer 1301 print information and a result of assignment destination determination (assignment instruction) for an original 1090a conveyed precedently by one sheet.

Print information and a result of assignment destination determination for the original 1090a are created by the host computer 1301 based on the MICR information and the front side image information for the original 1090a preceding by one sheet, which have been transferred to the host computer 1301 in step S1206 in FIG. 10.

If the CPU 1300A has received from the host computer 1301 print information and a result of assignment destination determination for the original 1090a preceding by one sheet or if the original 1090b is a first original, the CPU 1300A completes the process for determining the need for stopping the original 1090b in the first conveying path 1116.

On the other hand, in a case that print information and a result of assignment destination determination for the original 1090a preceding by one sheet have not been received from the host computer 1301, the CPU 1300A proceeds to step S1223.

In step S1223, the CPU 1300A monitors whether it receives from the host computer 1301 print information and a result of assignment destination determination for the original 1090a preceding by one sheet until the original 1090b reaches the stop position in the first conveying path 1116.

Since the original 1090b reaches the stop position in the first conveying path 1116 upon elapse of L3/v, where L3 represents a distance between the pre-registration sensor 1112 and the stop position in the first conveying path 1116 and v represents the conveyance speed of the original 1090, the CPU 1300A performs time measurement by using a timer (not shown) and determines that the original 1090b reaches the stop position in the first conveying path 1116 upon elapse of L3/v from when the leading end of the original 1090 has passed through the pre-registration sensor 1112.

In a case where the original 1090b reaches the stop position in the first conveying path 1116 but the CPU 1300A has not received from the host computer 1301 print information and a result of assignment destination determination for the original 1090a preceding by one sheet, the CPU 1300A proceeds to step S1224.

In step S1224, since the original 1090a has been or will be caused to stop in the second conveying path 1118, the CPU 1300A controls the first conveyance mechanism to cause the original 1090b to stop in the first conveying path 1116, and then proceeds to step S1225.

In step S1225, the CPU 1300A waits for receiving from the host computer 1301 print information and a result of assignment destination determination for the original 1090a preceding by one sheet, and proceeds to step S1226 upon reception thereof.

Even if the original stopping in the first conveying path 1116 has the longest length of originals conveyable by the image reading apparatus, the trailing end of the original is required to have passed through the MICR reading unit 1106 and the reading unit 1108.

In this embodiment, therefore, the first conveying path 1116 has its conveying path length equal to or longer than the longest length of originals conveyable by the image reading apparatus.

Specifically, the longest length of originals conveyable by an image reading apparatus specialized to deal with bills is usually equal to the length of business check, i.e., 213 mm. In this embodiment, therefore, the conveying path length from the downstream end of the reading unit 1108 to a position short of the conveying roller pair 1104b, which is the downstream end of the first conveying path 1116, is set to be equal to the sum of 213 mm and a braking distance required to cause an original to stop.

In step S1226, the CPU 1300A determines whether it is possible to allow conveyance of the original 1090b to be restarted, and proceeds to step S1227 if it is possible to allow conveyance of the original 1090b to be restarted.

In a case where there is no original 1090a in the second conveying path 1118 or in a case where conveyance of the original 1090a preceding by one sheet has been restarted and hence the original 1090b, if fed, will not collide with the original 1090a, the CPU 1300A determines that it is possible to allow conveyance of the original 1090b to be started.

In step S1227, the CPU 1300A restarts conveyance of the original 1090b, and completes the process for determining the need for stopping the original 1090b in the first conveying path 1116.

Referring to FIG. 10 again, in step S1208, the CPU 1300A causes the original 1090b to be conveyed to the second conveying path 1118, and proceeds to step S1209.

In step S1209, since the original 1090b is conveyed from the first conveying path 1116 to the second conveying path 1118 and hence there is no original in the first conveying path 1116, the CPU 1300A allows the next original to be fed, and proceeds to step S1210.

When the next original is fed from the mounting unit 1110, processing on the next fed original is started from step S1201.

In step S1210, the CPU 1300A performs a process for determining the need for stopping the original 1090b in the second conveying path 1118, and proceeds to step S1211.

Figure 14:
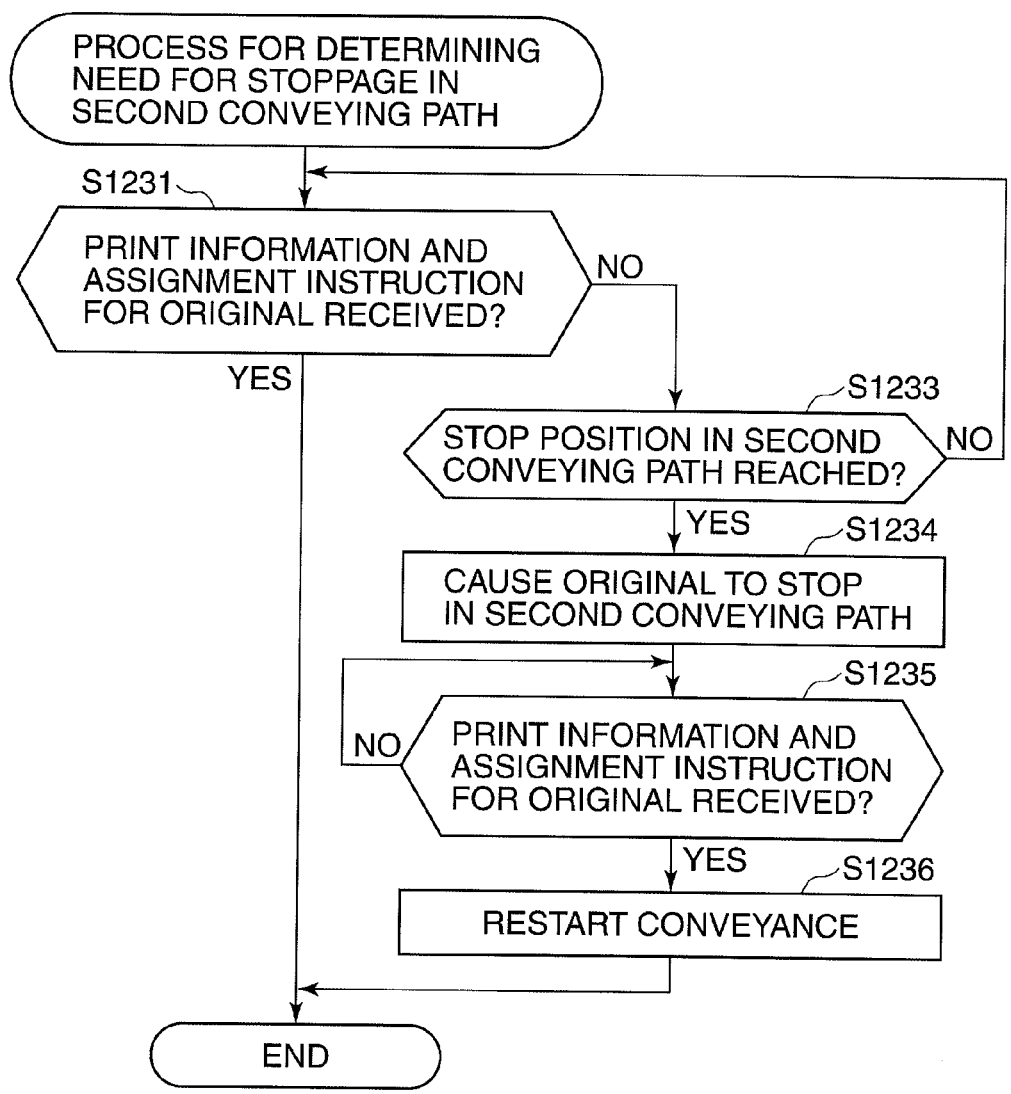
FIG. 14 is a flowchart for explaining a process performed in step S1210 in FIG. 10 to determine the need for stopping an original in the second conveying path.

FIG. 14 is a flowchart for explaining the process performed in step S1210 in FIG. 10 to determine the need for stopping the original 1090b in the second conveying path 1118.

In step S1231 in FIG. 14, the CPU 1300A determines whether it has received from the host computer 1301 print information and a result of assignment destination determination (assignment instruction) for the original 1090b.

Print information and a result of assignment destination determination for the original 1090b are created by the host computer 1301 based on at least one of the MICR information and the front side image information for the original 1090*b*, which have been transferred to the host computer 1301 in step S1206 in FIG. 10.

If the CPU 1300A has received print information and a result of assignment destination determination for the original 1090*b* from the host computer 1301, the CPU 1300A completes the process for determining the need for stopping the original 1090*b* in the second conveying path 1118, without stopping conveyance of the original 1090*b*.

On the other hand, if the CPU 1300A has not received print information and a result of assignment destination determination for the original 1090*b* from the host computer 1301, the CPU 1300A proceeds to step S1233.

In step S1233, the CPU 1300A monitors whether it receives print information and a result of assignment destination determination for the original 1090*b* from the host computer 1301, while conveying the original 1090*b* so as to reach the stop position in the second conveying path 1118.

Since the original 1090*b* will reach the stop position in the second conveying path 1118 upon elapse of L4/v, where L4 represents a distance between the original presence/absence sensor 1109 and the stop position of the second conveying path 1118 and v represents the conveyance speed of the original 1090*b*, the CPU 1300A performs time measurement by using a timer (not shown) and determines that the original 1090*b* reaches the stop position in the second conveying path 1118 upon elapse of L4/v from when the leading end of the original 1090*b* has passed through the original presence/absence sensor 1109.

The CPU 1300A proceeds to step S1234 in a case where the original 1090*b* reaches the stop position in the second conveying path 1118, but the CPU 1300A has not received from the host computer 1301 print information and a result of assignment destination determination for the original 1090*b*.

In step S1234, the CPU 1300A causes the original 1090*b* to stop in the second conveying path 1118, and proceeds to step S1235.

In step S1235, the CPU 1300A waits for receiving print information and a result of assignment destination determination (assignment instruction) for the original 1090*b* from the host computer 1301, and proceeds to step S1236 upon reception thereof.

Since the trailing end of an original stopping in the second conveying path 1118 is required to have passed through the conveying roller pair 1104*b* even if the original has the longest length of originals conveyable by the image reading apparatus 1300, it is necessary for the second conveying path 1118 to have its conveying path length equal to or longer than the longest length of originals conveyable by the image reading apparatus 1300.

As described previously, in this embodiment, the conveying path length from the conveying roller 1104 (upstream end of the second conveying path 1118) to the upstream end of the print unit 1114 is set to be equal to or longer than the longest length of originals conveyable by an image reading apparatus specialized to deal with bills (i.e., the length of business check (213 mm)). It should be noted that if originals are required to pass through the after-registration sensor 1113 at a constant speed, the conveying path length is preferably set to the sum of the longest length of originals and an accelerating distance required for the original conveyance speed to reach the constant speed.

In step S1236, the CPU 1300A restarts conveying the original 1090*b*, and then completes the process for determining the need for stopping the original 1090*b* in the second conveying path 1118.

Referring to FIG. 10 again, in step S1211, the CPU 1300A causes the original 1090*b* to be conveyed downstream, and proceeds to step S1212 when detecting that the leading end of the original 1090*b* passes through the after-registration sensor 1113.

In step S1212, since the original 1090*b* is conveyed downstream of the second conveying path 1118 and the next original is conveyed from the first conveying path 1116 to the second conveying path 1118, the CPU 1300A allows an original placed on the mounting unit 1100 to be fed, and proceeds to step S1213.

When the original is fed from the mounting unit 1100, processing on the fed original is started from step S1201.

In step S1213, the CPU 1300A causes the print unit 1114 to print the print information received from the host computer 1301 onto the original 1090*b*, and proceeds to step S1214.

Since the original 1090*b* reaches the print unit 1114 upon elapse of L5/v, where L5 represents a distance between the after-registration sensor 1113 and the print unit 1114 and v represents the conveyance speed of original 1090*b*, the CPU 1300A performs time measurement by using a timer (not shown) and causes the print unit 1114 to print the print information received from the host computer 1301 onto the original 1090*b* upon elapse of L5/v from when the leading end of the original 1090*b* has passed through the after-registration sensor 1113.

In step S1214, the CPU 1300A causes the reading unit 1115 to read an image of the back side of the original 1090*b*, transmits the read back-side image information to the host computer 1301 via the communication cable 1302, and proceeds to step S1215.

Since the original 1090*b* reaches the reading unit 1115 upon elapse of L6/v, where L6 represents a distance between the after-registration sensor 1113 and the reading unit 1115, the CPU 1300A performs time measurement by using a timer (not shown) and causes the reading unit 1115 to start reading a back side image of the original 1090*b* upon elapse of L6/v from when the leading end of the original 1090*b* has passed through the after-registration sensor 1113.

In step S1215, based on the result of assignment destination determination for the original 1090*b* received from the host computer 1301, the CPU 1300A assigns and conveys the original 1090*b* to either the first sheet discharge unit 1102 or the second sheet discharge unit 1103, and completes the process. In respect of other constructions, functions, and effects, this embodiment is the same as or similar to the first embodiment.

Next, a description will be given of a third embodiment of this invention.

Figure 15:
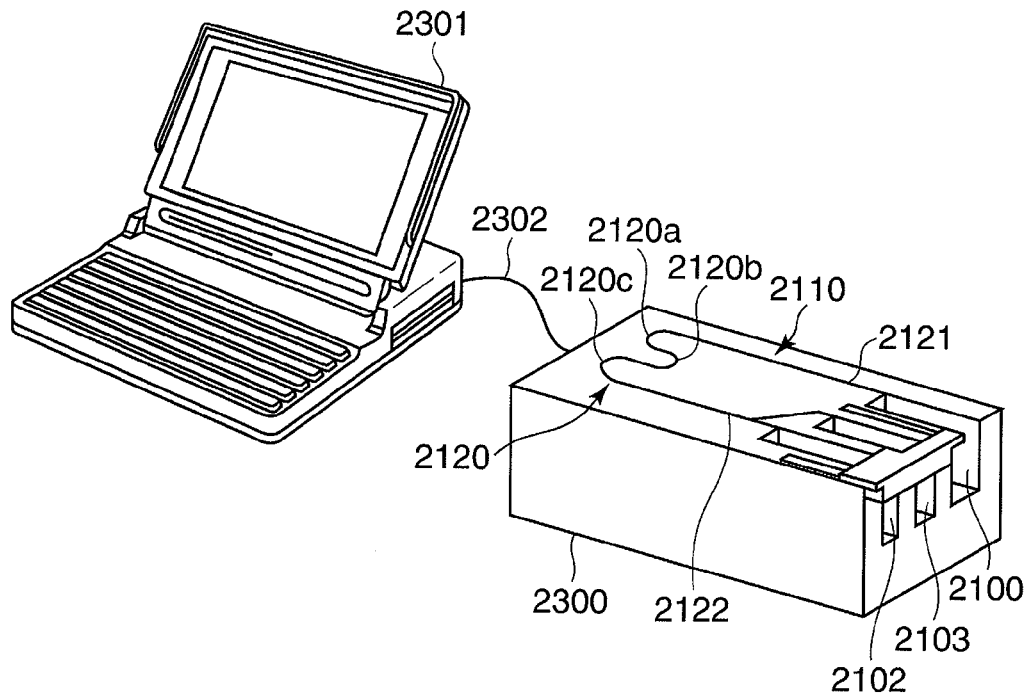
FIG. 15 is a perspective view for explaining an image reading apparatus, which is an example of an original processing apparatus according to a third embodiment of this invention.
Figure 16:
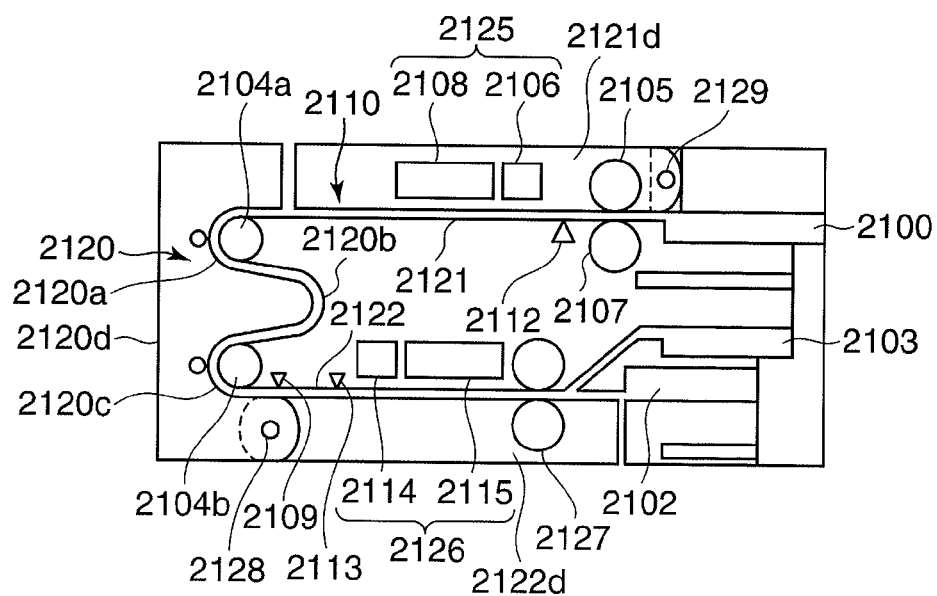
FIG. 16 is a plan view of the image reading apparatus shown in FIG. 15.
Figure 17:
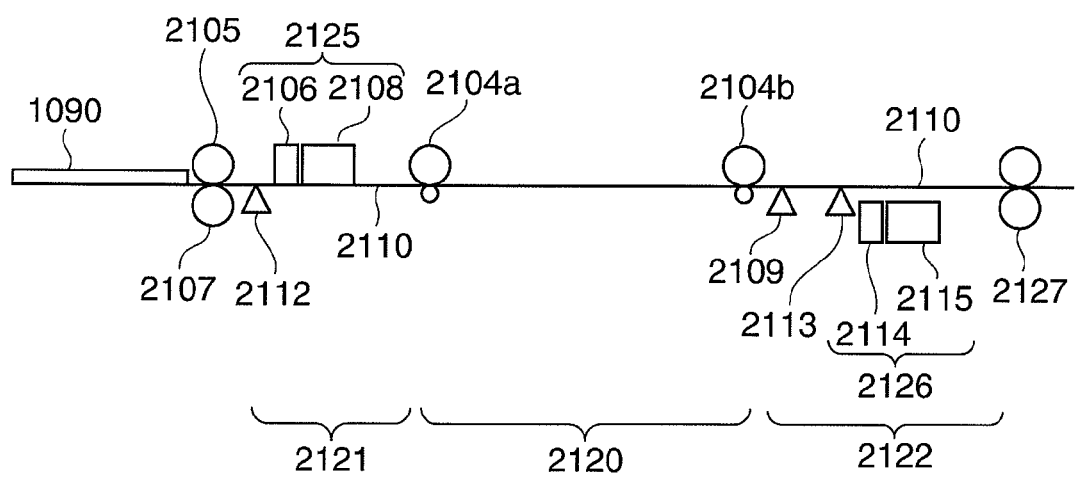
FIG. 17 is a development view of a conveying path of the image reading apparatus in FIG. 15.

FIG. 15 is a perspective view for explaining an image reading apparatus which is an example of an original processing apparatus according to the third embodiment of this invention, FIG. 16 is a plan view of the image reading apparatus in FIG. 15, and FIG. 17 is a development view of a conveying path in the image reading apparatus in FIG. 15.

Referring to FIG. 15, an image reading apparatus 2300 which is an example of an original processing apparatus of this embodiment is, e.g., a check scanner apparatus for magnetically or optically reading MICR characters 1091 printed in magnetic ink at a predetermined position on the original 1090 shown in FIG. 51.

Specifically, the image reading apparatus 2300 includes a mounting unit 2100, a conveying path 2110, a first sheet discharge unit 2102, and a second sheet discharge unit 2103, and is connected for communication with a host computer 2301 (information processing apparatus) via a communication cable 2302, to thereby constitute an image reading system which is an example of an original processing system. The conveying path 2110 is mainly comprised of a curved conveying path 2120, an upstream conveying path 2121, and a downstream conveying path 2122. The connection between the image reading apparatus 2300 and the host computer 2301 may be a wire connection such as the communication cable 2302, but may be a wireless connection.

As shown in FIGS. 16 and 17, the upstream conveying path 2121 is a region of the conveying path 2110 from a roller pair of a retard roller 2107 and a feed roller 2105 to the upstream of a conveying roller pair 2104a, the curved conveying path 2120 is a region from the upstream of the conveying roller pair 2104a to the downstream of a conveying roller pair 2104b, and the downstream conveying path 2122 is a region from the downstream of the conveying roller pair 2104b to a sheet discharge roller pair 2127. In this embodiment, the conveying path 2110 is formed into, e.g., a slit shape that opens to an upper part of the apparatus main body.

The curved conveying path 2120 has a conveying path length equal to or longer than two times the longest length (length of business check (213 mm)) of originals conveyable by the image reading apparatus 2300. To prevent the apparatus from being large in size, it is usually preferable that the conveying path length be set to be equal to or longer than two times the longest length of conveyable originals and to be equal to or less than five times the longest length of conveyable originals. More preferably, the conveying path length is set to be equal to or longer than two times the longest length of conveyable originals and to be equal to or less than three times the longest length of conveyable originals. For example, the conveying path length is longer than the sum of two times the longest length of originals conveyable by the image reading apparatus 2300 and a braking distance required to cause an original to stop. The downstream conveying path 2122 has a conveying path length shorter than the length of business check and set to the sum of a length of 152 mm called personal check (or American check) and an accelerating distance.

In this embodiment, the curved conveying path 2120 is formed into, e.g., an M-shape, and includes a first U-turn unit 2120a, a second U-turn unit 2120b, and a third U-turn unit 2120c. The second U-turn unit 2120b is U-turned in a direction reverse to a U-turn direction of the first U-turn unit 2120a, and the third U-turn unit 2120c is U-turned in a direction reverse to the U-turn direction of the second U-turn unit 2120b.

The roller pair of the retard roller 2107 and the feed roller 2105 is disposed in the upstream conveying path 2121 on the upstream side of the curved conveying path 2120. A feeding unit is constituted by the retard roller 2107 and the feed roller 2105. A MICR character reading unit 2106 and a reading unit 2108 are disposed adjacent to the roller pair of the retard roller 2107 and the feed roller 2105. A first processing unit 2125 is constituted by the MICR character reading unit 2106 and the reading unit 2108 (first reading unit). A pre-registration sensor 2112 for detecting arrival and passage of an original is disposed between the roller pair of the retard roller 2107 and the feed roller 2105 and the first processing unit 2125. It should be noted that the MICR character reading unit 2106 and the image reading unit 2108 can be disposed reversely.

A conveying roller pair 2104a as a first conveyance unit is disposed along the first U-turn unit 2120a of the curved conveying path 2120, and a conveying roller pair 2104b as a second conveyance unit is disposed along the third U-turn unit 2120c.

A print unit 2114 as a printing unit and a reading unit 2115 as a second reading unit are disposed along the downstream conveying path 2122 on the downstream side of the curved conveying path 2120. A second processing unit 2126 is constituted by the print unit 2114 and the reading unit 2115. An original presence/absence sensor 2109 and an after-registration sensor 2113 are disposed in sequence between the conveying roller pair 2104b and the second processing unit 2126 in the direction of conveyance of the original 1090.

The mounting unit 2100 for feeding an original 1090 to the conveying path 2110 is disposed upstream of the roller pair of the retard roller 2107 and the feed roller 2105, and the sheet discharge roller pair 2127 is disposed downstream of the second processing unit 2126. The sheet discharge roller pair 2127 discharges an original 1090 on which various processing have been performed to either the first sheet discharge unit 2102 or the second sheet discharge unit 2103, each as an original sheet discharge unit.

The image reading apparatus 2300 includes a control unit (not shown) for driving the conveying roller pairs 2104a, 2104b independently of each other, and a transmission unit for transmitting information on an original 1090 acquired by the first processing unit 2125 to the information processing apparatus as external unit equipment.

After the fed original 1090 passes through the registration sensor 2112, MICR characters 1091 on the original are read by the MICR character reading unit 2106, and then an image of the front side of the original is read by the reading unit 2108. At that time, based on a signal produced when the leading end of the original 1090 reaches the registration sensor 2112, the image reading apparatus 2300 calculates a timing for the MICR character reading unit 2106 to start reading the MICR characters and a timing for the reading unit 2108 to start reading the front side image. Then, the MICR characters 1091 printed on a lower end of the front side of the original 1090 and the front side image are read in these timings.

The transmission unit of the image reading apparatus 2300 transmits MICR information and front side image information read by the first processing unit 2125 to the host computer 2301 via the communication cable 2302.

Based on the MICR information and the front side image information transmitted from the image reading apparatus 2300, the host computer 2301 creates print information to be printed on the back side of the original 1090 to indicate that processing has been performed on the original 1090, and then determines a sheet discharge destination for the original 1090. The created print information and a result of discharge destination determination for the original 1090 are transmitted from the host computer 2301 to the image reading apparatus 2300 via the communication cable 2302.

Upon reception of the print information and the result of sheet discharge destination determination, the image reading apparatus 2300 calculates a timing for the print unit 2114 to start printing the print information based on a signal produced when the leading end of the original 1090 reaches the after-registration sensor 2113, and performs printing at the calculated timing. The image reading apparatus 2300 calculates a timing for the back side image reading unit 2115 to read the back side image of the original 1090 based on the signal produced when the leading end of the original 1090 reaches the after-registration sensor 2113, and reads the back side image at the calculated timing.

Subsequently, based on the result of sheet discharge destination determination for the original 1090 received from the host computer 2301, the image reading apparatus 2300 assigns and conveys the original 1090 whose back side image has been read to either the first sheet discharge unit 2102 or second sheet discharge unit 2103.

In the image reading apparatus 2300 of this embodiment formed with the above-described conveyance path, the conveying paths such as the curved conveying path 2120 are formed in an open and close unit provided in the apparatus main body so as to be openable and closable. More specifically, the open and close unit that forms the curved conveying path 2120, the upstream conveying path 2121, and the downstream conveying path 2122 has a casing as a constituent member of the image reading apparatus 2300. The casing is configured so as to be openable and closable relative to the apparatus main body, and constitutes a part of an open and close mechanism that can be disassembled and assembled along the conveying paths.

Figure 18:
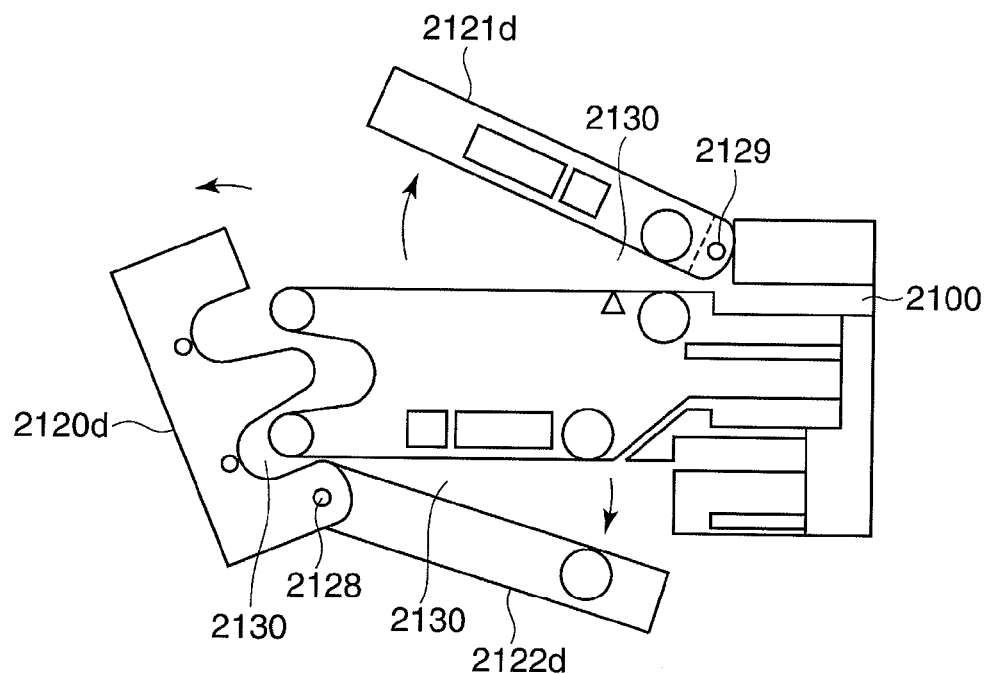
FIG. 18 is a plan view for explaining an open and close mechanism of the image reading apparatus in FIG. 15.

FIG. 18 is a plan view for explaining the open and close mechanism of the image reading apparatus in FIG. 15.

As shown in FIG. 18, a casing unit 2121d forming the upstream conveying path 2121 is horizontally rotatably attached to the apparatus main body by a pivot unit having a pivot shaft (hereinafter referred to as the hinge shaft) 2129 provided as a rotary shaft near the mounting unit 2100. Thus, the upstream conveying path 2121 can be disassembled and assembled (i.e., openable and closable) along an opening and closing unit 2130 for the conveying path. The casing unit 2120d, as a conveying path constituent member corresponding to the curved conveying path 2120, is horizontally openable and closable about a hinge shaft 2128 provided as a rotary shaft at a boundary between the curved conveying path 2120 and the downstream conveying path 2122, whereby the curved conveying path 2120 can be disassembled and assembled along the opening and closing unit 2130 for the curved conveying path. A casing unit 2122d forming the downstream conveying path 2122 is horizontally openable and closable about the hinge shaft 2128 provided as a rotary shaft (which is the same as (coaxial with) the rotary shaft for the casing 2120d forming the curved conveying path) at a boundary between the downstream conveying path 2122 and the curved conveying path 2120, whereby the downstream conveying path 2122 can be disassembled and assembled along the opening and closing unit 2130 for the conveying path.

In FIG. 18, the casing 2120d forming the curved conveying path 2120, the casing 2121d forming the upstream conveying path 2121, and the casing 2122d forming the downstream conveying path 2122 are opened by the open and close mechanism. Since the casings for the conveying paths are configured to be able to open and close the conveying paths, maintenance ability at roller cleaning can be improved and jam processing upon occurrence of conveyance failure can easily be carried out.

Next, with reference to FIG. 19, a description will be given of an installation position of the hinge shaft 2128, which is common to the casing 2120d forming the curved conveying path 2120 and the casing 2122d forming the downstream conveying path 2122.

Figure 19:
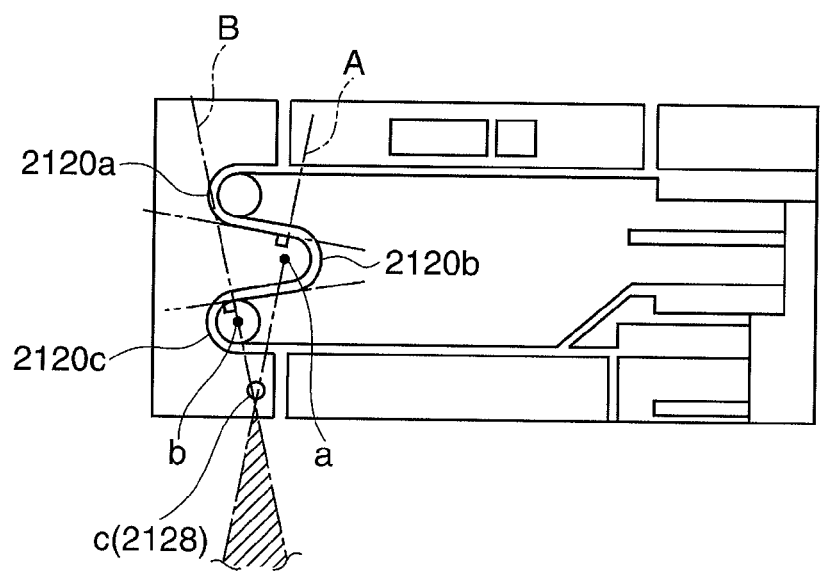
FIG. 19 is a plan view for explaining a position of a pivot shaft in the open and close mechanism of the image reading apparatus shown in FIG. 18.

FIG. 19 is a plan view for explaining the position of the pivot shaft of the open and close mechanism of the image reading apparatus in FIG. 18.

In FIG. 19, a chain line A is a straight line extending perpendicular to an entry portion of the second U-turn unit 2120b of the curved conveying path 2120 and passing through the center a of a circular arc forming the second U-turn unit 2120b. A chain line B is a straight line extending perpendicular to an entry portion of the third U-turn unit 2120c and passing through the center b of a circular arc forming the third U-turn unit 2120c. By providing the hinge shaft in a region (hatched region in FIG. 19) below an intersection c between the chain lines A and B and defined by the chain lines A and B, the casing 2120d forming the curved conveying path 2120 is rotatable without interfering with the apparatus main body. In this embodiment, to make the entire apparatus compact, the hinge shaft 2128 which is the center of rotation of the casing 2120d forming the curved conveying path 2120 is located at the intersection c between the chain lines A and B.

Next, with reference to FIGS. 20 to 25, the operation of the image reading apparatus 2300 of this embodiment will be described.

Figure 20:
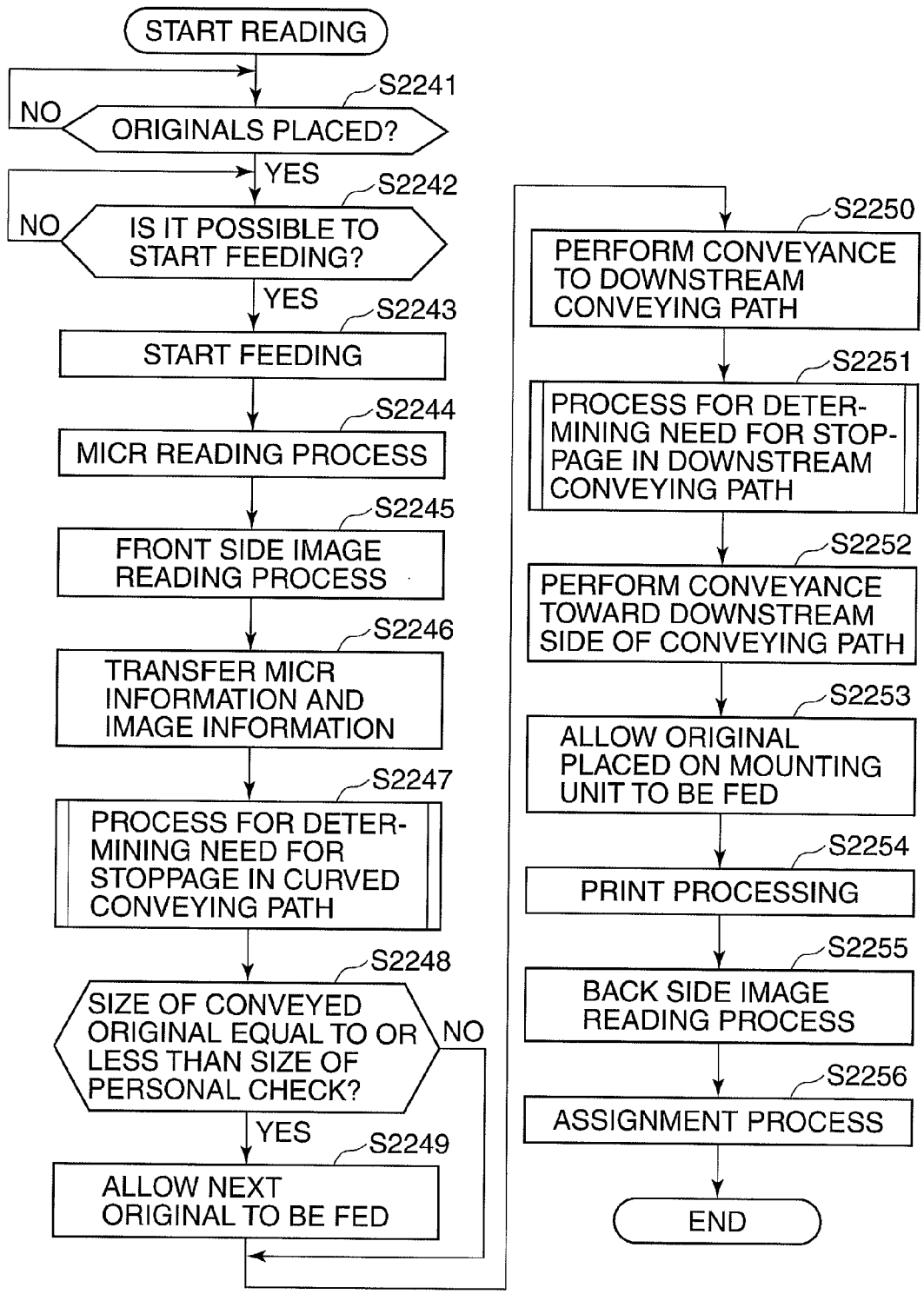
FIG. 20 is a flowchart showing an operation of the image reading apparatus of the third embodiment.
Figure 21:
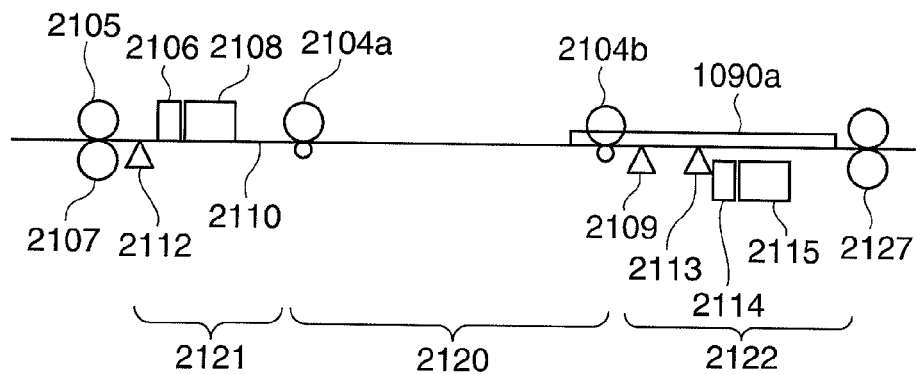
FIG. 21 is a development view of a conveying path for explaining an example operation of the image reading apparatus of the third embodiment.
Figure 22:
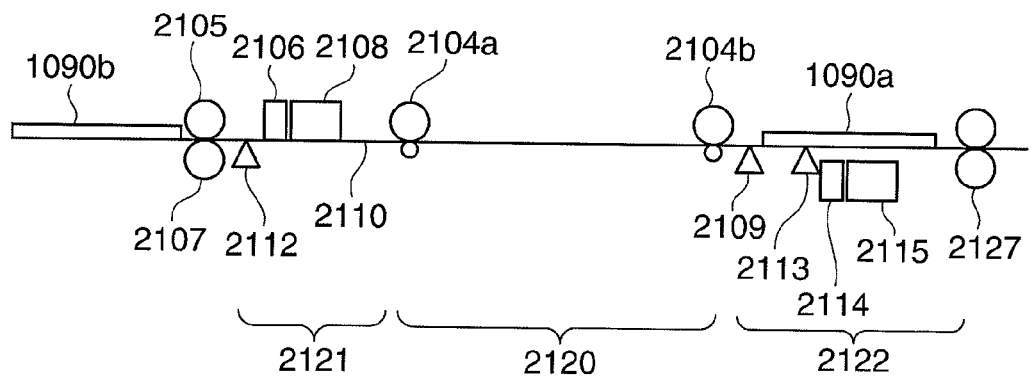
FIG. 22 is a development view of the conveying path for further explaining the example operation of the image reading apparatus.
Figure 23:
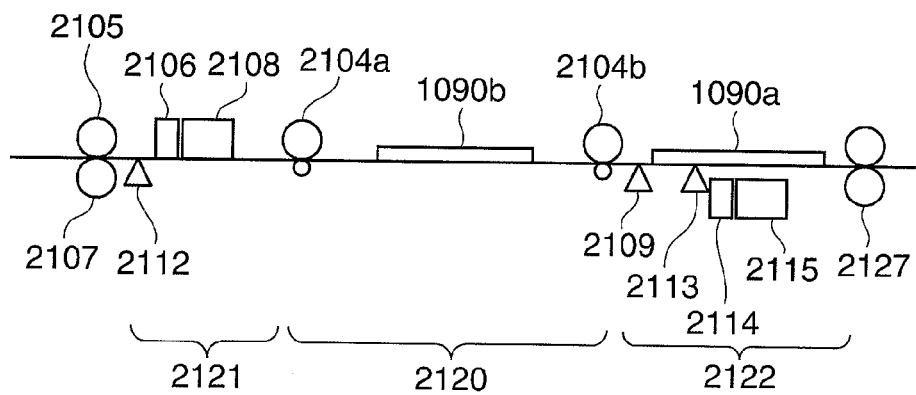
FIG. 23 is a development view of the conveying path for further explaining the example operation of the image reading apparatus.

FIG. 20 is a flowchart showing the operation of the image reading apparatus, and FIGS. 21 to 23 are development views showing an example operation of the image reading apparatus. To execute the process in FIG. 20, a control program stored in a ROM or a hard disk (not shown) of the image reading apparatus 2300 is loaded into a RAM (not shown) and the loaded program is executed by a CPU (not shown and hereinafter referred to as the CPU 2300A).

In step S2241 in FIG. 20, when receiving an instruction to start a reading process from the host computer 2301 via the communication cable 2302, the CPU 2300A determines via a sheet detecting sensor (not shown) whether originals 1090a are placed on the mounting unit 2100 (FIG. 21).

If originals 1090a are placed on the mounting unit 2100, the CPU proceeds to step S2242.

In step S2242, the CPU 2300A determines whether it is possible to start feeding originals 1090a from the mounting unit 2100. If the feeding is possible, the CPU proceeds to step S2243.

The CPU 2300A determines that it is possible to start feeding originals 1090a when any of requirements is satisfied, these requirements being the same as the requirements (1) to (3) for determination by the CPU 1300A in the first embodiment whether it is possible to start feeding originals 1090.

It should be noted that in this embodiment, only information representing a result of MICR determination or only print information or only assignment destination information can be used as control information. Print information and assignment destination information can be created by the control unit of the image reading apparatus 2300 or the like based on, e.g., a result of MICR determination. In this embodiment, two sheet discharge units are provided as assignment destinations. However, one sheet discharge unit or three or more sheet discharge units can be provided. The assignment destinations in this embodiment are the first and second sheet discharge units 2102, 2103 for discharging originals. The host computer 2301 determines either the first sheet discharge unit 2102 or the second sheet discharge unit 2103 as assignment destination. For example, the setting can be such that originals for which the determination of MICR characters 1091 has been completed are discharged to the first sheet discharge unit 2102 and originals for which the determination of MICR characters 1091 has not been completed are discharged to the second sheet discharge unit 2103.

The CPU 2300A determines that it is possible to start conveying originals 1090a placed on the mounting unit 2100, if any of the requirements (1) to (3) is satisfied.

Next, in step S2243, the CPU 2300A causes originals 1090a placed on the mounting unit 2100 to be fed to the upstream conveying path 2121 by the feed roller 2105, while being separated one by one by the retard roller 2107 (FIG. 22), and then proceeds to step S2244 to perform predetermined processing. In the following, it is assumed that originals to be described correspond to originals 1090b in FIG. 22.

In step S2244, the CPU 2300A causes the MICR character reading unit 2106 to read MICR characters 1091 printed on the original 1090*b* being conveyed by the sheet feed roller 105, and proceeds to step S2245.

The MICR character reading unit 2106 reads the MICR characters 1091 on the original 1090*b* in the same timing as the timing where MICR characters 1091 on an original 1090*b* are read by the MICR reading unit 1106 in the first embodiment.

In step S2245, the CPU 2300A causes the reading unit 2108 to read an image of the front side of the original 1090*b*, and proceeds to step S2246.

The reading unit 2108 reads the front side image of the original 1090*b* in the same timing as the timing where a front side image of an original 1090*b* is read by the reading unit 1108 in the first embodiment.

In step S2246, the CPU 2300A causes the transmission unit to transfer the read MICR information and the front side image information for the original 1090*b* to the host computer 2301 via the communication cable 2302, and proceeds to step S2247.

In step S2247, the CPU 2300A performs a process for determining the need for stopping the original 1090*b* in the curved conveying path 2120, and proceeds to step S2248.

Figure 24:
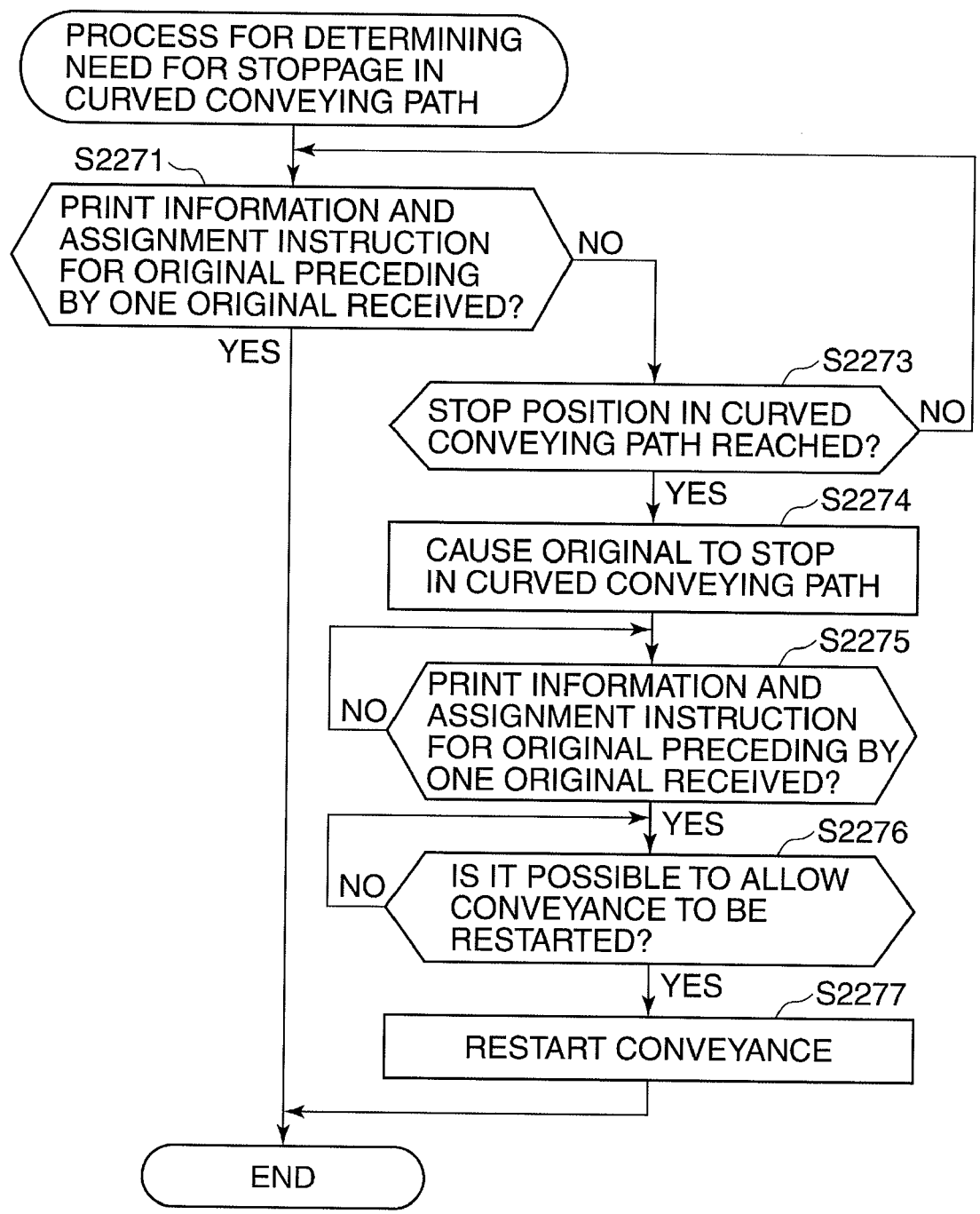
FIG. 24 is a flowchart showing a process performed in step S2247 in FIG. 20 to determine the need for stopping an original in a curved conveying path.

FIG. 24 is a flowchart showing the process performed in step S2247 in FIG. 20 to determine the need for stopping an original 1090*b* in the curved conveying path 2120.

In step S271 in FIG. 24, the CPU 2300A determines whether it has received from the host computer 2301 print information and a result of assignment destination determination (assignment instruction) for an original 1090*a* conveyed precedently by one sheet.

The print information and the result of assignment destination determination (control information) for the original 1090*a* are created by the host computer 2301 based on the MICR information and the front side image information for the original 1090*a* preceding by one sheet transferred to the host computer 2301 in step S2246.

In a case where the CPU 2300A has received from the host computer 2301 the print information and the result of assignment destination determination for the original 1090*a* preceding by one sheet or in a case where the original 1090*b* is a first original, the CPU 2300A completes the process for determining the need for stopping the original 1090*b* in the curved conveying path 2120, without stopping conveyance of the original 1090*b*.

On the other hand, in a case where the CPU 2300A has not received from the host computer 2301 the print information and the result of assignment destination determination for the original 1090*a* preceding by one sheet, the CPU 2300A proceeds to step S2273.

In step S2273, until the original 1090*b* being conveyed by the conveying roller pair 2104*a* reaches the stop position in the curved conveying path 2120, the CPU 2300A monitors whether it receives from the host computer 2301 the print information and the result of assignment destination determination for the original 1090*a* preceding by one sheet.

Since the original 1090*b* will reach the stop position in the curved conveying path 2120 upon elapse of L7/v, where L7 represents a distance between the pre-registration sensor 2112 and the stop position in the curved conveying path 2120 and v represents the conveyance speed of the original 1090, the CPU 2300A performs time measurement by using a timer (not shown) and determines that the original 1090*b* reaches the stop position in the curved conveying path 2120 upon elapse of L7/v from when the leading end of the original 1090*b* has passed through the pre-registration sensor 2112. The stop position in the curved conveying path 2120 is set to a position immediately short of the conveying roller pair 2104*b*.

The CPU 2300A proceeds to step S2274 in a case where the original 1090*b* reaches the stop position in the curved conveying path 2120 but the CPU 2300A has not received from the host computer 2301 the print information and the result of assignment destination determination for the original 1090*a* preceding by one sheet.

In step S2274, since the original 1090*a* has been or will be caused to stop in the downstream conveying path 2122, the CPU 2300A controls the conveying roller pair 2104*a* so as to cause the original 1090*b* to stop in the curved conveying path 2120, and proceeds to step S2275.

The description "the original 1090*a* or 1090*b* is caused to stop in the downstream conveying path 2122 or the curved conveying path 2120 or the like" indicates that the original 1090*a* or 1090*b* is caused to stop at a position short of one of stop positions set in these conveying paths. For example, the description "the leading end of the original is caused to stop at the stop position" includes a case where the original conveyance speed is controlled and conveyance of the original is stopped such that the leading end of the original is positioned at or short of the stop position, i.e., not beyond the stop position. The description "conveyance of the original is stopped" not only includes a case where conveyance of the original is completely stopped so that the original is stationary in the conveying path, but also includes a case where the original is not stationary in the conveying path but conveyed at a low speed.

In step S2275, the CPU 2300A waits for receiving from the host computer 2301 the print information and the result of assignment destination determination (assignment instruction) for the original 1090*a* preceding by one sheet, and proceeds to step S2276 upon reception thereof.

In step S2276, the CPU 2300A determines whether it is possible to allow conveyance of the original 1090*b* to be restarted, and proceeds to step S2277 if it is possible to allow conveyance of the original 1090*b* to be restarted. At restart of conveyance, e.g., the conveyance speed of the original 1090*b* is returned to a steady speed.

In a case where there is no original 1090*a* in the downstream conveying path 2122 or in a case where conveyance of the original 1090*a* preceding by one sheet in the downstream conveying path 2122 is restarted and hence the original 1090*b*, if conveyed, will not collide with the original 1090*a*, the CPU 2300A determines that it is possible to allow conveyance of the original 1090*b* by the conveying roller pair 2104*a* to be restarted.

In step S2277, the CPU 2300A causes conveyance of the original 1090*b* by the conveying roller pair 2104*a* to restart, and completes the process for determining the need for stopping the original 1090*b* in the curved conveying path 2120.

Referring to FIG. 20 again, when determining in step S2248 that the length of the conveyed original 1090*b* is equal to or less than the size of personal check, the CPU 2300A proceeds to step S2249. When determining that the length of the conveyed original 1090*b* exceeds the size of personal check, the CPU 2300A skips step S2249 and proceeds to step S2250.

In step S2249, the CPU 2300A allows feeding the next original, and proceeds to step S2250.

When the next original is fed from the mounting unit 2100 to the conveying path 2110, processing on the next original is started from step S2241. If the length of the original 1090*b* exceeds the size of personal check, the CPU 2300A does not allow feeding the next original.

In step S2250, the CPU 2300A causes the original 1090b to be conveyed to the downstream conveying path 2122, and proceeds to step S2251.

In step S2251, the CPU 2300A performs a process for determining the need for stopping the original 1090b in the downstream conveying path 2122, while causing the original 1090b to be conveyed by the conveying roller pair 2104b, and then proceeds to step S2252.

Figure 25:
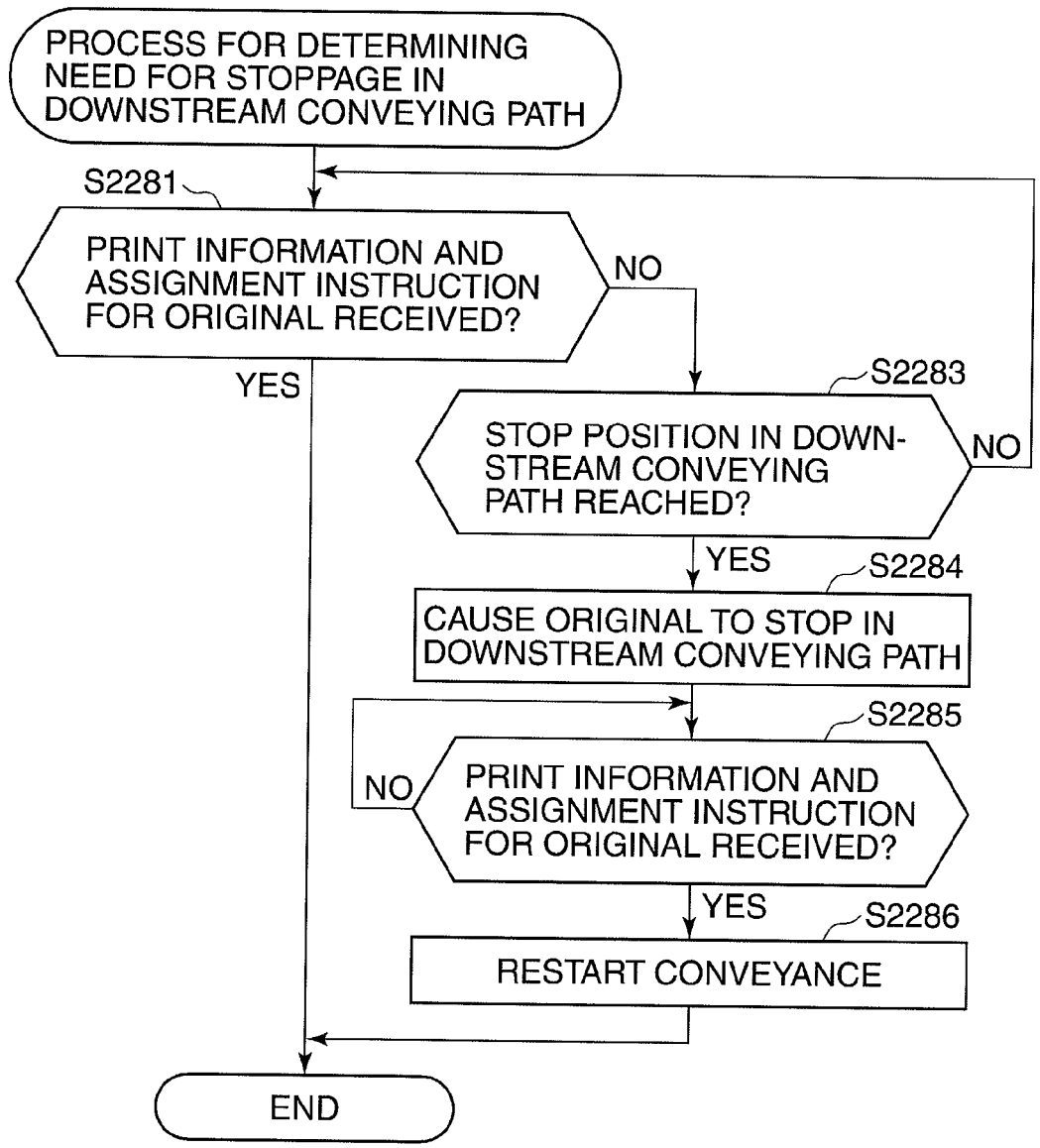
FIG. 25 is a flowchart showing a process performed in step S2251 in FIG. 20 to determine the need for stopping an original in a downstream conveying path.

FIG. 25 is a flowchart showing the process performed in step S2251 in FIG. 20 to determine the need for stopping the original 1090b in the downstream conveying path 2122.

In step S2281 in FIG. 25, the CPU 2300A determines whether it has received from the host computer 2301 print information and a result of determination of assignment destination for the original 1090b (assignment instruction).

The print information and the result of determination of assignment destination for the original 1090b are created by the host computer 2301 based on at least one of MICR information and front side image information for the original 1090b transferred to the host computer 2301 in step S2246 of FIG. 20.

If the CPU 2300A has received from the host computer 2301 the print information and the result of assignment destination determination for the original 1090b, the CPU 2300A completes the process for determining the need for stopping the original 1090b in the downstream conveying path 2122, without causing the original 1090b to stop.

On the other hand, if the CPU 2300A has not received from the host computer 2301 the print information and the result of assignment destination determination for the original 1090b, the CPU 2300A proceeds to step S2283.

In step S2283, until the original 1090b reaches the stop position in the downstream conveying path 2122, the CPU 2300A monitors whether it receives from the host computer 2301 the print information and the result of assignment destination determination for the original 1090b, while causing the original 1090b to be conveyed by the conveying roller pair 2104b. The stop position in the downstream conveying path 2122 is set at a position short of the after-registration sensor 2113 located immediately short of the print unit 2114.

Since the original 1090b will reach the stop position in the downstream conveying path 2122 upon elapse of L8/v, where L8 represents a distance between the original presence/absence sensor 2109 and the stop position in the downstream conveying path 2122 and v represents the conveyance speed of the original 1090b, the CPU 2300A performs time measurement by using a timer (not shown) and determines that the original 1090b reaches the stop position in the downstream conveying path 2122 upon elapse of L8/v from when the leading end of the original 1090b has passed through the original presence/absence sensor 2109.

The CPU 2300A proceeds to step S2284 in a case where the original 1090b reaches the stop position in the downstream conveying path 2122 but the CPU 2300A has not received from the host computer 2301 the print information and the result of assignment destination determination for the original 1090b.

In step S2284, the CPU 2300A causes the original 1090b to stop in the downstream conveying path 2122, and proceeds to step S2285.

In step S2285, the CPU 2300A waits for receiving from the host computer 2301 the print information and the result of assignment destination determination (assignment instruction) for the original 1090b, and proceeds to step S2286 upon reception thereof.

In step S2286, the CPU 2300A causes conveyance of the original 1090b by the conveying roller pair 2104b to be restarted, and completes the process for determining the need for stopping the original 1090b in the downstream conveying path 2122.

Referring to FIG. 20 again, in step S2252, the CPU 2300A causes the original 1090b to be conveyed downstream, and proceeds to step S2253 when detecting that the leading end of the original 1090b passes through the after-registration sensor 2113.

In step S2253, since the original 1090b is further conveyed downstream from the downstream conveying path 2122 and the next original is conveyed from the curved conveying path 2120 to the downstream conveying path 2122, the CPU 2300A allows an original placed on the mounting unit 2100 to be fed, and proceeds to step S2254.

When an original is fed from the mounting unit 2100, processing on the fed original is performed from step S2241.

In step S2254, the CPU 2300A causes the print unit 2114 to print the print information received from the host computer 2301 onto the original 1090b, and proceeds to step S2255.

The print unit 2114 prints the print information received from the host computer 2301 onto the original 1090b in the same timing as the timing where the print unit 1114 prints print information on the original 1090b in the first embodiment.

In step S2255, the CPU 2300A causes the reading unit 2115 to read an image, e.g., of a printed surface on the back side of the original 1090b, causes the transmission unit to transmit the read back side image information to the host computer 2301 via the communication cable 2302, and proceeds to step S2256.

The reading unit 2115 starts to read the back side image of the original 1090b in the same timing as the timing where the reading unit 1115 starts to read the back side image of the original 1090b in the first embodiment.

In step S2256, based on a result of determination of assignment destination for the original 1090b received from the host computer 2301, the CPU 2300A assigns and conveys the original 1090b either to the first sheet discharge unit 2102 or the second sheet discharge unit 2103, and completes the process.

With this embodiment, the next original 1090b can be started to be fed after the trailing end of the original 1090a has passed through the first processing unit 2125, without reception of the control information on the original 1090a transferred from the host computer 2301, whereby the original processing ability, especially the original processing speed, can be enhanced.

It should be noted that the operation of the host computer 1301 in this embodiment is the same as that in the first embodiment (FIG. 9), and a description thereof is omitted.

With the image reading apparatus 2300 of this embodiment, if the print information and the result of assignment destination determination have been received in a state that the leading end of the original is located short of the second processing unit 2126, originals can continuously be processed at high speed by the first and second processing units 2125, 2126 without being stopped in the conveying path 2110.

Specifically, in this embodiment, conveyance is controlled such that the leading end of one original is positioned short of the second processing unit 2126 at a time where control information on the processing on the one original is received after the one original has passed through the first processing unit 2125, and therefore, conveyance of the next original can be started, without the control information for the one original being received from the host computer 2301. Since the second processing can immediately be started after reception of the control information for the one original, the processing ability can be improved even when a plurality of originals are continuously processed.

With this embodiment, since the curved conveying path 2120 is provided in the conveying path 2110 and formed by the open and close unit 2130 configured to be openable and closable in the image reading apparatus, the maintenance ability can be improved. For example, when an original conveyance failure (e.g., paper jam) occurs, the entire curved conveying path 2120 can be opened at once by opening the open and close unit 2130, whereby, e.g., a damaged original can easily be removed and the maintenance ability can be improved.

Since the casing 2120*d* forming the curved conveying path 2120 is configured to be horizontally openable and closable, pressing forces by the conveying roller pairs 2104*a*, 2104*b* can be made uniform in a vertical direction in an assembled state where the casing is closed. Therefore, the original conveyance state can be stabilized.

With this embodiment, since the same hinge shaft 2128 is commonly used for the casing 2120*d* forming the curved conveying path 2120 and the casing 2122*d* forming the downstream conveying path 2122, the number of component parts can be reduced and the apparatus can be made further compact.

With this embodiment, since the conveying path length of the curved conveying path 2120 is set to be equal to or longer than two times the longest length of conveyable originals along the conveying path, a longer processing time for the host computer 2301 can be ensured, whereby the frequency of originals being made on standby or stopped in the conveying path 2110 can be suppressed to be low and hence the original processing speed can be increased. Since a part of the conveying path 2110 is formed by the curved conveying path, the entire apparatus does not become large but can rather be made compact. Specifically, the conveying path 2110 includes the first U-turn unit 2120*a*, the second U-turn unit 2120*b*, and the third U-turn unit 2120*c*, and therefore the conveying path is made long, but the apparatus can be made compact.

With this embodiment, since the conveying roller pairs 2104*a*, 2104*b* as the first and second conveyance units can be the same type, the number of component parts can be reduced, paper stress can be made uniform, and costs can be reduced.

In this embodiment, the curved conveying path 2120 is formed into an M-shape having three U-turn units, but this invention is not limited thereto. For example, the curved conveying path can be formed into a shape having four or more U-turn units as long as the open and close mechanism is not affected. To prevent a fed original 1090 from being pivoted vertically, a driven roller can be provided so as to be tilted along a vertical direction.

In this embodiment, the same hinge shaft is used for both the casing 2120*d* forming the curved conveying path 2120 and the casing 2122*d* forming the downstream conveying path 2122, but this is not limitative. Alternatively, the same hinge shaft can be used for the casing 2120*d* forming the curved conveying path 2120 and the casing 2121*d* forming the upstream conveying path 2121.

It should be noted that in the above described embodiment, the control information (control signal) including designation information such as original assignment destination and print information is received from the host computer 2301. However, the control signal can be created in the image reading apparatus 2300.

In the above embodiment, the check scanner has been described as an example, but this invention is not limited thereto. For example, this invention is applicable to an original processing apparatus and an original processing system for performing various processing such as image reading from originals (sheets) and image forming thereon.

In this embodiment, the conveyance speed of the original 1090 at the conveying roller pairs 2104*a* and 2104*b* are always adjusted to a given steady speed v.

Next, a fourth embodiment of this invention will be described.

Figure 26:
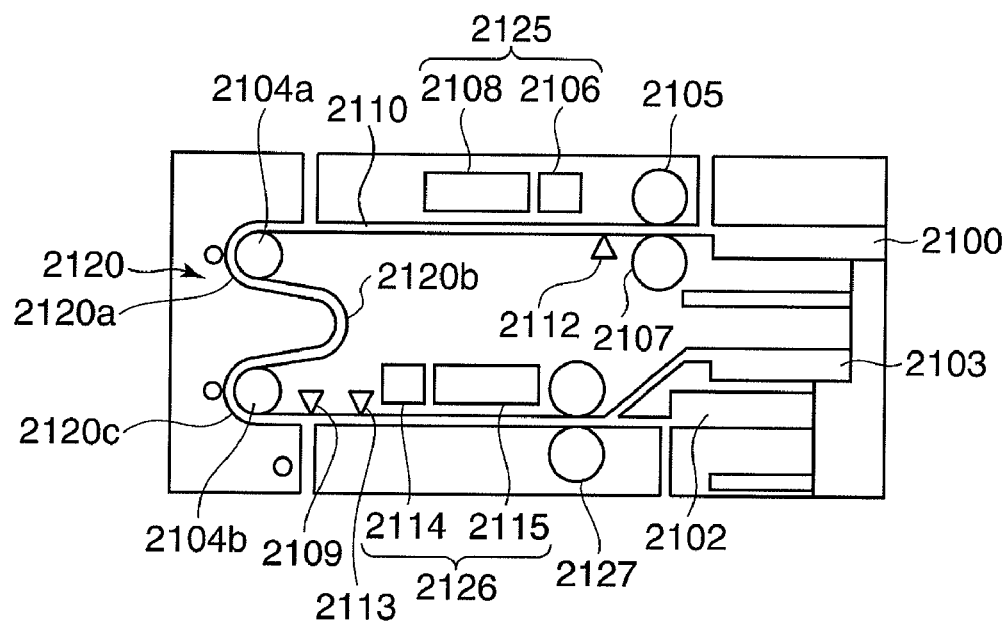
FIG. 26 is a plan view of an image reading apparatus, which is an example of an original processing apparatus according to a fourth embodiment of this invention.
Figure 27:
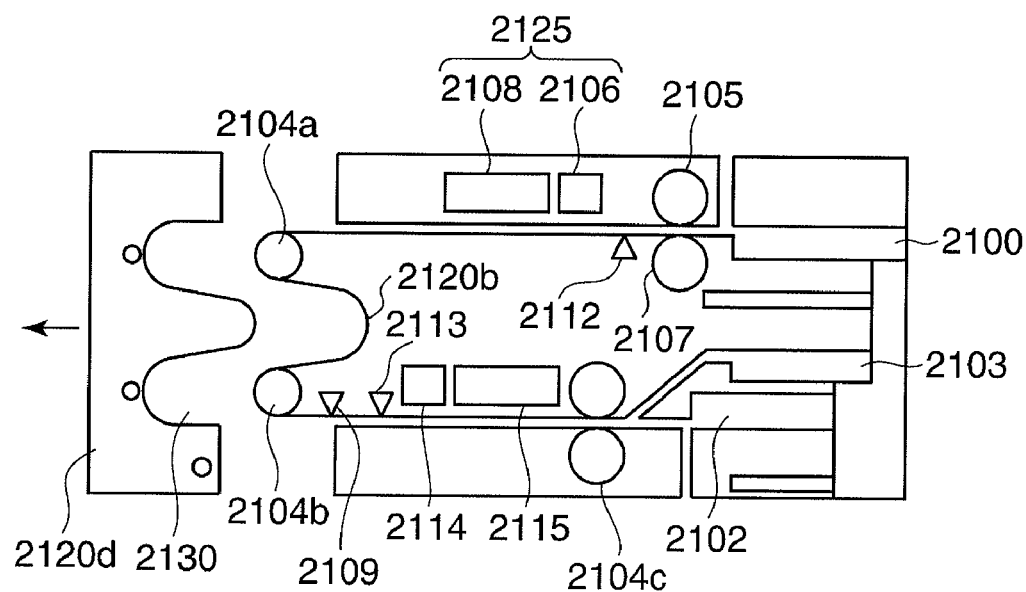
FIG. 27 is a plan view for explaining an open and close mechanism of the image reading apparatus in FIG. 26.

FIG. 26 is a plan view of an image reading apparatus, which is an example of an original processing apparatus according to the fourth embodiment of this invention, and FIG. 27 is a plan view for explaining an open and close mechanism of the image reading apparatus in FIG. 26.

In FIG. 27, a casing 2120*d* for forming a curved conveying path 2120 is horizontally moved and spaced apart from an apparatus main body. As a moving unit (hereinafter referred to as the open and close mechanism) for horizontally moving the casing 2120*d*, there can be used a mechanism having, e.g., a slide member provided so as to be movable by being pulled out horizontally from a lower apparatus unit and an open and close unit 2130 disposed on the slide member, thereby capable of opening and closing the curved conveying path 2120. Alternatively, there can be used a mechanism having an engaging pawl provided on the casing 2120*d* of the open and close unit 2130 so as to be inserted into and removed from an engaging hole formed in the apparatus main body, thereby capable of attaching and detaching the casing 2120*d* to and from the apparatus main body. It should be noted that, except for the construction of the open and close mechanism for the conveying path, the image reading apparatus of this embodiment is the same in construction as the image reading apparatus of the third embodiment.

With the above construction, except for the open and close mechanism of the open and close unit 2130 for the conveying path, the image reading apparatus of this embodiment operates in the same manner as the image reading apparatus of the third embodiment and achieves the same effects.

With this embodiment having the open and close mechanism for the curved conveying path 2120, cleaning inside the curved conveying path 2120 can easily be done, and jam processing can be easily performed, e.g., upon occurrence of conveyance failure of original 1090 in the curved conveying path 2120. It should be noted that instead of the casing 2120*d* for the curved conveying path 2120 which can be disassembled from and assembled to the apparatus main body by being horizontally slid, other system can be used to open and close the curved conveying path 2120.

Next, a fifth embodiment of this invention will be described.

Figure 28:
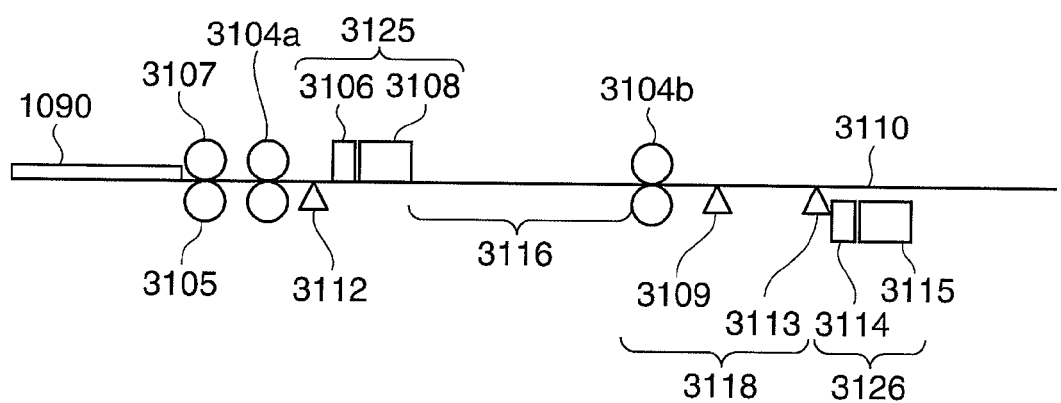
FIG. 28 is a development view of a conveying path of an image reading apparatus, which is an original processing apparatus according to a fifth embodiment of this invention.

FIG. 28 is a development view of a conveying path in an image reading apparatus, which is an example of an original processing apparatus according to the fifth embodiment of this invention. It should be noted that the construction of the image reading apparatus of this embodiment is the same as that of the image reading apparatus 1300 of the first embodiment, except for the construction of the conveying path. In the following, only the construction and function of the conveying path of the image reading apparatus of this embodiment will be described.

As shown in FIG. 28, a first conveying path 3116 and a second conveying path 3118 are provided in a conveying path 3110 for conveying an original 1090. In this embodiment, the conveying path 3110 (i.e., the first and second conveying paths 3116, 3118) is formed into, e.g., a slit shape that opens to an upper part of the apparatus main body.

On the side upstream of the first conveying path 3116, a roller pair of a retard roller 3107 and a feed roller 3105, a conveying roller pair 3104a, a pre-registration sensor 3112 for detecting arrival and passage of an original, a MICR character reading unit 3106, and a reading unit 3108 are disposed along the direction of conveyance of the original 1090.

The feed roller 3105 and the retard roller 3107 constitute a feeding unit, and the MICR character reading unit 3106 and the reading unit 3108 constitute a first processing unit 3125. It should be noted that the MICR character reading unit 3106 and the image reading unit 3108 can be disposed reversely.

A conveying roller pair 3104b and an original presence/absence sensor 3109 are disposed along the second conveying path 3118. An after-registration sensor 3113 for detecting arrival and passage of an original, a print unit 3114, and a reading unit 3115 are disposed downstream of the second conveying path 3118. The print unit 3114 and the reading unit 3115 constitute a second processing unit 3126.

The image reading apparatus 1300 is provided with a first conveyance unit (not shown), corresponding to the first conveying path 3116, for driving the conveying roller pair 3104a, etc., and a second conveyance unit (not shown), corresponding to the second conveying path 3118, for driving the conveying roller pair 3104b, etc.

After a fed original 1090 passes through the registration sensor 3112, MICR characters on the original are read by the MICR character reading unit 3106 and an image of front side thereof is read by the reading unit 3108.

Based on a signal produced when the leading end of the original 1090 reaches the registration sensor 3112, the image reading apparatus 1300 calculates a timing where the MICR character reading unit 3106 starts reading the MICR characters and a timing where the reading unit 3108 starts reading the front side image. In these timings, the MICR characters 1091 printed on a lower end of the front side of the original 1090 are read and the front side image thereof is read.

When receiving print information and a result of sheet discharge destination determination, the image reading apparatus 1300 calculates a timing where the print unit 3114 starts printing the print information based on a signal produced when the leading end of the original 1090 reaches the after-registration sensor 3113, and performs printing at the calculated timing.

The image reading apparatus 1300 also calculates a timing where the back side image reading unit 3115 reads the back side image of the original 1090 based on the signal produced when the leading end of the original 1090 reaches the after-registration sensor 3113, and reads the back side image at the calculated timing.

Subsequently, based on the result of determination of sheet discharge destination for the original 1090 received from the host computer, the image reading apparatus 1300 assigns and conveys the original 1090 whose back side image has been read to either the first sheet discharge unit 3102 or the second sheet discharge unit 3103.

The first conveying path 3116 of the image reading apparatus 1300 is a region of the conveying path 3110 from the reading unit 3108 to a position short of the conveying roller pair 3104b. The first conveying path 3116 has its conveying path length equal to, e.g., the sum of the longest length of originals conveyable by the image reading apparatus 1300 (which is 213 mm in the case of business checks being conveyed) and a braking distance required to cause an original to stop.

The second conveying path 3118 is a region of the conveying path 3110 from the conveying roller pair 3104b to a position short of the after-registration sensor 3113 disposed immediately short of the print unit 3114. The second conveying path 3118 has its conveying path length shorter than, e.g., the length of business check, and equal to the sum of a length of 152 mm called personal check (or American check) and an accelerating distance.

Next, with reference to FIGS. 29 to 35, the operation of the image reading apparatus 1300 of this embodiment will be described.

Figure 29:
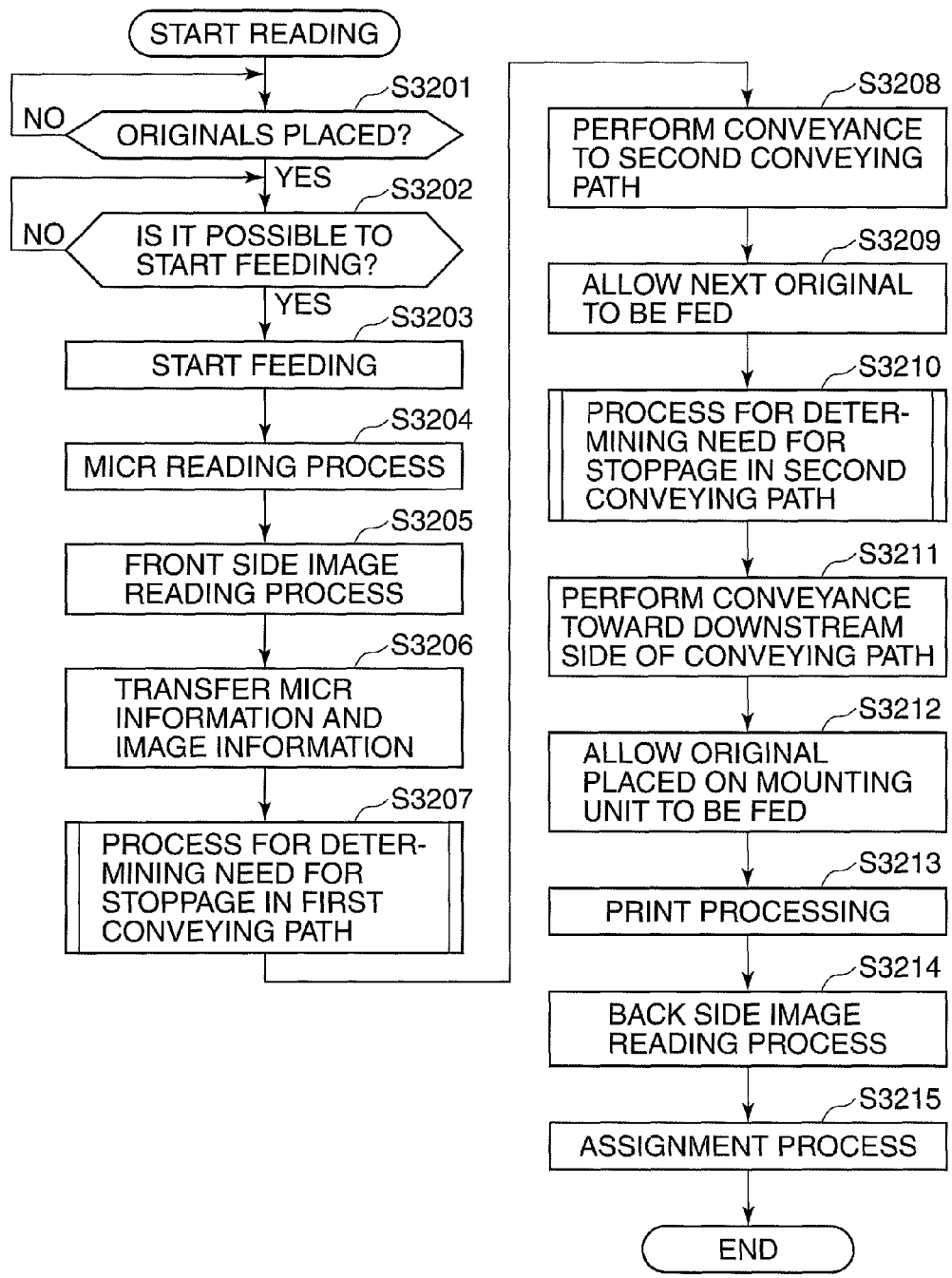
FIG. 29 is a flowchart showing an operation of the image reading apparatus of the fifth embodiment.

FIG. 29 is a flowchart showing an example operation of the image reading apparatus 1300 of this embodiment.

To execute processes shown in FIG. 29, a control program stored in a ROM or a hard disk (not shown) of the image reading apparatus 1300 is loaded into a RAM (not shown) and the loaded program is executed by a CPU (hereinafter referred to as the CPU 3300A), as a control unit, not shown.

Referring to FIG. 29, when receiving an instruction to start an image reading process from the host computer 3301 via the communication cable 3302, the CPU 3300A determines in step S3201 via a sheet detecting sensor (not shown) whether originals 1090 are placed on the mounting unit 3100. If originals 1090 are placed on the mounting unit 3100, the CPU 3300A proceeds to step S3202.

In step S3202, the CPU 3300A determines whether it is possible to allow feeding originals 1090 from the mounting unit 3100 to be started, and proceeds to step S3203 if it is possible to feed originals.

It is determined that it is possible to start feeding an original when the original 1090 about to be fed satisfies any of the following three requirements (4) to (6).

(4) The original about to be fed is a first original. If the original about to be fed is a first original, there is no original in the first and second conveying paths 3116, 3118. Thus, the original 1090, if fed, will not collide with another original.

(5) The original about to be fed is a second original, a second conveying path stop position where a preceding original is caused to be on standby is provided upstream of the second processing unit 3126, and a first conveying path stop position where a subsequent original is caused to be on standby is provided upstream of the second conveying path stop position. In a case that the original about to be fed is a second original and print information and a result of assignment destination determination for the preceding original (i.e., the first original) have not been received, the second processing unit cannot perform processing on the preceding original. In this embodiment, therefore, the preceding original conveyed to the second conveying path 3118 is caused to stop until the print information and the result of assignment destination determination are received, as will be described later in detail.

It should be noted that print information and a result of assignment destination determination for an original are used as control information in this embodiment. However, the control information can be information that only represents a result of MICR determination or can be print information alone or can be assignment destination information alone. The print information and the assignment destination information can be generated by, e.g., the control unit of the image reading apparatus 1300 based on, e.g., the result of MICR determination. In this embodiment, two sheet discharge units are provided as assignment destinations. However, one sheet discharge unit or three or more sheet discharge units can be provided.

In this embodiment, assignment destinations indicate the first and second sheet discharge units 3102, 3103 for discharging originals, and either the first sheet discharge unit 3102 or the second sheet discharge unit 3103 is selected as assignment destination by the host computer 3301. For example, it can be set such that an original whose MICR characters 1091 have been determined is discharged to the first sheet discharge unit 3102, whereas an original whose MICR characters 1091 have not been determined is discharged to the second sheet discharge unit 3103.

The second conveying path stop position 3120 is a position in the second conveying path 3118 where an original 1090 is caused to stop.

Figure 32:
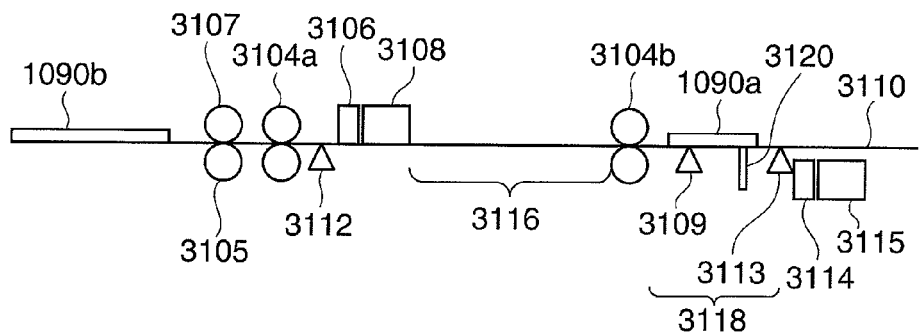
FIG. 32 is a is a development view of a conveying path in which a stop position in the second conveying path is indicated.

FIG. 32 is a development view of the conveying path 3110 in which the second conveying path stop position 3120 is indicated. As shown in FIG. 32, the second conveying path stop position 3120 is set such that an original entering from a conveyance standby state to a conveyance state is accelerated to a given steady speed v before being conveyed to the back side image reading unit 3115. Specifically, a distance from the second conveying path stop position 3120 to the back side image reading unit 3115 is equal to or longer than a distance required for the original to be accelerated to the given steady speed.

Figure 33:
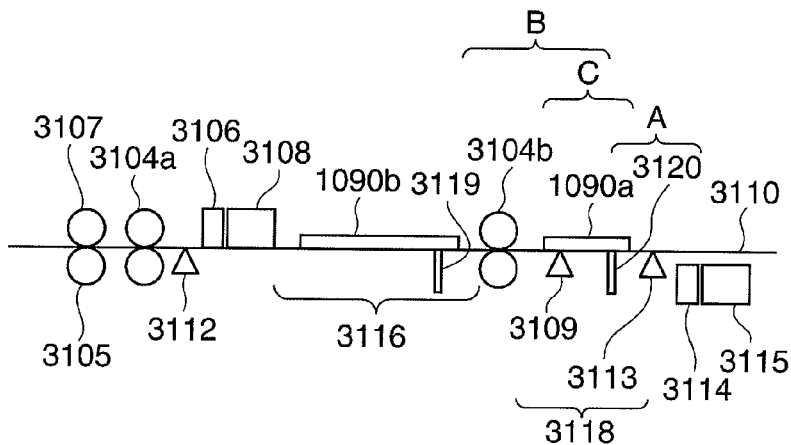
FIG. 33 is a development view of a conveying path in which stop positions in first and second conveying paths are indicated.

In a case that print information and a result of assignment destination determination for the preceding original have not been received, conveyance of the preceding original in the second conveying path 3118 is stopped. In this state, another original (second original), if fed, is not conveyed to the second conveying path 3118. As shown in FIG. 33, the second original is caused to stop at the first conveying path stop position 3119, which is an original stop position in the first conveying path 3116.

FIG. 33 is a development view of the conveying path 3110 where the first and second conveying path stop positions 3119, 3120 are indicated. As shown in FIG. 33, the second subsequent original 1090*b* is caused to stop at the first conveying path stop position 3119, and does not collide with the first original.

(6) The original about to be fed is a third or subsequent original, and the apparatus is in a state that print information and a result of assignment destination determination for an original preceding by two originals have been received and processing by the second processing unit 3126 can be started.

In a case that the original about to be fed is a third or subsequent original, it is necessary to confirm, before the original is started to be fed, that print information and a result of assignment destination determination for an original preceding by two originals have been received. This is because it is impossible for the second processing unit 3126 to execute processing on the original preceding by two sheets unless the print information and the result of assignment destination determination for the original conveyed to the second conveying path 3118 have been received.

If the original preceding by two originals is in a state where it is caused to stop, an original preceding by one sheet is conveyed to and caused to stop in the first conveying path 3116 and feeding a third or subsequent original is stopped. This is because, if an original is newly fed in such a state, there is a fear that the newly fed original will be damaged by colliding with the original preceding by one original stopping at the first conveying path stop position 3119 in the first conveying path 3116.

Thus, in a case that the original about to be fed is a third or subsequent original, the apparatus is required to be in a state that the print information and the result of assignment destination determination for the original preceding by two originals have been received and processing by the second processing unit can be started.

In a case that the original about to be fed is a third or subsequent original and the apparatus is in a state that the print information and the result of assignment destination determination for the original preceding by two originals have been received and processing in the second processing unit can be started, the original preceding by two originals is not caused to stop in the second conveying path 3118 and the original preceding by one sheet is not caused to stop in the first conveying path 3116. Therefore, even if an original is newly fed, the newly fed original will not collide with the preceding original. Accordingly, originals are not caused to stop in the conveying path 3110 and continuously processed at high speed in the first and second processing units 3125, 3126, if the print information and the result of assignment destination determination have been received in a state that the leading end unit of the relevant original is located short of the second processing unit 3126.

As described above, in this embodiment, the conveyance control is performed such that the leading end unit of one original having passed through the first processing unit 3125 is positioned short of the second processing unit 3126 when the control information for processing the one original is received. Therefore, the second processing can be started immediately after reception of the control information, and hence the processing ability can be improved, even if a plurality of originals are continuously processed.

When any of the above requirements (4) to (6) is satisfied, it is determined that a new original can be fed.

In a case where any of the requirements is satisfied and a new original is started to be fed, an original preceding by one sheet is conveyed to the second conveying path 3118, even if the print information and the result of assignment destination determination for the original preceding by one sheet cannot be received and the processing by the second processing unit 3126 cannot be started. Thus, the processing on the newly fed original can precedently be performed by the first processing unit 3125, whereby a reduction in processing speed can be avoided.

If it is possible to start feeding originals, the CPU 3300A causes originals to be fed by the conveying roller 3105, while separating originals fed from the mounting unit 3100 one by one by the retard roller 3107 to prevent duplicated feeding (step S3203), and proceeds to step S3204.

In the following description, it is assumed that an original to be described corresponds to the original 1090*b* shown in FIG. 32.

In step S3204, the CPU 3300A causes the MICR character reading unit 3106 to read MICR characters 1091 printed on the original 1090*b*, which is being conveyed by the sheet feed roller 3105, and proceeds to step S3205.

The original 1090*b* having passed through the pre-registration sensor 3112 will reach the MICR character reading unit 3106 upon elapse of L1/v, where L1 represents a distance between the pre-registration sensor 3112 and the MICR character reading unit 3106 and v represents the conveyance speed (steady speed) of the original 1090*b*.

Thus, the CPU 3300A performs time measurement by using a timer (not shown), and causes the MICR character reading unit 3106 to read MICR characters 1091 printed on a lower end of the original 1090*b* upon elapse of L1/v from when the leading end of the original 1090*b* has passed through the pre-registration sensor 3112.

In step S3205, the CPU 3300A causes the reading unit 3108 to read an image of the front side of the original 1090*b*, and proceeds to step S3206.

Since the original 1090*b* reaches the reading unit 3108 upon elapse of L2/v, where L2 represents a distance between the pre-registration sensor 3112 and the reading unit 3108 and v represents the conveyance speed of the original 1090*b*, the CPU 3300A performs time measurement by using a timer (not shown) and causes the reading unit 118 to start reading the front side image of the original 1090b upon elapse of L2/v from when the leading end of the original 1090b has passed through the pre-registration sensor 3112.

In step S3206, the CPU 3300A causes the transmission unit to transfer the MICR information and the front side image information read from the original 1090b to the host computer 3301 via the communication cable 3302, and proceeds to step S3207.

In step S3207, the CPU 3300A performs a process for determining the need for stopping the original 1090b in the first conveying path 3116, and proceeds to step S3208.

Figure 30:
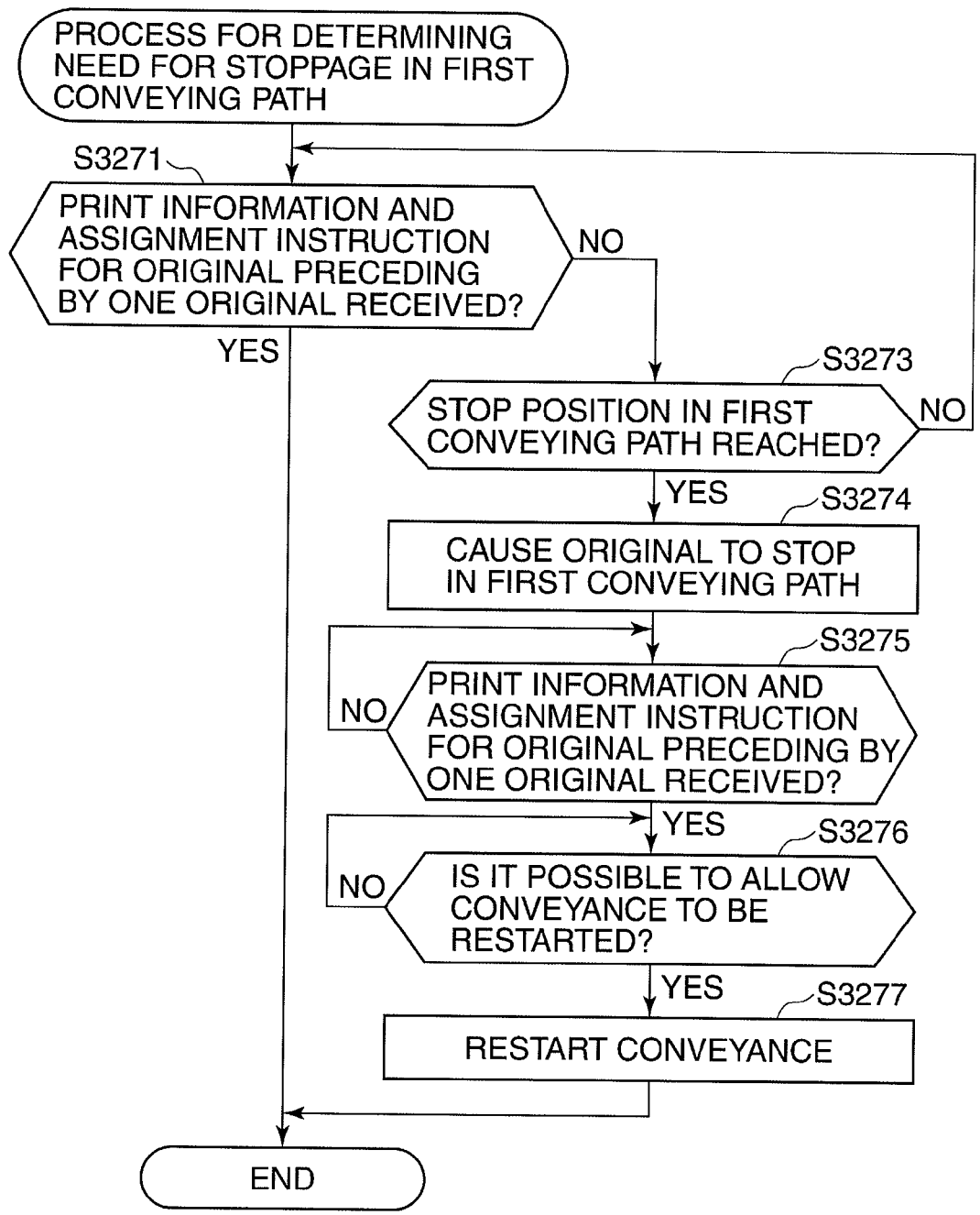
FIG. 30 is a flowchart showing a process performed in step S3207 in FIG. 29 to determine the need for stopping an original in a first conveying path.

FIG. 30 is a flowchart showing the process performed in step S3207 in FIG. 29 to determine the need for stopping the original in the first conveying path 3116.

Referring to FIG. 30, at start of the process for determining the need for stopping the original in the first conveying path 3116, the CPU 3300A determines in step S3271 whether it has received from the host computer 3301 print information and a result of assignment destination determination (assignment instruction) for the original 1090a conveyed precedently by one sheet.

The print information and the result of assignment destination determination (control information) for the original 1090a are created by the host computer 3301 based on the MICR information and the front side image information for the original 1090a transferred to the host computer 3301 in step S3206 in FIG. 29.

The CPU 3300A completes the process for determining the need for stopping the original in the first conveying path 3116, without stopping conveyance of the original 1090b, in a case where the CPU 3300A has received from the host computer 3301 the print information and the result of assignment destination determination for the original 1090a preceding by one sheet or in a case where the original 1090b is a first original.

On the other hand, if it is determined in step S3271 that the CPU 3300A has not received from the host computer 3301 the print information and the result of assignment destination determination for the original 1090a preceding by one sheet, the CPU 3300A proceeds to step S3273.

In step S3273, until the original 1090b conveyed by the conveying roller 3104a reaches the first conveying path stop position 3119, the CPU 3300A monitors whether it receives the print information and the result of assignment destination determination for the original 1090a preceding by one sheet.

The original 1090b reaches the stop position 3119 in the first conveying path upon elapse of L3/v, where L3 represents a distance between the pre-registration sensor 3112 and the first conveying path stop position 3119 and v represents the conveyance speed of the original 1090.

Thus, the CPU 3300A performs time measurement by using a timer (not shown), and determines that the original 1090b reaches the stop position 3119 in the first conveying path upon elapse of L3/v from when the leading end of the original 1090b has passed through the pre-registration sensor 3112. It should be noted that there can be provided a sensor for determining the first conveying path stop position 3119, other than the pre-registration sensor 3112.

If the leading end unit of the original 1090b reaches the stop position 3119 in the first conveying path, but the CPU 3300A has not received from the host computer 3301 the print information and the result of assignment destination determination for the original 1090a preceding by one sheet, the CPU 3300A proceeds to step S3274.

In step S3274, since the original 1090a must be stopped in the middle of the second conveying path 3118, the CPU 3300A controls the conveying roller pair 3104a such that the leading end unit of the original 1090b is caused to stop at the stop position 3119 in the first conveying path 3116, and proceeds to step S3275.

The description "the leading end unit of the original 1090b is caused to stop at the stop position 3119 in the first conveying path 3116" includes, for example, a case where the conveyance speed of the original 1090b is controlled and conveyance of the original 1090b is stopped such that the leading end unit of the original 1090b is positioned at or short of the stop position 3119, i.e., not beyond the stop position 3119.

The description "conveyance of the original 1090b is stopped" not only includes a case where conveyance of the original 1090b is completely stopped so that the original 1090b is stationary in the conveying path 3116, but also includes a case where the original 1090b is not stationary in the conveying path 3116 but conveyed at a low speed.

In step S3275, the CPU 3300A waits for receiving from the host computer 3301 the print information and the result of assignment destination determination (assignment instruction) for the original 1090a preceding by one sheet, and proceeds to step S3276 upon reception thereof.

In step S3276, the CPU 3300A determines whether it is possible to allow conveyance of the original 1090b to be restarted, and proceeds to step S3277 if it is possible to allow conveyance of the original 1090b to be restarted. At restart of conveyance, e.g., the conveyance speed of the original 1090a is returned to a steady speed.

In a case where there is no original 1090a in the second conveying path 3118 or in a case where conveyance of the original 1090a to the second conveying path 3118 is restarted and hence the original 1090b, if conveyed, will not collide with the original 1090a in the conveying path, the CPU 3300A determines that it is possible to allow conveyance of the original 1090b to be restarted. This is because there is no fear that originals are not damaged by collision.

In step S3277, the CPU 3300A restarts conveyance of the original 1090b, and completes the process for determining the need for stopping the original 1090b in the first conveying path 3116. At that time, the CPU 3300A causes the original 1090b to be conveyed to the second conveying path 3118.

Referring to FIG. 29 again, in step S3208, the CPU 3300A causes the original 1090b to be conveyed to the second conveying path 3118, and proceeds to step S3209.

In step S3209, the CPU 3300A allows feeding the next original subsequent by one sheet, and proceeds to step S3210. When the next original is fed from the mounting unit 3100 to the conveying path 3110, processing on the next fed original is started from step S3201. The CPU 3300A does not allow the next original to be fed in a case where the length of the original 1090b exceeds the size of personal check.

In step S3210, the CPU 3300A performs a process for determining the need for stopping the original 1090b in the second conveying path 3118, while causing the original 1090b to be conveyed by the conveying roller pair 3104b, and proceeds to step S3211.

Figure 31:
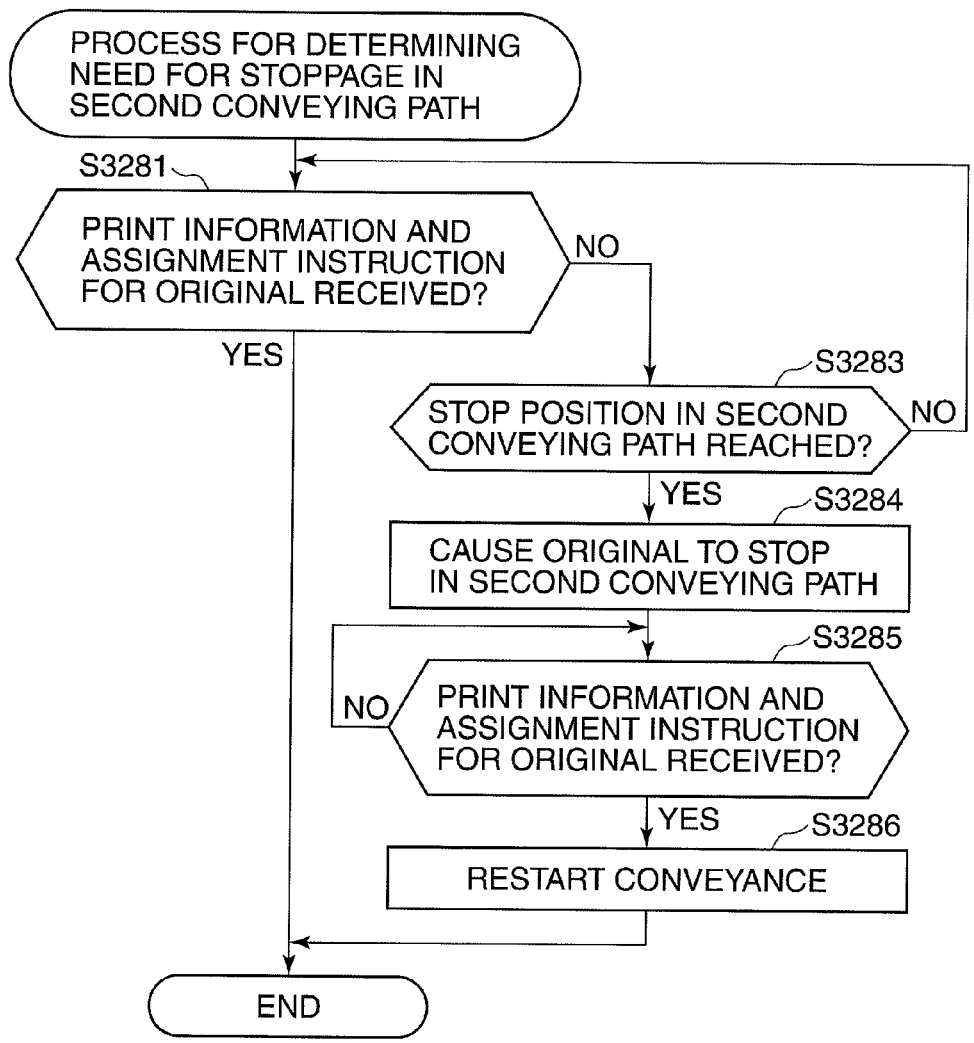
FIG. 31 is a flowchart showing a process performed in step S3210 in FIG. 29 to determine the need for stopping an original in a second conveying path.

FIG. 31 is a flowchart showing the process performed in step S3210 in FIG. 29 to determine the need for stopping the original 1090b in the second conveying path 3118.

In FIG. 31, at start of the process for determining the need for stopping the original in the second conveying path, the CPU 3300A confirms in step S3281 whether it has received from the host computer 3301 print information and a result of assignment destination determination (assignment instruction) for the original 1090b.

The print information and the result of assignment destination determination for the original 1090b are created by the host computer 3301 based on at least one of the MICR information and the front side image information for the original 1090b transferred from the host computer 3301 in step S3206 in FIG. 29.

If the CPU 3300A has received from the host computer 3301 the print information and the result of assignment destination determination for the original 1090b, the CPU 3300A completes the process for determining the need for stopping the original in the second conveying path unit 3118, without stopping conveyance of the original 1090b.

On the other hand, if it is determined in step S3281 that the CPU 3300A has not received from the host computer 3301 the print information and the result of assignment destination determination for the original 1090b, the CPU 3300A proceeds to step S3283.

In step S3283, the CPU 3300A monitors whether it receives from the host computer 3301 the print information and the result of assignment destination determination for the original 1090b, while conveying the original 1090b to the stop position 3120 in the second conveying path 3118.

The original 1090b will reach the stop position 3120 in the second conveying path upon elapse of L4/v, where L4 represents a distance between the original presence/absence sensor 3109 and the stop position 3120 in the second conveying path and v represents the conveyance speed of the original 1090b.

Thus, the CPU 3300A performs time measurement by using a timer (not shown), and determines that the original 1090b reaches the stop position 3120 in the second conveying path upon elapse of L4/v from when the leading end of the original 1090b has passed through the original presence/absence sensor 3109.

The CPU 3300A proceeds to step S3284 in a case where the original 1090b reaches the stop position 3120 in the second conveying path but the CPU 3300A has not received from the host computer 3301 the print information and the result of assignment destination determination for the original 1090b.

In step S3284, the CPU 3300A causes the original 1090b to stop at the second conveying path stop position 3120, and proceeds to step S3285.

In step S3285, the CPU 3300A waits for receiving from the host computer 3301 the print information and the result of assignment destination determination (assignment instruction) for the original 1090b, and proceeds to step S3286 upon reception thereof.

In step S3286, the CPU 3300A causes conveyance of the original 1090b to be restarted, and completes the process for determining the need for stopping in the original 1090b in the second conveying path 3118.

As described above, if an original is caused to stop at the second conveying path stop position 3120, the timing where conveyance in the second conveying path 3118 is restarted is determined according to whether print information and a result of assignment destination determination for the original having reached the second conveying path stop position 3120 have been received. If an original is caused to stop at the first conveying path stop position 3119, the timing where conveyance in the first conveying path 3116 is restarted is determined according to whether conveyance in the second conveying path 3118 has been restarted.

Specifically, if both conveyance of original in the first conveying path 3116 and conveyance of original in the second conveying path 3118 are stopped, conveyance of original in the first conveying path 3116 and conveyance of original in the second conveying path 3118 are simultaneously restarted upon reception of the print information and the result of assignment destination determination, as a trigger.

In FIG. 33, an original 1090b stops at the first conveying path stop position 3119, and another original 1090a stops at the second conveying path stop position 3120. It is assumed that the length of the original 1090a is represented by C, a distance from the second conveying path stop position 3120 to the back side image reading unit 3115 is represented by A, and a length from the second conveying path stop position 3120 to the leading end of the original 1090b that stops at the first conveying path stop position 3119 is represented by B.

Figure 34:
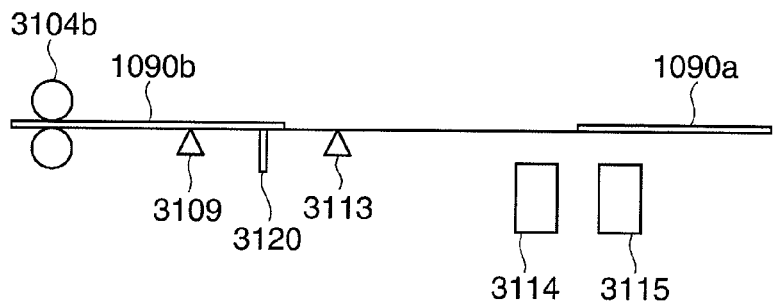
FIG. 34 is a development view of the conveying path in a case where originals in the first and second conveying paths are simultaneously restarted to be conveyed.

In a case where the length C of the original 1090a is long and a relation of (B−C)<A is fulfilled, when conveyance of original in the first conveying path 3116 and conveyance of original in the second conveying path 3118 are simultaneously restarted, the resultant state will be as shown in FIG. 34.

FIG. 34 is a development view of the conveying path in a case where conveyance of original in the first conveying path 3116 and conveyance of original in the second conveying path 3118 are simultaneously restarted from the state shown in FIG. 33 where the relation of (B−C)<A is fulfilled.

In FIG. 34, when the original 1090b is entering the second conveying path stop position 3120, the original 1090a is in a state where the back side image thereof is being read by the reading unit 3115. At that time point, if the print information and the result of assignment destination determination for the original 1090b have not been received, conveyance of the original in the second conveying path 3118 is stopped. As a result, the original 1090a is caused to stop halfway through the image reading, and a malfunction occurs in back side image reading.

In this embodiment, if the relation of (B−C)<A is fulfilled in FIG. 33, conveyance of original in the second conveying path 3118 is restarted prior to restarting conveyance of original in the first conveying path 3116 at the time of restarting conveyances of originals in the first and second conveying paths 3116, 3118.

As a result, the length C is made relatively shortened, whereby a distance between the trailing end of the original 1090a and the leading end of the original 1090b (corresponding to (B−C)) is made longer in appearance than the distance A between the back side image reading unit 3115 and the second conveying path stop position 3120.

Figure 35:
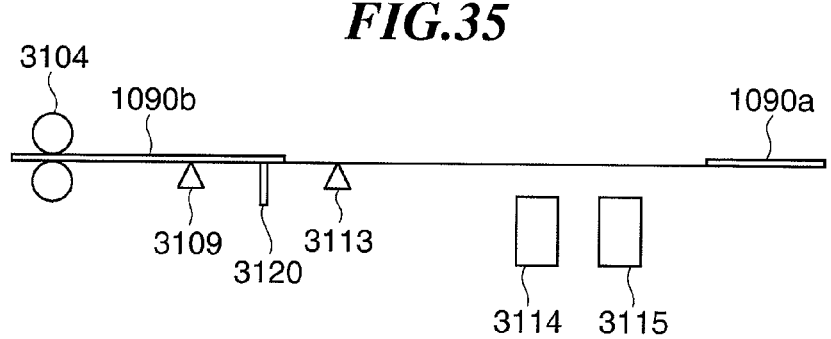
FIG. 35 is a development view of a conveying path in a case where the original in the second conveying path is started to be conveyed.

FIG. 35 shows a state attained, in a case where the relation of (B−C)<A is fulfilled in FIG. 33, by restarting conveyance of original in the second conveying path 3118 prior to restarting conveyance of original in the first conveying path 3116 to thereby make the distance (corresponding to (B−C)) between the trailing end of the original 1090a and the leading end of the original 1090b longer in appearance than the distance A between the back side image reading unit 3115 and the second conveying path stop position 3120 and by restarting conveyance of original in the first conveying path 3116.

FIG. 35 is a development view of the conveying path in a case where the relation of (B−C)<A is fulfilled in FIG. 33, the distance (B−C) is made longer in appearance than the length A, and conveyance of original in the first conveying path 3116 is restarted.

In FIG. 35, when the original 1090b is entering the second conveying path stop position 3120, the original 1090a is located downstream of the back side image reading unit 3115 and the back side image reading is already completed.

At that time point, if the print information and the result of assignment destination determination for the original 1090b have not been received, conveyance of original in the second conveying path 3118 is stopped to cause the original 1090b to stop at the second conveying path stop position 3120.

Since the back side image of the original 1090a has been completed to be read, any inconvenience is not caused in reading the back side image of the original 1090a, even if conveyance of original in the second conveying path 3118 is stopped.

If the length B from the first conveying path stop position 3119 to the second conveying path stop position 3120 is sufficiently long, a relation of (B−C)≧A is fulfilled in FIG. 33.

In that case, even if conveyance of original in the second conveying path 3118 is stopped for the reason that the print information and the result of assignment destination determination for the original 1090b have not been received, a failure is not caused in reading the back side image of the original 1090a preceding one sheet by the reading unit 3115.

In this case, the conveying path length must be made long to ensure the length B, which poses a problem that the apparatus becomes large in size.

In this embodiment, if the relation of (B−C)<A is fulfilled in FIG. 33, control is performed such that conveyance of original in the second conveying path 3118 is restarted prior to restarting conveyance of original in the first conveying path 3116.

As a result, it is possible to avoid a failure in reading the back side image of the preceding original 1090a, which is liable to be caused when conveyance of original in the second conveying path 3118 is stopped in order to cause the original 1090b to stop at the second conveying path stop position 3120.

In this embodiment, the control unit controls the conveyance unit such that conveyance of original in the second conveying path 3118 is restarted prior to restarting conveyance of original in the first conveying path 3116, whereby timings where conveyances are restarted are deviated from each other.

However, this embodiment is not limited thereto. Even if conveyances in the first and second conveying paths are restarted at the same timing, the distance (B−C) can be made larger in appearance than the length A by making the conveyance speed in the second conveying path at the time of restarting conveyance higher than the conveyance speed in the first conveying path.

Referring to FIG. 29 again, after the process in step S3210 to determine the need for stopping the original in the second conveying path 3118 is completed and conveyance of the original 1090b is restarted, the CPU 3300A proceeds to step S3211.

In step S3211, the CPU 3300A causes the original 1090b to be conveyed toward the downstream side of the conveying path, and proceeds to step S3212 when detecting that the leading end of the original 1090b passes through the after-registration sensor 3113.

In step S3212, since the original 1090b is conveyed to the downstream side of the second conveying path 3118 and the next original following the original 1090b is conveyed from the first conveying path 3116 to the second conveying path 3118, the CPU 3300A allows an original placed on the mounting unit 3100 to be fed, and proceeds to step S3213.

When the next original is fed from the mounting unit 3100, processing on the next fed original is started from step S3201.

In step S3213, the CPU 3300A causes the print unit 3114 as the printing unit to print the print information received from the host computer 3301 onto the original 1090b, and proceeds to step S3214.

Since the original 1090b reaches the print unit 3114 upon elapse of L5/v, where L5 represents a distance between the after-registration sensor 3113 and the print unit 3114 and v represents the conveyance speed of the original 1090b, the CPU 3300A performs time measurement by using a timer (not shown) and causes the print unit 3114 to print the print information received from the host computer 3301 onto the original 1090b upon elapse of L5/v from when the leading end of the original 1090b has passed through the after-registration sensor 3113.

In step S3214, the CPU 3300A causes the reading unit 3115 to read an image of the back side of the original 1090b.

Since the original 1090b reaches the back side image reading unit 3115 upon elapse of L6/v, where L6 represents a distance between the after-registration sensor 3113 and the back side image reading unit 3115, the CPU 3300A performs time measurement by using a timer (not shown) and causes the reading unit 3115 to start reading the back side image upon elapse of L6/v from when the leading end of the original 1090b has passed through the after-registration sensor 3113. Then, the CPU 3300A transfers the read back side image information to the host computer 3301 via the communication cable 3302, and proceeds to step S3215.

In step S3215, based on a result of assignment destination determination for the original 1090b received from the host computer 3301, the CPU 3300A assigns and conveys the original 1090b to either the first sheet discharge unit 3102 or the second sheet discharge unit 3103, and completes the process.

With this embodiment, conveyance of an original stopped at the stop position 3120 in the second conveying path is restarted with priority at the time of restarting conveyances of originals respectively stopped at the stop positions 3119, 3120 in the first and second conveying paths. As a result, any inconvenience is not caused in the processing by the second processing unit on the original which was stopped at the stop position 3120 in the second conveying path, even if the control information for the original which was stopped at the stop position 3119 in the first conveying path cannot subsequently be received so that this original is caused to stop on the upstream side of the second conveying path.

It should be noted that the operation of the host computer 1301 in this embodiment is the same as that in the first embodiment (FIG. 9), and a description thereof is omitted.

With this embodiment, at the time of restarting conveyance of one original stopped at the second conveying path stop position 3120 and conveyance of another original stopped at the first conveying path stop position 3119, conveyance of the one original is restarted prior to restarting the conveyance of the other original.

As a result, the distance (B−C) at the time of restarting the latter conveyance becomes larger in appearance than the length A, and therefore any inconvenience is not caused in the processing on the one original by the second processing unit, even if another original is subsequently caused to stop at the second conveying path stop position 3120 and made to be on standby.

Therefore, the original processing ability can be improved, and the conveying path length can be minimized to effectively prevent the apparatus from becoming large. It should be noted that in this embodiment, it is possible to improve the original processing ability and effectively prevent the apparatus from becoming large by, for example, providing one or more U-turn units in the conveying path 3116 to lengthen a path that connects the first and second processing units to thereby ensure a sufficient space to receive an original at a position short of the second processing unit.

With this embodiment, at the time of restarting conveyance of one original stopped at the stop position 3120 in the second conveying path and made to be on standby, the conveyance unit is controlled such that the conveyance speed of the one original becomes equal to a steady speed during when the leading end unit of the one original in the conveyance direction is moved from the downstream end of the stop position in the second conveying path to the second processing unit. Thus, processing by the second processing unit after start of conveyance can properly be performed at the steady original conveyance speed.

With this embodiment, the conveyance unit includes the first and second conveyance units, and the control unit independently controls the first and second conveyance units. Thus, in a case that conveyance of an original in the second conveyance unit is stopped, it is possible to convey an original in the first conveyance unit and perform predetermined processing on the original, whereby the original processing ability can be improved.

It should be noted that in the above described embodiment, the control information (control signal) including designation information such as original assignment destination and print information is received from the host computer 3301. However, the control signal can be created in the image reading apparatus 1300.

In the above embodiment, the check scanner has been described as an example, but this embodiment is not limited thereto. For example, the embodiment can be applied to an original processing apparatus and an original processing system for performing various processing, such as an image reading apparatus for reading images of originals (sheets) and an image forming apparatus for forming images on originals.

Next, a sixth embodiment of this invention will be described.

In this embodiment, a description will be given of an image reading apparatus, which is an example of an original processing apparatus. The image reading apparatus is configured to be able to detect a discharge unit being in a state of being fully loaded with originals, and make an original to be on standby in the conveying path at a position short of the second processing unit when the discharge unit is in the fully loaded state.

In a conventional image reading apparatus, when a fully loaded state of the discharge unit is detected, a reading process for the next original or the like is restarted after elimination of the fully loaded state of the discharge unit, and therefore all the remaining unprocessed originals are put on standby in the sheet feed tray, resulting in a reduction in the efficiency of an operator's image reading operation by means of the image reading apparatus. Thus, it takes much time for the operation, which poses a problem.

Thus, with this embodiment, there is provided an image reading apparatus capable of executing processing on an original in the conveying path even at a position immediately short of a standby position of the original, thereby reducing an image reading time at restart of original conveyance and enhancing the efficiency of operation.

Figure 37:
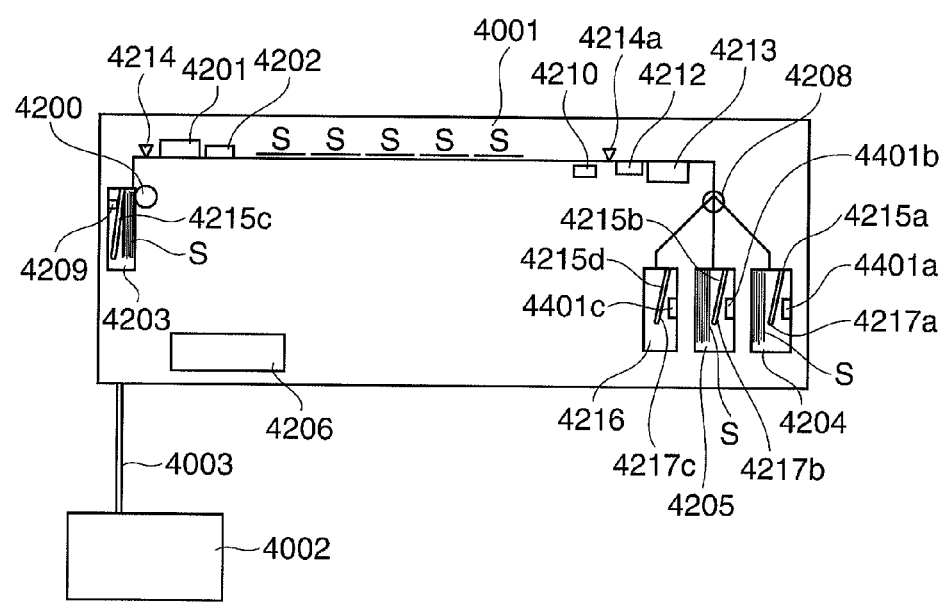
FIG. 37 is a plan view for schematically explaining the construction of an image reading apparatus according to a sixth embodiment of this invention.

As shown in FIG. 37, the image reading apparatus 4001 includes a control unit 4206 for controlling the operation of the image reading apparatus 4001, a sheet feed tray 4203 on which originals are stacked, a pressing plate 4215c for holding originals, a conveying roller 4200 which is a part of a conveyance unit for conveying originals stacked on the sheet feed tray 4203, a plurality of conveying rollers (not shown) which are a part of the conveyance unit, first and second registration sensors 4214, 4214a for acquiring original position information, a front side image sensor 4201 for reading an image, a magnetic head 4202 for reading MICR characters, a conveying path original detecting sensor 4210 for detecting whether there is an original in the conveying path, a print head 4212 for printing print information transmitted from the host computer 4002 via the communication cable 4003, a back side image sensor 4213 for reading an image, and discharge trays 4204, 4205 and 4216, and is further provided with a flapper 4208 for selecting one of the discharge trays 4204, 4205 and 4216 to which an original is to be discharged.

In this embodiment, originals whose MICR characters have correctly been read are discharged to the discharge tray 4204, originals whose MICR characters have erroneously been read are discharged to the discharge tray 4205, and originals whose back side image has not been read or for which printing has not been made are discharged to the discharge tray 4216.

The discharge trays 4204, 4205 and 4216 in the image reading apparatus 4001 are respectively provided with discharged-original-full detecting sensors 4401a, 4401b and 4401c as discharged original stack amount detecting units, and pressing plates 4215a, 4215b and 4215d for holding originals. When the discharge tray 4204 becomes fully loaded, the discharged-original-full detecting sensor 4401a is set to ON and the control unit 4206 detects the fully loaded state. When the discharge tray 4205 becomes fully loaded, the discharged-original-full detecting sensor 4401b is set to ON and the control unit 4206 detects the fully loaded state. When the discharge tray 4216 becomes fully loaded, the discharged-original-full detecting sensor 4401c is set to ON and the control unit 4206 detects the fully loaded state.

The discharged-original-full detecting sensors 4401a, 4401b and 4401c each detect the full load state as described below. Light from light emission units (not shown) in the discharged-original-full detecting sensors 4401a, 4401b and 4401c is reflected by reflecting plates 4217a, 4217b and 4217c on surfaces of the pressing plates 4215a, 4215b and 4215d in the discharge trays 4204, 4205 and 4216. Light reception units (not shown) in the discharged-original-full detecting sensors 4401a, 4401b and 4401c receive the reflected light and are set to ON to output light reception signals.

Figure 38:
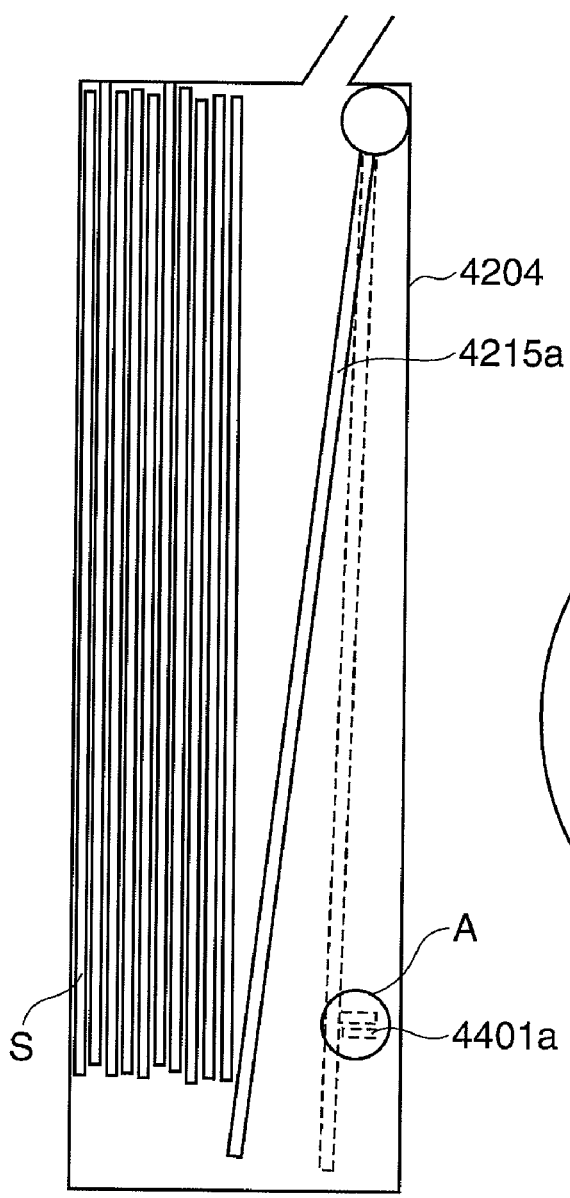
FIG. 38 is a view schematically showing the construction of a discharge tray of the image reading apparatus in FIG. 37 that has a discharged-original-full detecting sensor.

FIG. 38 is a view schematically showing the construction of the discharge tray that allows an original made on standby in the conveying path to be discharged even after a fully loaded state of the discharge tray is detected by the discharged-original-full detecting sensor as the discharged original stack amount detecting unit. Since the discharge trays 4204, 4205 and 4216 are the same in construction as one another, a description will be given of only the discharge tray 4204. To detect the fully loaded state of the discharge tray, it is considered to mount the discharged-original-full detecting sensor on a wall surface of the discharge tray. With such an arrangement, however, subsequent originals cannot be discharged.

In this embodiment, therefore, the discharged-original-full detecting sensor 4401a is mounted at a position slightly spaced apart from the wall surface of the discharge tray. By detecting a fully loaded state at that position by the discharged-original-full detecting sensor 4401a, several originals of originals which are on standby in the conveying path can be discharged even after detection of discharged originals being fully loaded. It should be noted that an inward deviation of the mounting position from the wall surface of the discharge tray is set to a width that allows originals on standby in the conveying path to be discharged.

Figure 39:
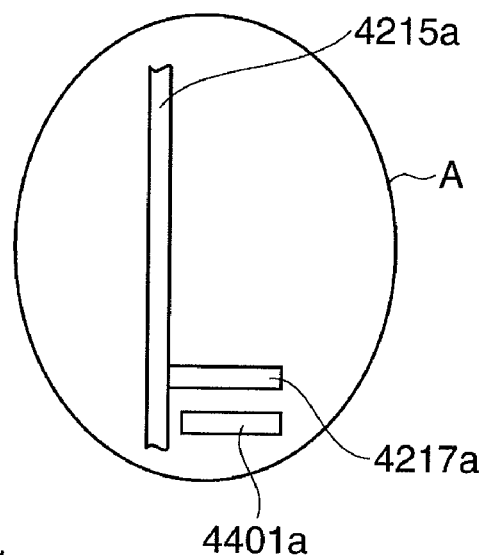
FIG. 39 is an enlarged view showing a positional relation between the discharged-original-full detecting sensor, a pressing plate, and a reflecting plate in a case where a fully loaded state of the discharge tray is detected by the discharged-original-full detecting sensor in FIG. 38.

FIG. 39 is an enlarged view showing a positional relation between the discharged-original-full detecting sensor 4401a, the pressing plate 4215a, and the reflecting plate 4217a in a case where a fully loaded state of the discharge tray 4204 is detected by the discharged-original-full detecting sensor 4401a. Light from a light emission unit (not shown) provided inside the discharged-original-full detecting sensor 4401a is reflected by the reflecting plate 4217a on a surface of the pressing plate 4215a, and the reflected light is received by a light reception unit (not shown) provided inside the discharged-original-full detecting sensor 4401a, whereby the sensor 4401a is made ON and a fully loaded state of discharged originals can be detected.

Figure 36:
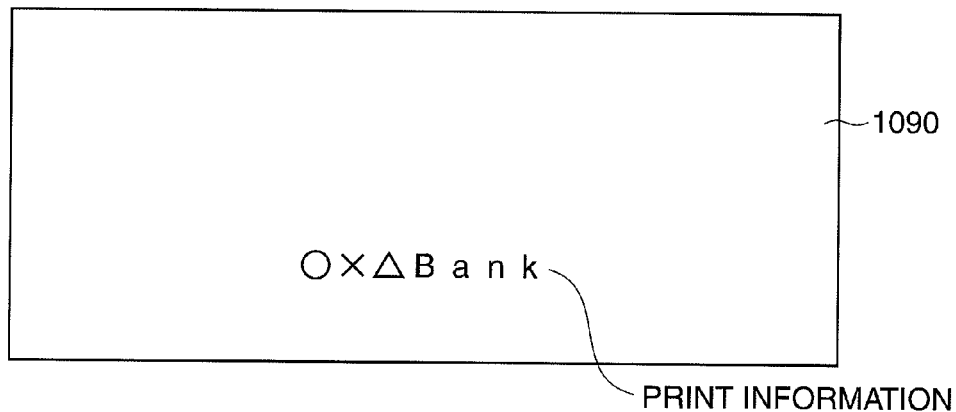
FIG. 36 is a view showing a back side of an original.

FIG. 36 shows a back side of an original 1090 on which print information is printed.

Figure 40:
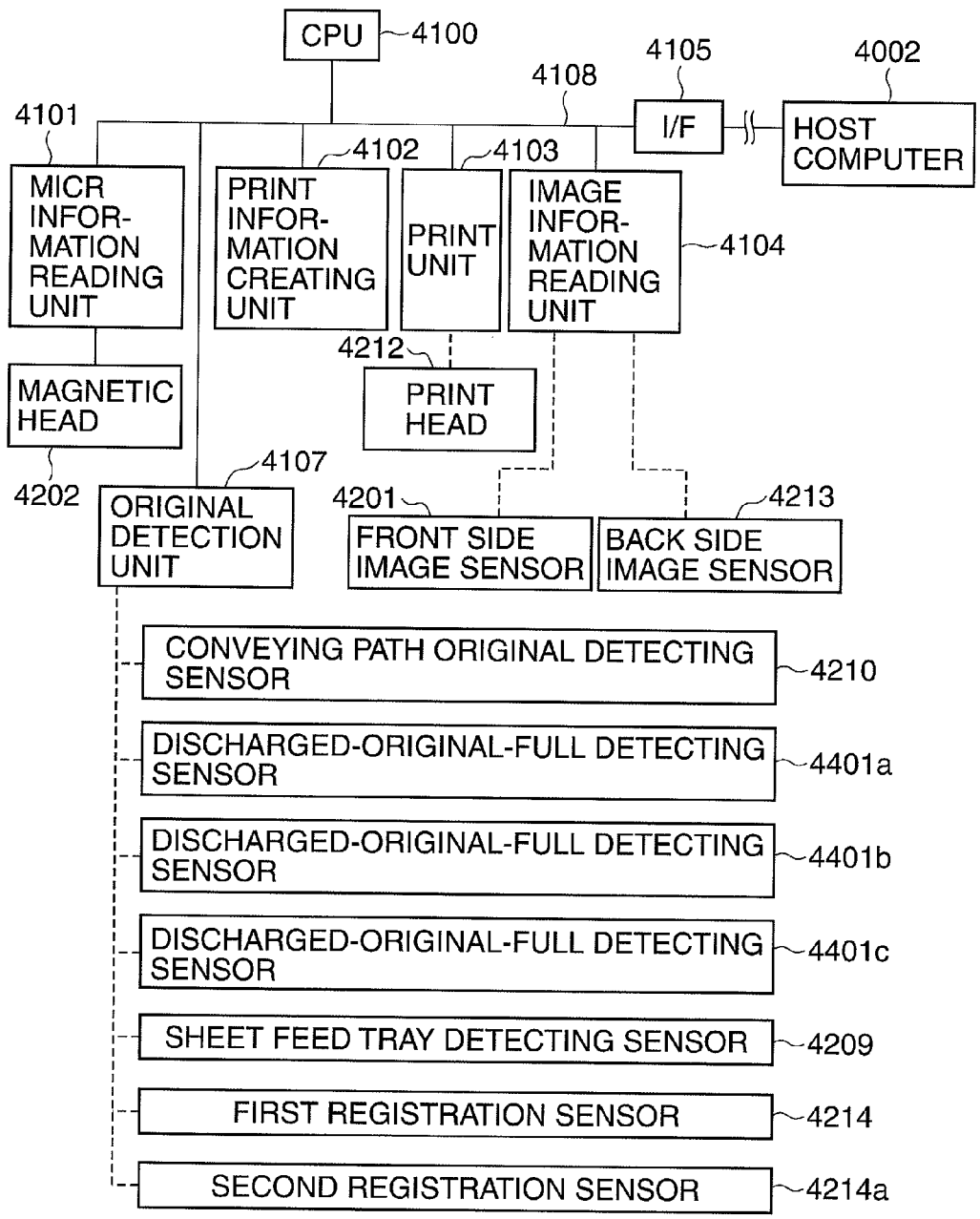
FIG. 40 is a block diagram schematically showing the construction of a control unit as a control system of the image reading apparatus of the sixth embodiment.

FIG. 40 is a block diagram schematically showing the construction of the control unit 4206 as a control system of the image reading apparatus 4001. The image reading apparatus 4001 includes a CPU 4100, a MICR information reading unit 4101, a print information creating unit 4102, a print unit 4103, an image information reading unit 4104, an interface 4105 for being connected with an external host computer 4002, an original detection unit 4107, and a bus 4108 via which the just-mentioned units are connected with one another.

The magnetic head 4202 of the image reading apparatus 4001 is connected to the MICR information reading unit 4101. The print head 4212 is connected to the print unit 4103. The front side image sensor 4201 and the back side image sensor 4213 are connected to the image information reading unit 4104. The conveying path original detecting sensor 4210, the discharged-original-full detecting sensors 4401a, 4401b and 4401c, the sheet feed tray detecting sensor 4209, the first registration sensor 4214, and the second registration sensor 4214a are connected to the original detection unit 4107.

MICR characters 1091 on an original 1090 in FIG. 51 are read by the magnetic head 4202, and MICR information is transmitted to the host computer 4002 via the communication cable 4003. The host computer 4002 analyzes the MICR information to acquire information of the MICR characters 1091 (MICR character information), and transmits the acquired information to the image reading apparatus 4001 via the communication cable 4003. The image reading apparatus 4001 creates print information by the print information creating unit 4102 based on the received MICR character information. It should be noted that it is possible for the image reading apparatus 4001 to receive, via the communication cable 4003, print information created by a capture application running on the host computer 4002 based on the acquired MICR character information.

In the image reading apparatus 4001, the created or received print information is printed on an original by the print unit 4103 by using the print head 4212. The CPU 4100 controls the MICR information reading unit 4101, the print information creating unit 4102, and the print unit 4103. The CPU 4100 also controls transmission, temporary storage, etc. of image data created by the image information reading unit 4104 based on image read signals output from the front side image sensor 4201 and the back side image sensor 4213. In the following, a scanning operation of this embodiment will be described with reference to flowcharts of FIGS. 41 to 43.

Figure 41:
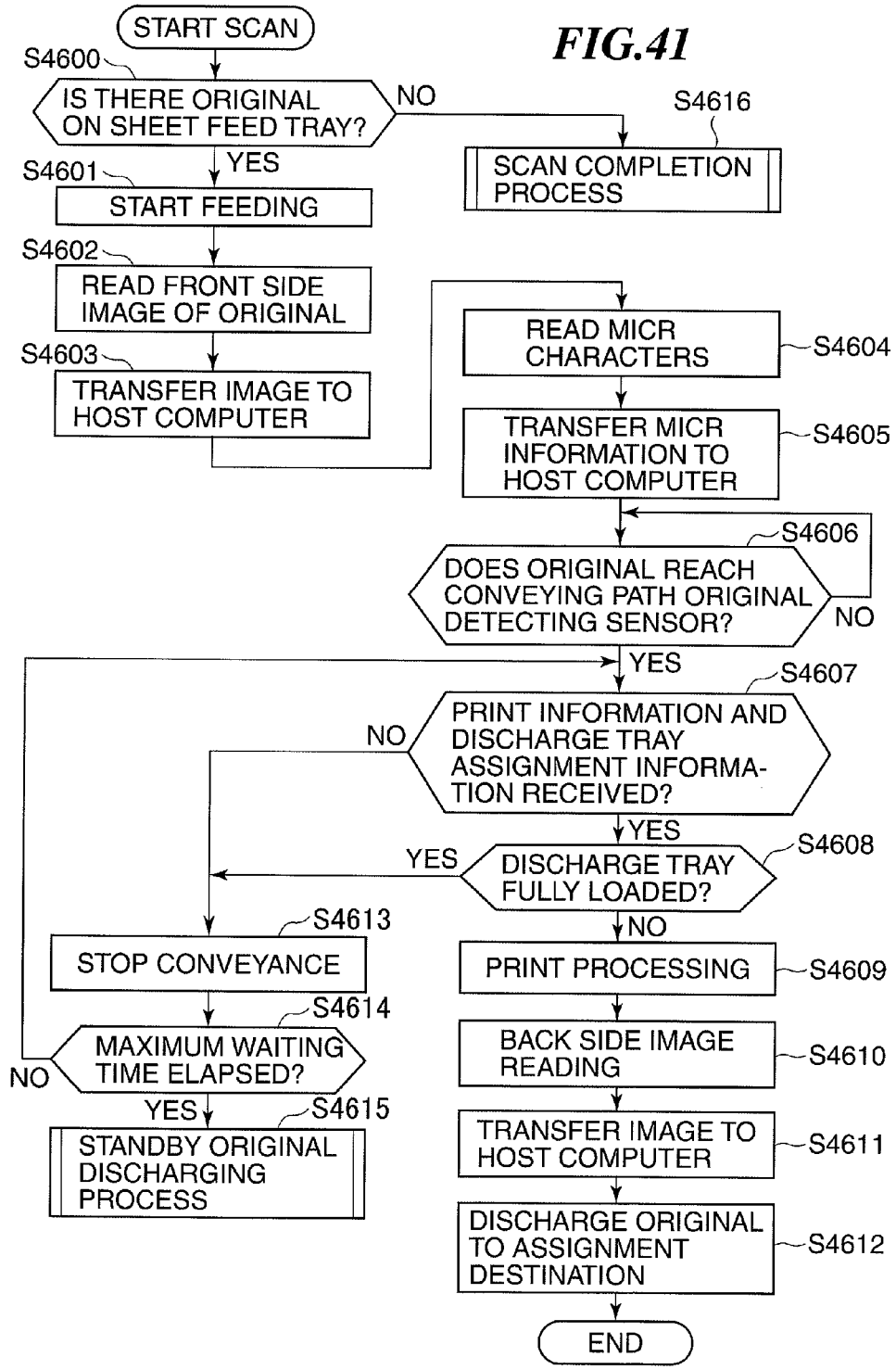
FIG. 41 is a flowchart for explaining a scan process in the sixth embodiment.

FIG. 41 is a flowchart for explaining a scan process performed by the image reading apparatus 4001. The image reading apparatus 4001 starts the scan process upon reception of a notification of start of image reading from a capture application running on the host computer 4002 via the I/F 4105. First, the CPU 4100 determines whether there is an original on the sheet feed tray based on a signal or information from the sheet feed tray detecting sensor 4209 connected to the original detection unit 4107. If there is no original (NO to step S4600), a scan completion process is performed (step S4616). If there are originals (YES to step S4600), feeding of originals S (corresponding to originals 1090) is started (step S4601).

Originals S pressed against the conveying roller 4200 by the pressing plate 4215c are conveyed one by one to the image reading apparatus 4001 by driving the conveying roller 4200, while utilizing static friction between the conveying roller 4200 and original S.

Since an original will reach the front side image sensor 4201 upon elapse of time L1/v, where L1 represents a distance between the first registration sensor 4214 and the front side image sensor 4201 and v represents the conveyance speed of the original, the image reading apparatus 4001 performs time measurement using a timer (not shown) and causes the front side image sensor 4201 to start reading the front side image upon elapse of time L1/v (step S4602). Then, the image reading apparatus 4001 transfers front side image data to the host computer 4002 via the I/F 4105 and the communication cable 4003 (step S4603).

Since the original will reach the magnetic head 4202 upon elapse of time L2/v, where L2 represents a distance between the first registration sensor 4214 and the magnetic head 4202 and v represents the conveyance speed of the original, the image reading apparatus 4001 performs time measurement by using a timer (not shown) and causes the magnetic head 4202 to read MICR characters upon elapse of time period of L2/v (step S4604). Then, the image reading apparatus 4001 transfers MICR information to the host computer 4002 via the I/F 4105 and the communication cable 4003 (step S4605).

Upon reception of the MICR information and the front side image information, the host computer 4002 performs analysis based on the acquired MICR information and the image information, and based on a result of the analysis, transmits a notification of a discharge destination of the original to the image reading apparatus 4001. It should be noted that print character information is also transmitted, if the print character information has been created by the host computer 4002 as previously described.

In a case, for example, that MICR information is correctly read, the discharge tray 4204 is designated as the discharge destination by sheet discharge destination information. In a case that MICR characters are erroneously read, the operator is able to decide the discharge destination by designating the discharge tray 4205.

Next, the image reading apparatus 4001 determines whether the original reaches the conveying path original detecting sensor 4210 (step S4606). If the original does not reach the sensor (NO to step S4606), the image reading apparatus 4001 continues to monitor whether the original S reaches the conveying path original detecting sensor 4210. If the original S reaches the conveying path original detecting sensor 4210 (YES to step S4606), the image reading apparatus 4001 determines whether it has received print information and discharge tray assignment information from the host computer 4002 (step S4607).

If print information and discharge tray assignment information have not been received from the host computer 4002 (NO to step S4607), the image reading apparatus 4001 stops conveying the original S (step S4613), and repeatedly executes processing from step S4607 to step S4614 (described later), while keeping the original S on standby at a position near the conveying path original detecting sensor 4210. In a case where reception of the print information is not necessary, it is enough to keep the original S on standby until reception of the discharge tray assignment information.

A standby time for the original in the conveying path can arbitrarily be set on the capture application running on the host computer 4002, and the setting value is notified to the control unit 4206 of the image reading apparatus 4001 via the communication cable 4003 and the I/F 4105 and stored into a memory (not shown) and referred to. Based on the setting value, the image reading apparatus 4001 performs a determination and decides a maximum waiting time in a standby state where conveyance of original is stopped.

Next, the image reading apparatus 4001 determines whether the maximum waiting time (maximum standby time) in the standby state where the original S is stopped from being conveyed has elapsed (step S4614). If the maximum standby time has not elapsed (NO to step S4614), the apparatus returns to step S4607 and again monitors whether the print information and the discharge tray assignment information have been received. If the maximum standby time has elapsed (YES to step S4614), the apparatus performs the below-described standby original discharging process for discharging an original held on standby in the conveying path (step S4615).

Figure 42:
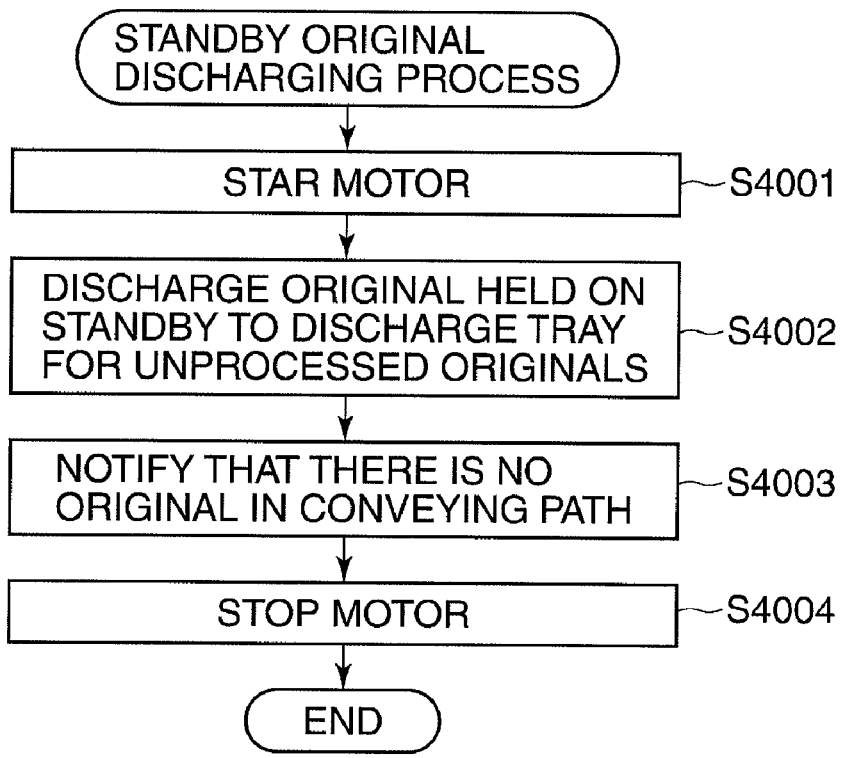
FIG. 42 is a flowchart for explaining a standby original discharging process in the sixth embodiment.

In the standby original discharging process, as shown in FIG. 42, a motor (not shown) is started (step S4001), and an original S held on standby in the conveying path is discharged to the discharge tray 4216 for originals for which back side image reading, printing, or the like has not been made, while changing the conveyance direction by the flapper 4208 (step S4002). Then, it is notified to the host computer 4002 that there is no original in the conveying path (step S4003), the motor (not shown) is stopped (step S4004), and the present process is completed. At that time, an original in the conveying path can be discharged, even if a fully loaded state of the discharge tray 4216 is detected by the discharged-original-full detecting sensor 4401c since the discharge tray 4216 is provided with the gap via which originals held on standby in the conveying path are discharged, as previously described.

If the print information and the discharge tray assignment information have been received from the host computer 4002 before elapse of the maximum waiting time (YES to step S4607), it is determined by the original detection unit 4107 whether the discharge tray corresponding to the discharge tray assignment information is fully loaded (step S4608).

In a case where the discharge tray 4204, for example, is designated as the discharge destination of the original S by the host computer 4002, the discharged-original-full detecting sensor 4401a is made ON, and a fully loaded state of the discharge tray 4204 is detected by the original detection unit 4107 (YES to step S4608), the image reading apparatus 4001 stops the original S from being conveyed to put the original S on standby in the conveying path (step S4613).

Then, the image reading apparatus 4001 determines whether the maximum waiting time (maximum standby time) in the standby state where the original S is stopped from being conveyed has elapsed (step S4614). If the maximum standby time has not elapsed (NO to step S4614), the apparatus returns to step S4607 to wait for elapse of the maximum standby time or elimination of the fully loaded state of the discharge tray 4204, while repeating the processing in steps S4607 to S4614. If the maximum standby time has elapsed (YES to step S4614), discharging to the discharge tray 4204 is performed in the above-described standby original discharging process (step S4615). In that case, despite that the discharge tray 4204 is in the fully loaded state, discharging can be performed without problems since the discharge tray 4204 is provided with the gap for receiving standby originals S.

The image reading apparatus 4001 performs print processing on the original based on print information used for printing (step S4609) in a case where the discharge tray 4204 is designated as the discharge destination of the original S by the host computer 4002, the discharged-original-full detecting sensor 4401a is made OFF, and it is detected by the original detection unit 4107 that the discharge tray 4204 is not in a fully loaded state (NO to step S4608) or in a case where the discharge tray 4205 is designated as the discharge destination of original S by the host computer 4002, the discharged-original-full detecting sensor 4401b is made OFF, and it is detected by the original detection unit 4107 that the discharge tray 4205 is not in a fully loaded state (NO to step S4608). Since the original reaches the print head 4212 upon elapse of time $L3/v$, where L3 represents a distance from the second registration sensor 4214a to the print head 4212 and v represents the conveyance speed of original, the image reading apparatus 4001 performs time measurement by using a timer (not shown) and causes the print head 4212 to perform print processing on the original upon elapse of time $L3/v$.

Subsequent to the print processing, the image reading apparatus 4001 shifts to processing where a back side image is acquired by the back side image sensor 4213. Since the original will reach the back side image sensor 4213 upon elapse of time $L4/v$, where L4 represents a distance between the second registration sensor 4214a and the back side image sensor 4213 and v represents the conveyance speed of original, the image reading apparatus 4001 performs time measurement by using a timer (not shown) and cause the back side image sensor 4213 to start reading the back side image upon elapse of a time period of about $L4/v$ (step S4610). Then, the image reading apparatus 4001 transfers the back side image data stored in a memory (not shown) to the host computer 4002 via the I/F 4105 and the communication cable 4003 (step S4611).

Next, based on the display tray assignment information designated by the host computer 4002, the flapper 4208 is actuated to select either the discharge tray 4204 or 4205 as the conveyance destination of the original S, and the original S is discharged to the selected discharge tray (step S4612).

It should be noted that since a plural number of originals S are usually continuously read, the processing in FIG. 42 is repeatedly executed until there is no original on the sheet feed tray 4203.

When all the plural originals S placed on the sheet feed tray 4203 have been read and no original S is detected by the sheet feed tray detecting sensor 4209 (NO to step S4600), the flow proceeds to step S4616 to execute the scan completion process.

Figure 43:
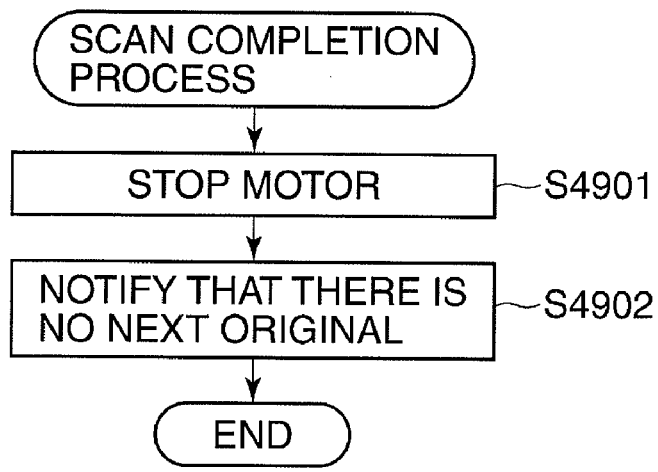
FIG. 43 is a flowchart for explaining a scan completion process in the sixth embodiment.

FIG. 43 is flowchart for explaining the scan completion process performed in step S4616 in FIG. 41. As shown in FIG. 43, a motor (not shown) is stopped to accomplish the scan completion process (step S4901), and it is notified to the host computer 4002 that there is no next original (step S4902), whereupon the present process is completed.

As described above, in this embodiment, even if a fully loaded state is detected by the discharged original stack amount detecting unit, it is possible to put an original on standby in the middle of the conveying path. Therefore, the original to be on standby is able to be conveyed up to a position immediately short of the standby position, and the front side image reading process, MICR reading process, etc. can be made during the conveyance, whereby original processing time after restart of image reading can be shortened and accordingly the entire processing time can be shortened.

If a fully loaded state of the stacking tray is not eliminated even after elapse of a given time period, an original present in the conveying path is discharged to, e.g., a discharge tray specialized to receive originals for which image reading, etc. have not been performed. It is therefore possible to eliminate a problem that other processing cannot be performed due to the host computer being occupied when a state is continued where image reading processing is performed until both the front and back side images of the original have been read. It is also possible to eliminate a problem, which is caused when an original is made on standby in the middle of the conveying path, such as the original being curled and liable to be damaged if the original is made on standby in the conveying path for long time.

This invention is not limited to the example described in the above embodiment, and various changes and modifications may be made without departing from the spirit and scope of the invention.

For example, the entire conveying path of the image reading apparatus 4001 preferably has a length that enables at least one original to be on standby in the conveying path.

In a case that a long time period has elapsed but a fully loaded state of the discharge tray 4216 is being detected by the discharged-original-full detecting sensor 4401c, it is possible to put an original on standby in the conveying path and not to allow restart of conveyance until the fully loaded state of the discharge tray 4216 is eliminated.

It is not inevitably necessary to determine the original discharge destination such that an original whose MICR has correctly been read is discharged to the discharge tray 4204 and an original whose MICR has erroneously been read is discharged to the discharge tray 4205. It can be configured that the operator designates and changes the original discharge destination according to a result of MICR reading on a capture application running on the host computer 4002. Also, it can be configured that the operator designates and assigns either the discharge tray 4204 or 4205 according to a condition other than the result of MICR reading on a capture application running on the host computer 4002.

Printing by the print head 4212 can be made according to information other than the print information based on the result of analysis of MICR. Such information can be created by, e.g., the operator on a capture application running on the host computer 4002. It is not inevitably necessary to configure the control system to conduct printing during conveyance. Only MICR information can be read as original information to be read before an original is put on standby in the conveying path.

In this embodiment, the front side and back side image sensors 4201, 4213 are spaced apart at a distance from each other, but can be disposed close to each other. As for image reading, control can be such that an image of only one side is read, and either the front side or the back side to be read is selected by manipulation on a capture application running on the host computer 4002.

In this embodiment, three discharge trays 4204, 4205, 4216 are provided. Alternatively, e.g., only two discharge trays 4204, 4205 can be provided. In that case, when a fully loaded state of one of the discharge trays 4204, 4205 is detected, another of the discharge trays 4204, 4205 is designated after elapse of a predetermined time period as the discharge destination of an unprocessed original which is on standby in the conveying path.

In this embodiment, a sensor is used to detect a fully loaded state of the discharge tray. Alternatively, a number-of-discharged-originals counter or the like can be disposed in the discharge tray to count the number of discharged originals to detect the fully loaded state. In that case, a count having a value of zero when there is no original in the tray is increased as originals are discharged thereto, and the fully loaded state is detected when the count reaches a preset number of originals, which is preferably set to the number of originals that can be discharged to the tray (including an original which is on standby in the conveying path). It can be configured that the preset number of originals is set on a capture application running on the host computer 4002.

Figure 44:
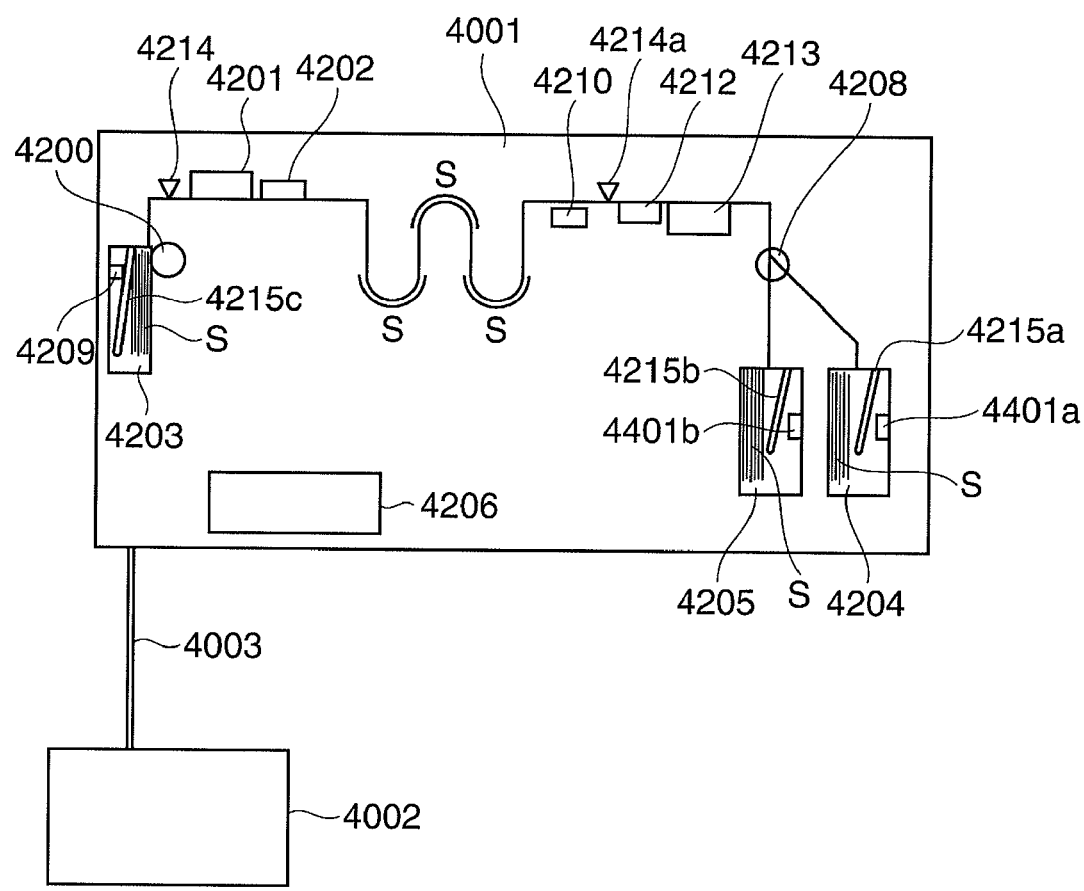
FIG. 44 is a view for schematically explaining the construction of an image reading apparatus having a plurality of curved conveying paths according to a modification.

In this embodiment, the original conveying path is formed into a straight shape. Alternatively, the conveying path can be formed into a shape, e.g., having curved portions as shown in FIG. 44. For the image transfer interface with the host computer 4002, SCSI, USB, FireWire (registered trademark), etc. can be used.

Next, a seventh embodiment of this invention will be described.

An original processing apparatus (image reading apparatus) of this embodiment is the same as those of the above embodiments except that a pressing plate is provided as an original pressing member in an original stocker section and a motion of the pressing plate to a direction opposite from a direction of pressing originals is restricted. Specifically, the image reading apparatus includes amounting unit as amounting section on which originals are placed, feeding means (sheet feed roller 5104) for feeding an original from the mounting unit to the conveying path, a pressing plate 5101 disposed at a position where it is in contact with originals placed on the mounting unit and sandwiches the originals between itself and the sheet feed roller 5104, a motion restricting unit (motion restricting means) 5503 for restricting a motion of the pressing member to the direction opposite from the pressing direction to which originals are pressed by the pressing plate 5101.

Figure 45:
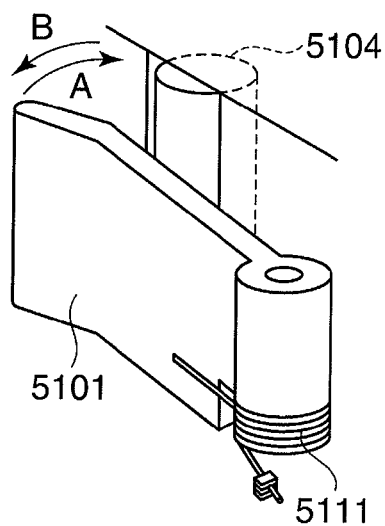
FIG. 45 is a view for explaining a function of a pressing plate in an image reading apparatus.
Figure 46:
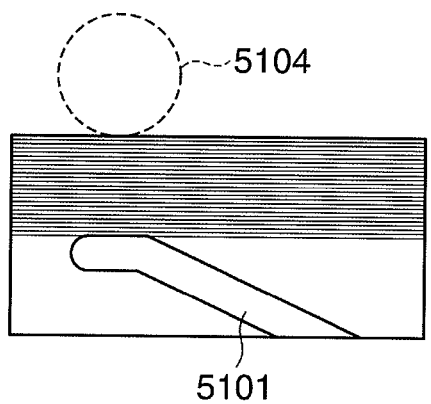
FIG. 46 is a view for explaining a state where the pressing plate in FIG. 45 is pressed against an original sheet feed roller.

FIG. 45 is a view for explaining a function of the pressing plate 5101. In the image reading apparatus 5300, a rotation shaft is provided at one end of the pressing plate 5101, and another end of the pressing plate 5101 is always urged by a spring 5111 in a direction of arrow A against the sheet feed roller 5104 or an original bundle placed on an original stacker section 5100. FIG. 46 is a view showing a state where the original bundle placed on the original stacker section 5100 is pressed against the sheet feed roller 5104 by the pressing plate 5101 during the reading process. As previously described, an original 1090 made in contact with the sheet feed roller 5104 is fed by utilizing friction.

Generally, a middle- or large-sized image reading apparatus is able to be set with an original bundle containing several tens to several hundreds of originals, at a time, on a sheet feeding section and perform a reading process thereon. To increase the efficiency of operator's work, the operator prepares the next original bundle, while the reading process on the placed original bundle is being performed by the image reading apparatus. If the reading process on the placed original bundle is still performing at completion of preparation of the next original bundle, the operator waits for completion of the reading process by the image reading apparatus. After there is no original bundle on the sheet feeding section, the operator places the next original bundle and restarts the reading process. However, even if the image reading by the image reading apparatus is not finished and originals remain on the stacker section, the operator who hastens to finish his work is liable to add the next original bundle onto the stacker section, while releasing the pressing by the pressing plate 5101, to replenish the original bundle.

Figure 47:
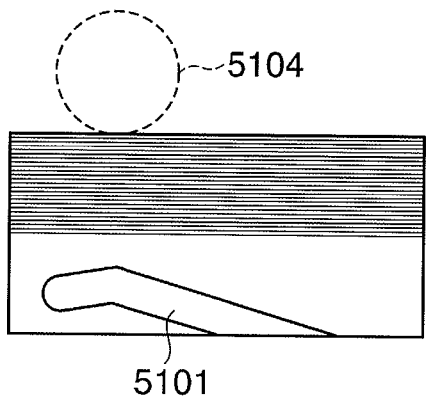
FIG. 47 is a view for explaining a state where the pressing of the pressing plate against originals in FIG. 45 is released.

FIG. 47 is a view showing a state where the pressing by the pressing plate 5101 is released by, e.g., an operator's manipulation. To enable replenishment, the pressing plate 5101 that presses originals against the sheet feed roller 5104 that feeds originals as shown in FIG. 46 is to be spaced apart from the originals as shown in FIG. 47, and then the next original bundle is to be inserted between the last original of the placed original bundle and the pressing plate 5101. However, as shown in FIG. 47, when the pressing plate 5101 is spaced apart from originals which are being fed, the contact between the top original and the sheet feed roller 5104 becomes unstable for the reason, e.g., that the original bundle is inclined toward the pressing plate 5101. As a result, a proper friction force cannot be obtained between originals and the sheet feed roller 5104 and originals cannot normally be fed, resulting in a jam error and a reduction in operation efficiency. In some cases, an abnormal feeding state causes damages of originals.

Thus, with this embodiment, there is provided an image reading apparatus that restricts, in a case that the sheet feed roller is being driven to feed originals, a motion of the pressing plate toward a direction away from the originals to release the pressing, thereby prohibiting the next original bundle from being replenished to prevent the pressing by the pressing plate from being inadvertently released by the operator.

The image reading apparatus includes an original stacker section on which originals 1090 are placed, a conveying path for conveying originals 1090, and first and second sheet discharging sections for discharging originals 1090.

In the image reading apparatus, originals 1090 placed on the original stacker section are pressed against the sheet feed roller 5104 by the pressing plate 5101 and fed to the feed roller 5105. Originals 1090 conveyed by the feed roller 5105 are separated one by one and fed by the retard roller to the conveying path, with duplicated feeding prevented. There are provided along the conveying path a registration sensor, an information reading section for reading MICR characters 1091 on an original 1090 shown in FIG. 51, and an image reading section for reading an image of an original. Although not shown, the image reading apparatus, when in use, is connected to the host computer via the communication cable.

Figure 48:
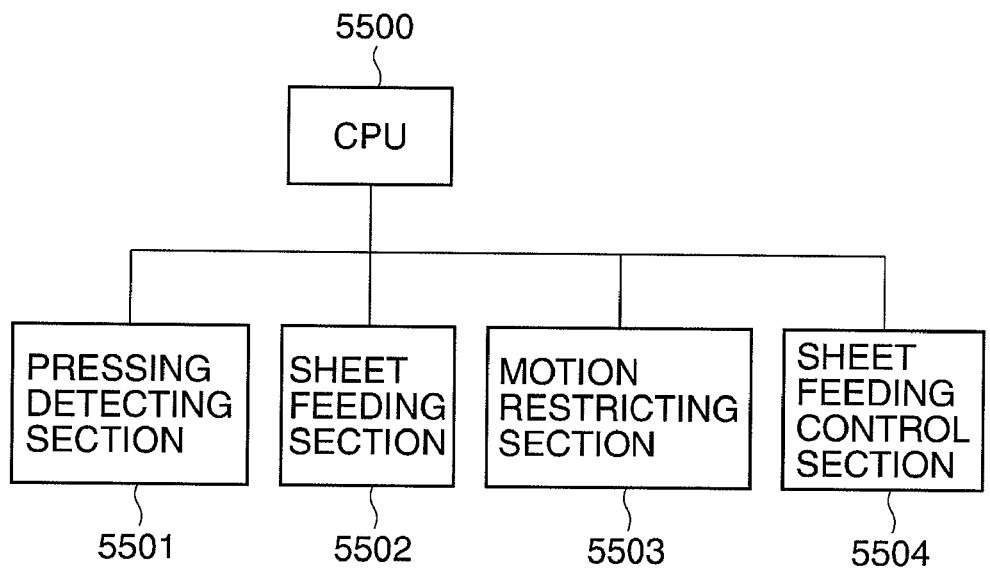
FIG. 48 is a block diagram of a control system of an image reading apparatus according to a seventh embodiment of this invention.
Figure 49:
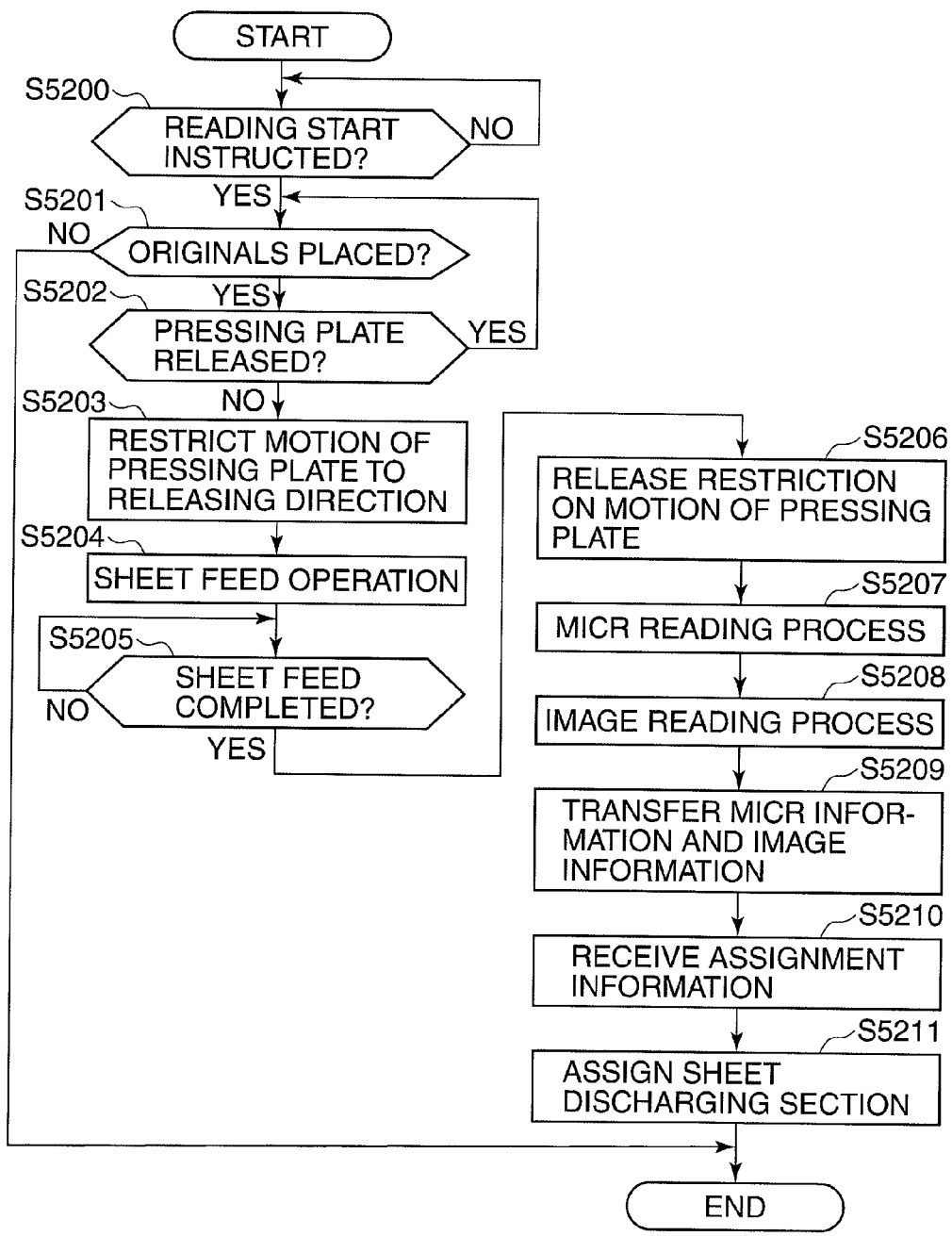
FIG. 49 is a flowchart of an image reading process executed by a CPU of the image reading apparatus of the seventh embodiment.

FIG. 48 is a block diagram showing a control system of the image reading apparatus. A CPU 5500 controls a pressing detecting section 5501, a sheet feeding section 5502, a motion restricting section 5503, a sheet feeding control section 5504, etc. FIG. 49 is a flowchart of an image reading process executed by the CPU 5500. In the following, a description will be given with reference to the flowchart of FIG. 49.

In step S5200, when an image reading instruction is given to the image reading apparatus from the host computer, the process shown in the flowchart are executed. In step S5201, in accordance with an output signal from a sheet detecting sensor (not shown), etc., the CPU 5500 determines whether originals 1090 are placed on the original stacker section. To determine whether originals 1090 are placed on the original stacker section, there is a system for detecting the presence or absence of originals by using a sheet detecting sensor, e.g., a photo-interrupter, which has a light emission unit and a light reception unit disposed to sandwich originals therebetween and is configured to detect the presence of originals when detecting light being intercepted by the originals.

Figure 50:
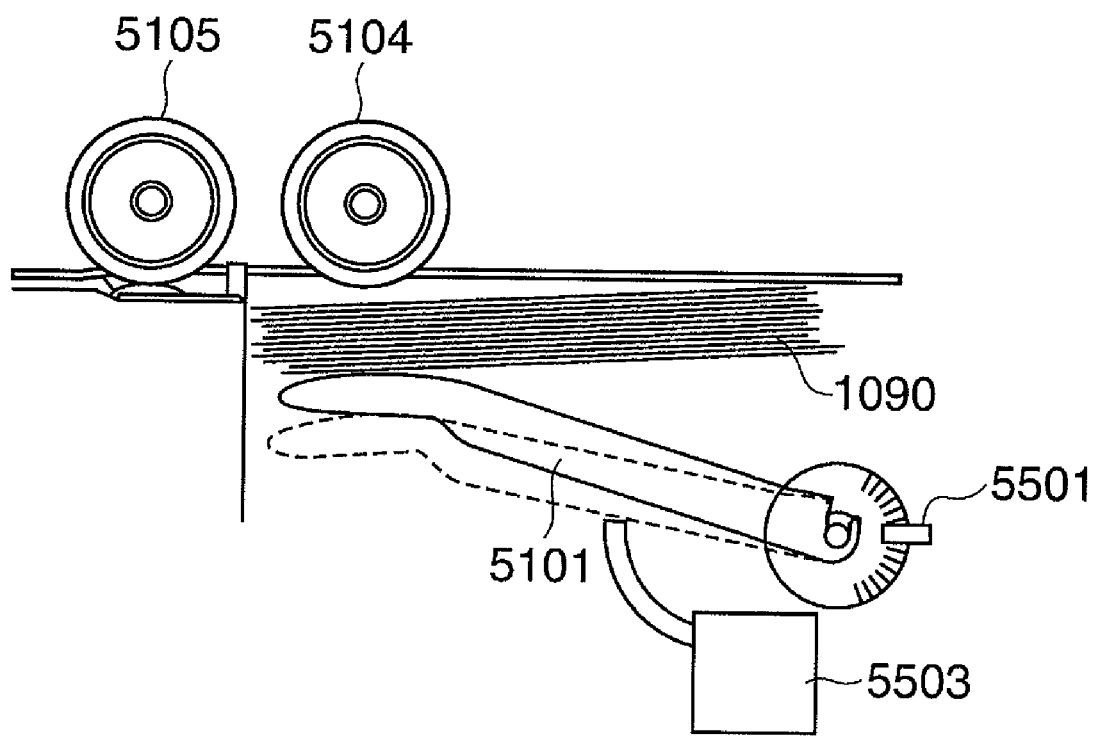
FIG. 50 is a view for explaining a state where a pressing plate is pressed against an original sheet feed roller in the image reading apparatus.

Next, in step S5202, it is determined whether the pressing plate has been moved (released) by the operator by hand to a direction opposite from the pressing direction. FIG. 50 shows an example state where originals 1090 placed on the original stacker section are pressed by the pressing plate 5101 against the sheet feed roller 5104, which is feeding means. There are provided the pressing detecting section 5501 for detecting a state of the pressing plate 5101 and the motion restricting section 5503 as motion restricting means for restricting a motion of the pressing plate 5101 to a direction of releasing the pressing. The illustrated pressing detecting section 5501 is an example configured to detect a rotational motion and a rotation direction of the pressing plate 5101 by an optical encoder, but this is not limitative. For example, the pressing detecting section can be configured to have a mechanical switch provided at a position near a tip end of the pressing plate for contact with originals and to be adapted to detect the pressing when the mechanical switch is depressed.

Based on an output from the pressing detecting section 5501, the CPU 5500 detects whether the pressing plate 5101 presses originals 1090 toward the sheet feed roller 5104. When detecting based on the output of the pressing detecting section 5501 that the position of the pressing plate 5101 has been moved to a direction (indicated by arrow B) opposite from a direction of arrow A in FIG. 45 as compared to the position detected in the reading processing for the preceding original, the CPU 5500 determines that the pressing of the pressing plate 5101 is released by the operator and other originals are being replenished by the operator, and gives the sheet feeding control section 5504 an instruction not to control the sheet feeding section 5502 to feed an original. If a sheet feed operation is being performed, an instruction to stop the sheet feed operation is given to the sheet feeding control section 5504. Subsequently, when detecting that after the pressing being released, the pressing plate 5101 has been moved toward the direction of arrow A in FIG. 45 and assumes a certain position for a predetermined time period, the pressing detecting section 5501 determines that originals are being pressed. Then, the CPU 5500 controls, in step S5203, the motion restricting section 5503 to restrict a motion of the pressing plate 5101 to the direction of arrow B in FIG. 45, and in step S5204, gives the sheet feeding control section 5504 an instruction to start driving the sheet feeding section 5502 to drive the sheet feed roller 5104 to feed an original 1090. It is possible to continue restricting a motion of the pressing plate 5101 to the direction opposite from the pressing direction by the motion restricting section 5503 while originals 1090 are being fed by the drive of the sheet feed roller 5104.

In step S5205, the CPU 5500 performs time measurement by using a timer (not shown) at and after the start of the sheet feed roller 5104 being driven, and waits for the elapse of time required for the leading end of the original 1090 to reach the position of the feed roller 5105 by the drive of the sheet feed roller 5104. When the leading end of the original 1090 reaches the position of the feed roller 5105, the feed roller 5105 is able to stably separate and feed originals one by one to the conveying path, without a sheet feeding force of the sheet feed roller 5104. As a result, the pressing by the pressing plate 5101 becomes unnecessary, and the operator is allowed to move the pressing plate by hand. In step S5206, the CPU 5500 thus releases the restriction by the motion restricting section 5503 on the motion of the pressing plate 5101.

Since the original 1090 will reach the MICR reading section upon elapse of time L1/v, where L1 represents a distance between the registration sensor and the MICR reading section and v represents the conveyance speed of original 1090, the CPU 5500 performs time measurement by using a timer (not shown) and controls in step S5207 the MICR reading section to start reading the MICR characters upon elapse of time L1/v. Since the original 1090 will reach the image reading section upon elapse of time L2/v, where L2 represents a distance between the registration sensor and the image reading section, the CPU 5500 performs time measurement by using a timer (not shown) and controls in step S5208 the image reading section to start image reading upon elapse of time L2/v. It should be noted that an example where the MICR reading process is performed subsequent to step S5206 has been described with reference to FIG. 49, however, the release of restriction on a motion of the pressing plate 5101 in step S5206 can be made in, e.g., a stage where processing on all the originals has been completed.

In step S5209, the CPU 5500 controls the image reading apparatus to transfer the MICR information and the image information acquired in steps S5207 and S5208 to the host computer via the communication cable. In step S5210, the CPU 5500 receives from the host computer a result of determination of sheet discharge destination of the original 1090 by the host computer based on the MICR information and the image information.

In step S5211, based on the determination result transferred from the host computer in step S5210, the CPU 5500 controls such that the original 1090 is assigned and discharged to either the first sheet discharging section or the second sheet discharging section, and completes the process.

In the above embodiment, the discharge destination of originals 1090 (either the first or second sheet discharging section) is determined by the host computer, but can be determined by the image reading apparatus. In FIG. 50, there is shown an example of the motion restricting section 5503 where an arcuate member projects from a base portion of the motion restricting section 5503 to a position for contact with the pressing plate 5101, but this is not limitative. For example, it is possible to configure a pivot shaft about which the pressing plate 5101 is pivoted to have a construction capable of restricting a pivotal motion of the pressing plate 5101 such that the pressing plate is unable to pivot to the pressing release direction and capable of releasing the restriction on the pivotal motion.

As described above, with this embodiment, a motion of the pressing plate is restricted during the period when the image reading apparatus is feeding originals while utilizing a static friction between originals and the sheet feed roller produced by the pressing by the pressing plate. Therefore, the operator is unable to replenish the next original bundle, whereby the sheet feeding is prevented from becoming unstable and occurrences of jam error and damage of originals can be avoided. In a state where the image reading apparatus does not require the pressing by the pressing plate, the restriction on a motion of the pressing plate is released. Therefore, the operator is able to easily replenish the next original bundle by releasing the pressing by the pressing plate, whereby the operator's operability and the operation efficiency can be improved.

In this invention, it can be configured that the control unit controls the conveyance unit to convey one original up to a position short of the second processing unit before reception of control information and controls the conveyance unit to convey the one original to the second processing unit based on the control information after reception thereof, whereby high speed original processing can be performed. In a case where control information is received before the one original reaches the position short of the second processing unit, the control unit controls the conveyance unit not to cause the one original to stop at the position short of the second processing unit but continuously convey the one original to the second processing unit, whereby high speed original processing can be realized.

The present invention whose embodiments have been described above is not only intended to provide an original processing apparatus configured such that a space for receiving one original having been processed by a first processing unit is ensured at a position short of a second processing unit, but also widely applicable to a control method of such an original processing apparatus, a control program (control program product) for executing the control method, an original processing system configured by connecting the original processing apparatus and an information processing apparatus (host computer), and the like.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-327765, filed Dec. 24, 2008, Japanese Patent Application No. 2008-327046, filed Dec. 24, 2008, Japanese Patent Application No. 2008-327039, filed Dec. 24, 2008, Japanese Patent Application No. 2009-250562, filed Oct. 30, 2009, Japanese Patent Application No. 2009-250563, filed Oct. 30, 2009, and Japanese Patent Application No. 2009-290714, filed Dec. 22, 2009, which are hereby incorporated by reference herein in their entireties.

What is claimed is:

1. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path, and wherein at least part of said conveying path is curved between said first processing unit and said second processing unit.

2. The original processing apparatus according to claim 1, wherein said control unit controls said conveyance unit to convey the one original up to a position short of said second processing unit before reception of the control information, controls said conveyance unit to convey the one original to said second processing unit based on the control information after reception thereof.

3. The original processing apparatus according to claim 1, wherein said control unit controls said conveyance unit to make the one original on standby at a position short of said second processing unit until reception of the control signal, and controls said conveyance unit to convey the one original to said second processing unit based on the control information after reception thereof.

4. The original processing apparatus according to claim 1, further including:
a feeding unit configured to feed each original to said conveying path; and a transmission unit configured to transmit information on each original acquired by said first processing unit to an information processing apparatus, wherein the control information is created based on information on the original received from the information processing apparatus, said control unit controls said feeding unit to feed a next original to said conveying path in a state where the original is caused to stop in said conveying path or in a state where the original is conveyed along said conveying path, said conveying path has a first conveying path configured to convey an original from a downstream end of said first processing unit and a second conveying path configured to convey the original from the downstream end of the first conveying path to a position short of said second processing unit, and at least the first conveying path, among the first and second conveying paths, has a conveying path length longer than a longest length of conveyable originals.

5. The original processing apparatus according to claim 4, wherein the conveying path length of the first conveying path is longer than a sum of the longest length of conveyable originals and a braking distance.

6. The original processing apparatus according to claim 4, further including:

a detection unit configured to detect a length of each original;

wherein based on the length of the original detected by said detection unit, said control unit controls said feeding unit to feed a next original to said conveying path.

7. The original processing apparatus according to claim 6, wherein said control unit controls said feeding unit to feed the next original to said conveying path in a case where the next original to be fed by said feeding unit to said conveying path is a second original and the length, detected by said detection unit, of the original fed as a first original to said conveying path is shorter than a conveying path length of the second conveying path, or in a case where the next original to be fed by said feeding unit to said conveying path is a third or more subsequent original, a length, detected by said detection unit, of an original fed preceding one original from the third or more subsequent original to said conveying path is shorter than the conveying path length of the second conveying path, and the processing by said second processing unit on an original fed preceding two originals from the third or more subsequent original can be started.

8. The original processing apparatus according to claim 4, wherein a conveying path length of the second conveying path is longer than the longest length of conveyable originals.

9. The original processing apparatus according to claim 8, wherein the conveying path length of the second conveying path is longer than a sum of the longest length of conveyable originals and a braking distance.

10. The original processing apparatus according to claim 8, wherein in a case where the next original to be fed by said feeding unit to said conveying path is a second original or in a case where the processing by said second processing unit on an original fed preceding two originals from the third or more subsequent original can be started, said control unit controls said feeding unit to feed the next original to said conveying path.

11. The original processing apparatus according to claim 1, wherein said conveying path at least part of which is curved includes a curved conveying path provided between said first and second processing units and including a first U-turn section, a second U-turn section, and a third U-turn section, and the curved conveying path is formed in an open and close unit provided in a main body of the original processing apparatus so as to be openable and closable.

12. The original processing apparatus according to claim 11, further including:

a transmission unit configured to transmit information on each original acquired by said first processing unit to an information processing apparatus, wherein said second processing unit performs the different processing based on the control information on the original received from the information processing apparatus.

13. The original processing apparatus according to claim 11, wherein the open and close unit formed with the curved conveying path includes an open and close mechanism able to be disassembled and assembled along the curved conveying path.

14. The original processing apparatus according to claim 11, wherein the curved conveying path has a conveying path length equal to or longer than two times a longest length of conveyable originals.

15. The original processing apparatus according to claim 11, wherein the second U-turn section of the curved conveying path is U-turned in a direction reverse to that of the first U-turn section, and the third U-turn section is U-turned in a direction reverse to that of the second U-turn section.

16. The original processing apparatus according to claim 11, wherein a conveying path corresponding to said first processing unit and a conveying path corresponding to said second processing unit are formed in respective ones of two other open and close units provided in the main body of the original processing apparatus so as to be openable and closable, and the two other open and close units each have an open and close mechanism able to be disassembled and assembled along the conveying path.

17. The original processing apparatus according to claim 16, wherein the open and close unit in the curved conveying path, the open and close mechanism in the other conveying path corresponding to said first processing unit, and the open and close mechanism in the other conveying path corresponding to said second processing unit each have a pivot unit for horizontally openably and closably holding a conveying path constituent member.

18. The original processing apparatus according to claim 17, wherein a pivot shaft of the open and close unit in the curved conveying path is coaxial with either one of a pivot shaft of the open and close mechanism in the other conveying path corresponding to said first processing unit and a pivot shaft of the open and close mechanism in the other conveying path corresponding to said second processing unit.

19. The original processing apparatus according to claim 11, wherein said conveyance unit has a first conveyance unit provided downstream of said first processing unit and configured to convey each original, and a second conveyance unit provided continuously with the first conveyance unit and configured to convey the original, and the first conveyance unit is disposed in the first U-turn section and the second conveyance unit is disposed in the third U-turn section.

20. The original processing apparatus according to claim 19, wherein said control unit independently controls the first conveyance unit and the second conveyance unit.

21. The original processing apparatus according to claim 11, wherein each original has identification information, said first processing unit includes a first reading unit configured to read the identification information of the original, and said second processing unit includes a printing unit configured to perform predetermined print on the original based on the identification information read by the first reading unit of said first processing unit and a second reading unit configured to read an image of a print surface formed by the printing unit.

22. The original processing apparatus according to claim 11, including:
an original mounting unit disposed upstream of said first processing unit and configured to feed each original to said conveying path; and
an original sheet discharge unit disposed downstream of said second processing unit and configured to discharge each original from said conveying path.

23. The original processing apparatus according to claim 1, wherein when the one original having been processed by said first processing unit is conveyed to said second processing unit, said control unit controls said conveyance unit to cause the one original to be positioned short of said second processing unit in said conveying path until reception of the control information on the one original.

24. The original processing apparatus according to claim 23, further including:
an original mounting unit on which a bundle of originals is placed in a standing state; and
an original separating and feeding unit configured to feed the originals one by one from said original mounting unit to said conveying path,
wherein said conveying path is formed into a slit shape that opens to an upper part of a main body of the original processing apparatus, and said conveyance unit conveys the originals one by one in a standing state along said conveying path.

25. The original processing apparatus according to claim 23, further including:
at least one of a MICR character reading unit configured to read magnetic data information printed on each original and a front side image reading unit configured to read image information of a front side of the original, said MICR character reading unit and said front side image reading unit being provided in said first processing unit; and
a transmission unit configured to transmit the information read by said first processing unit to external equipment.

26. The original processing apparatus according to claim 23, wherein said second processing unit includes a back side image reading unit configured to read image information of a back side of each original.

27. The original processing apparatus according to claim 1, wherein when the one original having been processed by said first processing unit is conveyed to said second processing unit, said control unit controls, until reception of the control information on the one original, said conveyance unit to make the one original on standby at a stop position in a second conveying path located upstream of said second processing unit and make another original subsequent to the one original on standby at a stop position in a first conveying path located upstream of the stop position in the second conveying path, and controls, based on the control information on the one original after reception thereof, said conveyance unit to restart conveyance of the one original and subsequently restart conveyance of the other original.

28. The original processing apparatus according to claim 27, wherein when the one original and the other original are restarted to be conveyed, in a case where a relation of (B−C)<A is fulfilled, where A represents a distance between the stop position in the second conveying path and said second processing unit, B represents a distance between the stop position in the second conveying path and a downstream end of the other original made on standby at the stop position in the first conveying path, and C represents a length of the one original along a conveyance direction, said control unit controls said conveyance unit to move the one original downstream earlier than the other original, thereby making the length C, which is the length of the one original at the stop position in the second conveying path, relatively short and making a distance (B−C) at restart of conveyance larger than the distance A.

29. The original processing apparatus according to claim 27, wherein when the one original made on standby at the stop position in the second conveying path is restarted to be conveyed, said control unit controls said conveyance unit to make a conveyance speed of the one original equal to a steady speed during when a leading end portion of the one original in a conveyance direction is moved from the stop position in the second conveying path to said second processing unit.

30. The original processing apparatus according to claim 27, wherein said conveyance unit includes a first conveyance unit configured to convey each original along the first conveying path in said conveying path, and a second conveyance unit configured to convey the original along the second conveying path in said conveying path, and
said control unit independently controls the first and second conveyance units.

31. The original processing apparatus according to claim 1, wherein when the one original having been processed by said first processing unit is conveyed to said second processing unit, said control unit controls, until reception of the control information on the one original, said conveyance unit to make the one original on standby at a stop position in a second conveying path located upstream of said second processing unit and make another original subsequent to the one original on standby at a stop position in a first conveying path located upstream of the stop position in the second conveying path, and controls, based on the control information on the one original after reception thereof, said conveyance unit to restart the one original and the other original to be conveyed in a condition that a conveyance speed of the one original is higher than that of the other original.

32. The original processing apparatus according to claim 1, further including:
a mounting unit on which conveyed originals are discharged and stacked; and
a discharged original stack amount detecting unit configured to detect a stack amount of discharged originals stacked on said mounting unit,
wherein in a case where said discharged original stack amount detecting unit detects a state where discharged originals are fully loaded, said control unit controls said conveyance unit to make an original whose information has been read on standby in said conveying path.

33. The original processing apparatus according to claim 32, wherein in a case where said discharged original stack amount detecting unit becomes not to detect the state where discharged originals are fully loaded, said control unit controls said conveyance unit to restart conveyance of the original made on standby in said conveying path.

34. The original processing apparatus according to claim 32, wherein in a case where a predetermined time period has elapsed, but said discharged original stack amount detecting unit is detecting the state where discharged originals are fully loaded, said control unit controls said conveyance unit to discharge the original made on standby in said conveying path.

35. The original processing apparatus according to claim 34, including:
another mounting unit onto which the original made on standby in said conveying path is discharged in a case where the predetermined time period has elapsed, but said discharged original stack amount detecting unit is detecting the state where discharged originals are fully loaded.

36. The original processing apparatus according to claim 32, wherein said mounting unit has a gap via which at least the original made on standby in said conveying path is discharged in a case where said discharged original stack amount detecting unit detects the state where discharge originals are fully loaded.

37. The original processing apparatus according to claim 32, including a plurality of the mounting units.

38. The original processing apparatus according to claim 1, including:
a mounting section on which originals are placed;
feeding means for feeding each original from said mounting section to said conveying path;
a pressing member disposed at a position where it is in contact with the originals placed on said mounting section and sandwiches the originals between itself and said feeding means; and
a motion restricting means for restricting a motion of said pressing member to a direction opposite from a pressing direction to which the originals are pressed by said pressing member.

39. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path, controls said conveyance unit to convey the one original up to a position short of said second processing unit before reception of the control information, and further controls said conveyance unit to convey the one original to said second processing unit based on the control information after reception thereof.

40. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path, and wherein said conveying path includes a curved conveying path provided between said first and second processing units and including a first U-turn section, a second U-turn section, and a third U-turn section, and the curved conveying path is formed in an open and close unit provided in a main body of the original processing apparatus so as to be openable and closable.

41. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path, and
wherein when the one original having been processed by said first processing unit is conveyed to said second processing unit, said control unit controls, until reception of the control information on the one original, said conveyance unit to make the one original on standby at a stop position in a second conveying path located upstream of said second processing unit and make another original subsequent to the one original on standby at a stop position in a first conveying path located upstream of the stop position in the second conveying path, and further controls, based on the control information on the one original after reception thereof, said conveyance unit to restart the one original and the other original to be conveyed in a condition that a conveyance speed of the one original is higher than that of the other original.

42. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path,
wherein said original processing apparatus further comprises:
a mounting unit on which conveyed originals are discharged and stacked; and
a discharged original stack amount detecting unit configured to detect a stack amount of discharged originals stacked on said mounting unit, and wherein in a case where said discharged original stack amount detecting unit detects a state where discharged originals are fully loaded, said control unit controls said conveyance unit to make an original whose information has been read on standby in said conveying path.

43. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path,
wherein said original processing apparatus further comprises:
a feeding unit configured to feed each original to said conveying path; and
a transmission unit configured to transmit information on each original acquired by said first processing unit to an information processing apparatus,
wherein the control information is created based on information on the original received from the information processing apparatus, said control unit controls said feeding unit to feed a next original to said conveying path in a state where the original is caused to stop in said conveying path or in a state where the original is conveyed along said conveying path, said conveying path has a first conveying path configured to convey an original from a downstream end of said first processing unit and a second conveying path configured to convey the original from the downstream end of the first conveying path to a position short of said second processing unit, and at least the first conveying path, among the first and second conveying paths, has a conveying path length longer than a longest length of conveyable originals,
wherein a conveying path length of the second conveying path is longer than the longest length of conveyable originals, and
wherein in a case where the next original to be fed by said feeding unit to said conveying path is a second original or in a case where the processing by said second processing unit on an original fed preceding two originals from the third or more subsequent original can be started, said control unit controls said feeding unit to feed the next original to said conveying path.

44. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path,
wherein when the one original having been processed by said first processing unit is conveyed to said second processing unit, said control unit controls said conveyance unit to cause the one original to be positioned short of said second processing unit in said conveying path until reception of the control information on the one original,
wherein said original processing apparatus further comprises:
an original mounting unit on which a bundle of originals is placed in a standing state; and
an original separating and feeding unit configured to feed the originals one by one from said original mounting unit to said conveying path, and
wherein said conveying path is formed into a slit shape that opens to an upper part of a main body of the original processing apparatus, and said conveyance unit conveys the originals one by one in a standing state along said conveying path.

45. An original processing apparatus, comprising:
a conveying path along which originals are conveyed;
a conveyance unit configured to convey originals along said conveying path;
a control unit configured to control said conveyance unit;
a first processing unit configured to perform predetermined processing on each original conveyed along said conveying path; and
a second processing unit disposed downstream of said first processing unit and configured to perform different processing than that performed by said first processing unit on the original conveyed along said conveying path in accordance with control information created based on a result of the processing by said first processing unit,
wherein said control unit controls said conveyance unit to cause one original having been processed by said first processing unit to be positioned short of said second processing unit in said conveying path,
wherein when the one original having been processed by said first processing unit is conveyed to said second processing unit, said control unit controls said conveyance unit to cause the one original to be positioned short of said second processing unit in said conveying path until reception of the control information on the one original, and
wherein said original processing apparatus further comprises:
at least one of a MICR character reading unit configured to read magnetic data information printed on each original and a front side image reading unit configured to read image information of a front side of the original, said MICR character reading unit and said front side image reading unit being provided in said first processing unit; and
a transmission unit configured to transmit the information read by said first processing unit to external equipment.

46. An original processing apparatus, comprising:
a conveying path along which originals are conveyed;
a conveyance unit configured to convey originals along said conveying path;
a control unit configured to control said conveyance unit;

a first processing unit configured to perform predetermined processing on each original conveyed along said conveying path; and a second processing unit disposed downstream of said first processing unit and configured to perform different processing than that performed by said first processing unit on the original conveyed along said conveying path in accordance with control information created based on a result of the processing by said first processing unit, wherein said control unit controls said conveyance unit to cause one original having been processed by said first processing unit to be positioned short of said second processing unit in said conveying path, wherein when the one original having been processed by said first processing unit is conveyed to said second processing unit, said control unit controls said conveyance unit to cause the one original to be positioned short of said second processing unit in said conveying path until reception of the control information on the one original, and wherein said second processing unit includes a back side image reading unit configured to read image information of a back side of each original.

47. An original processing apparatus, comprising:

a conveying path along which originals are conveyed;

a conveyance unit configured to convey originals along said conveying path;

a control unit configured to control said conveyance unit;

a first processing unit configured to perform predetermined processing on each original conveyed along said conveying path; and a second processing unit disposed downstream of said first processing unit and configured to perform different processing than that performed by said first processing unit on the original conveyed along said conveying path in accordance with control information created based on a result of the processing by said first processing unit, wherein said control unit controls said conveyance unit to cause one original having been processed by said first processing unit to be positioned short of said second processing unit in said conveying path, wherein when the one original having been processed by said first processing unit is conveyed to said second processing unit, said control unit controls, until reception of the control information on the one original, said conveyance unit to make the one original on standby at a stop position in a second conveying path located upstream of said second processing unit and make another original subsequent to the one original on standby at a stop position in a first conveying path located upstream of the stop position in the second conveying path, and controls, based on the control information on the one original after reception thereof, said conveyance unit to restart conveyance of the one original and subsequently restart conveyance of the other original, and wherein when the one original and the other original are restarted to be conveyed, in a case where a relation of $(B-C) < A$ is fulfilled, where A represents a distance between the stop position in the second conveying path and said second processing unit, B represents a distance between the stop position in the second conveying path and a downstream end of the other original made on standby at the stop position in the first conveying path, and C represents a length of the one original along a conveyance direction, said control unit further controls said conveyance unit to move the one original downstream earlier than the other original, thereby making the length C, which is the length of the one original at the stop position in the second conveying path, relatively short and making a distance $(B-C)$ at restart of conveyance larger than the distance A.

* * * * *